US012682274B2

(12) United States Patent (10) Patent No.: US 12,682,274 B2
Yonetani et al. (45) Date of Patent: Jul. 14, 2026

(54) MODEL INTEGRATION APPARATUS, MODEL INTEGRATION METHOD, COMPUTER-READABLE STORAGE MEDIUM STORING A MODEL INTEGRATION PROGRAM, INFERENCE SYSTEM, INSPECTION SYSTEM, AND CONTROL SYSTEM

(71) Applicant: OMRON Corporation, Kyoto (JP)

(72) Inventors: Ryo Yonetani, Tokyo (JP); Masaki Suwa, Tokyo (JP); Hiroyuki Miyaura, Tokyo (JP)

( * ) Notice: Subject to any disclaimer, the term of this patent is extended or adjusted under 35 U.S.C. 154(b) by 1145 days.

(21) Appl. No.: 17/414,972

(22) PCT Filed: Nov. 19, 2019

(86) PCT No.: PCT/JP2019/045161
§ 371 (c)(1),
(2) Date: Jun. 17, 2021

(87) PCT Pub. No.: WO2020/148998
PCT Pub. Date: Jul. 23, 2020

(65) Prior Publication Data
US 2022/0058525 A1 Feb. 24, 2022

(30) Foreign Application Priority Data
Jan. 18, 2019 (JP) ................................. 2019-006777

(51) Int. Cl.
*G06N 20/00* (2019.01)
(52) U.S. Cl.
CPC .................................... *G06N 20/00* (2019.01)
(58) Field of Classification Search
CPC .................................................. G06N 3/098
See application file for complete search history.

(56) References Cited

U.S. PATENT DOCUMENTS 11,461,690 B2 * 10/2022 Szeto ..................... G06N 20/10
2015/0324686 A1 * 11/2015 Julian .................... G06N 3/098
706/25

(Continued)

FOREIGN PATENT DOCUMENTS

CN      108712260 A      10/2018
CN      108734193 A      11/2018

(Continued)

OTHER PUBLICATIONS

Sei Sato, "Artificial Intelligence Algorithm Encyclopedia with Special Attention", Interface, Dec. 27, 2018 (accession date), vol. 45, No. 2, pp. 60 to 67, ISSN 0387 to 9569; Relevance is indicated in the (translated) ISR/WO mailed on Feb. 4, 2020.

(Continued)

*Primary Examiner* — Tan H Tran
(74) *Attorney, Agent, or Firm* — METROLEX IP LAW GROUP, PLLC; Robert L. Scott, Esq.

(57) ABSTRACT

A model integration apparatus according to one or more embodiments may include a model collecting unit that collects trained learning models from a plurality of learning apparatuses, an integration processing unit that executes integration processing of integrating the results of machine learning reflected in an integration range set in the common portion, with respect to the trained learning models, and a model updating unit that transmits a result of the integration processing to the learning apparatuses. The model updating unit may further update the trained learning models retained by the learning apparatuses by causing the learning apparatuses to each apply the result of the integration processing to the integration range in the trained learning model.

19 Claims, 42 Drawing Sheets

(56) References Cited

U.S. PATENT DOCUMENTS

| | | | |
|---|---|---|---|
| 2018/0330200 A1 | 11/2018 | Shibata et al. | |
| 2018/0349709 A1 | 12/2018 | Shinohara et al. | |
| 2019/0236772 A1* | 8/2019 | Cho | G06T 7/0004 |
| 2019/0385043 A1* | 12/2019 | Choudhary | G06F 13/4213 |
| 2020/0125739 A1* | 4/2020 | Verma | H04L 9/008 |
| 2022/0058524 A1* | 2/2022 | Kudinov | G06N 20/00 |

FOREIGN PATENT DOCUMENTS

| | | |
|---|---|---|
| CN | 108921300 A | 11/2018 |
| CN | 109146076 A | 1/2019 |
| JP | 2012-26982 A | 2/2012 |
| JP | 2018-026119 A | 2/2018 |
| JP | 2018-132884 A | 8/2018 |
| JP | 2018-147261 A | 9/2018 |
| JP | 2018-165948 A | 10/2018 |
| JP | 2018-190241 A | 11/2018 |
| JP | 2018-207222 A | 12/2018 |
| WO | 2015/174811 A1 | 11/2015 |
| WO | 2018101848 A1 | 6/2018 |

OTHER PUBLICATIONS

Yusuke Yamaura et al, "Interior Style Estimation Using Deep Learning Techniques for Product Recommendation", IEICE Technical Report, Dec. 6, 2018, vol. 118, No. 362, pp. 85 to 90, ISSN 2432-6380; Relevance is indicated in the (translated) ISR/WO mailed on Feb. 4, 2020.

NTT Data Mathematical System Inc, Visual Mining Studio, Technical Papers Version 8.4, Jan. 2018, [retrieval date Jan. 20, 2020], Internet : <https://www.msi.co.jp/vmstudio/materials/tech84.pdf>, pp. 35 to 38; Relevance is indicated in the (translated) ISR/WO mailed on Feb. 4, 2020.

English translation of the International Search Report ("ISR") of PCT/JP2019/045161 mailed on Feb. 4, 2020.

Written Opinion("WO") of PCT/JP2019/045161 mailed on Feb. 4, 2020.

Virginia Smith et al, "Federated Multi-Task Learning", 31st Conference on Neural Information Processing Systems (NIPS 2017), Long Beach, CA, May 2017, pp. 1-19, https://arxiv.org/pdf/1705. 10467v2.pdf; Relevance is indicated in the EESR issued on Oct. 11, 2022 in a counterpart European patent application.

Sinno Jialin Pan et al, "A Survey on Transfer Learning", IEEE Transactions on Knowledge and Data Engineering, vol. 22, No. 10, Oct. 2010, Los Alamitos, CA, pp. 1345-1359; Relevance is indicated in the EESR issued on Oct. 11, 2022 in a counterpart European patent application.

Extended European search report (EESR) issued on Oct. 11, 2022 in a counterpart European patent application.

Chinese Office Action issued on Jan. 15, 2024 in a counterpart Chinese patent application.

Japanese Office Action issued on Jan. 11, 2022 for the counterpart Japanese patent application.

* cited by examiner

| USER ID | GROUP ID |
|---------|----------|
| 000001  | a00001   |
| ⋮       | ⋮        |

FIG. 6B

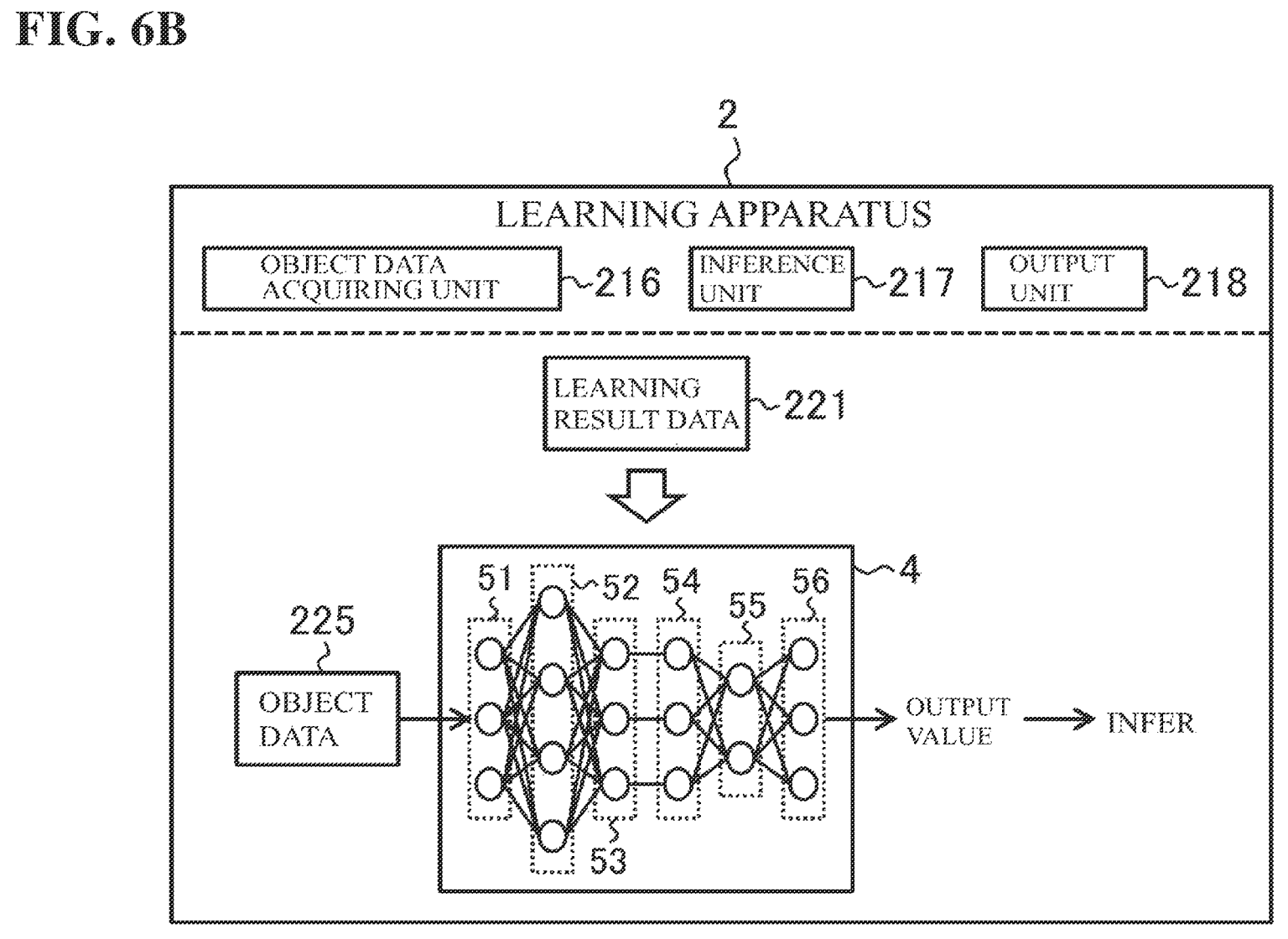

LEARNING APPARATUS    2

OBJECT DATA ACQUIRING UNIT    216

INFERENCE UNIT    217

OUTPUT UNIT    218

LEARNING RESULT DATA    221

OBJECT DATA    225

4

51    52    54    55    56

53

OUTPUT VALUE → INFER

START

S101 — COLLECT LOCAL LEARNING DATA

S102 — DETERMINE STRUCTURE OF LEARNING MODEL

S103 — CONSTRUCT TRAINED LEARNING MODEL BY EXECUTING MACHINE LEARNING USING LOCAL LEARNING DATA

S104 — SAVE LEARNING RESULT DATA

END

FIG. 8

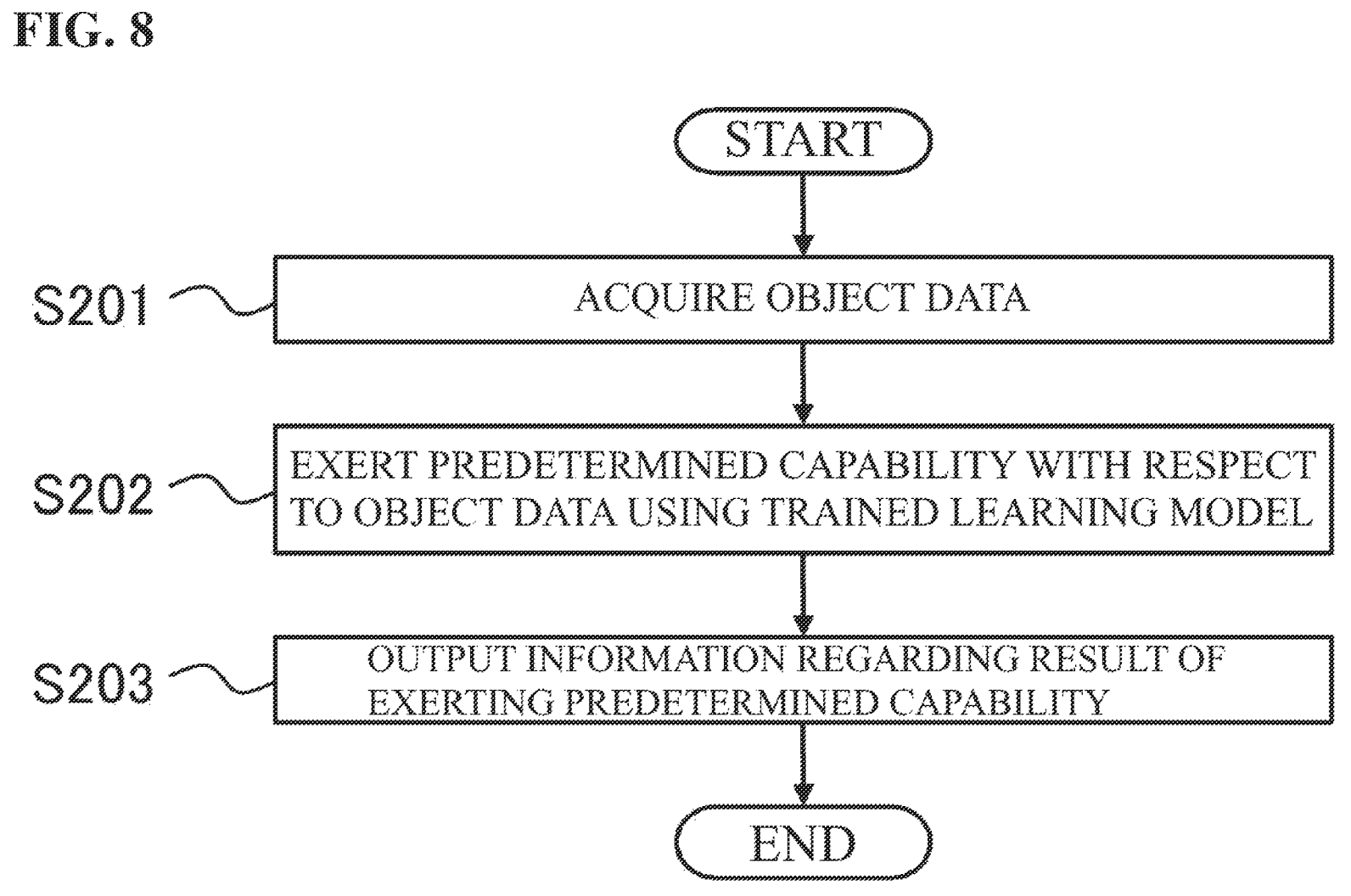

START

S201 ACQUIRE OBJECT DATA

S202 EXERT PREDETERMINED CAPABILITY WITH RESPECT TO OBJECT DATA USING TRAINED LEARNING MODEL

S203 OUTPUT INFORMATION REGARDING RESULT OF EXERTING PREDETERMINED CAPABILITY

END

FIG. 9

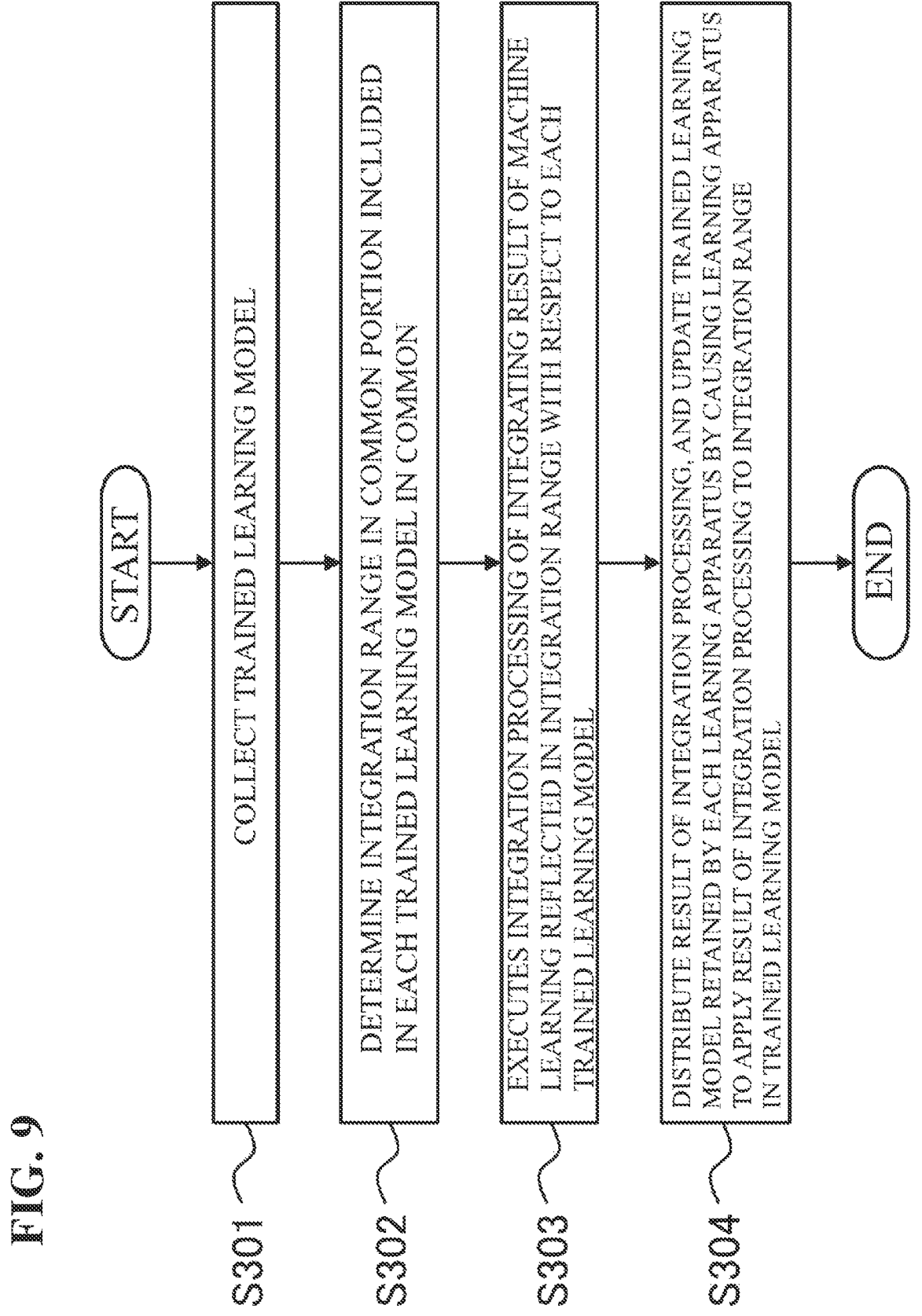

S301 — COLLECT TRAINED LEARNING MODEL

S302 — DETERMINE INTEGRATION RANGE IN COMMON PORTION INCLUDED IN EACH TRAINED LEARNING MODEL IN COMMON

S303 — EXECUTES INTEGRATION PROCESSING OF INTEGRATING RESULT OF MACHINE LEARNING REFLECTED IN INTEGRATION RANGE WITH RESPECT TO EACH TRAINED LEARNING MODEL

S304 — DISTRIBUTE RESULT OF INTEGRATION PROCESSING, AND UPDATE TRAINED LEARNING MODEL RETAINED BY EACH LEARNING APPARATUS BY CAUSING LEARNING APPARATUS TO APPLY RESULT OF INTEGRATION PROCESSING TO INTEGRATION RANGE IN TRAINED LEARNING MODEL

START

END

FIG. 15

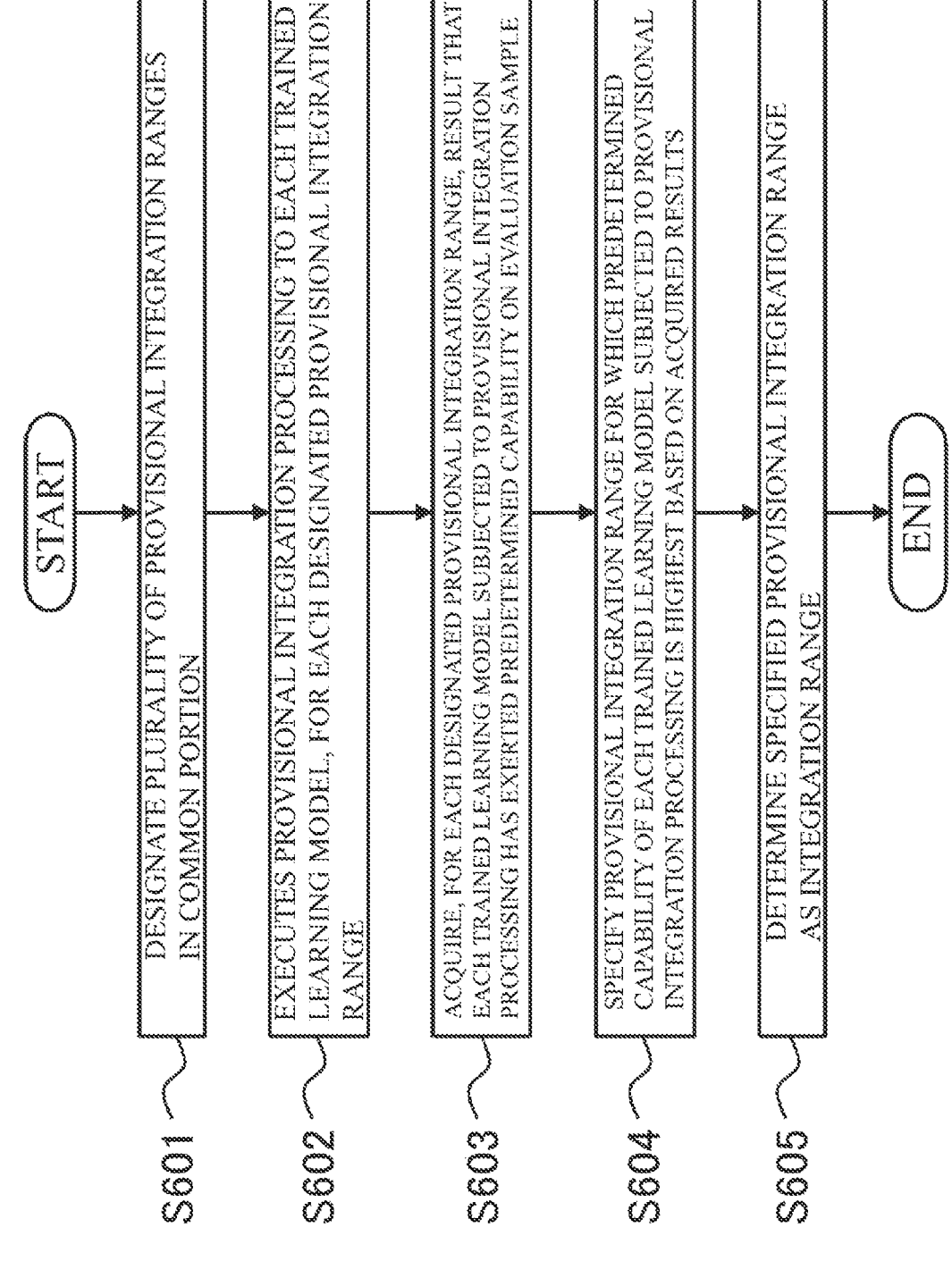

S601  DESIGNATE PLURALITY OF PROVISIONAL INTEGRATION RANGES IN COMMON PORTION

S602  EXECUTES PROVISIONAL INTEGRATION PROCESSING TO EACH TRAINED LEARNING MODEL, FOR EACH DESIGNATED PROVISIONAL INTEGRATION RANGE

S603  ACQUIRE, FOR EACH DESIGNATED PROVISIONAL INTEGRATION RANGE, RESULT THAT EACH TRAINED LEARNING MODEL SUBJECTED TO PROVISIONAL INTEGRATION PROCESSING HAS EXERTED PREDETERMINED CAPABILITY ON EVALUATION SAMPLE

S604  SPECIFY PROVISIONAL INTEGRATION RANGE FOR WHICH PREDETERMINED CAPABILITY OF EACH TRAINED LEARNING MODEL SUBJECTED TO PROVISIONAL INTEGRATION PROCESSING IS HIGHEST BASED ON ACQUIRED RESULTS

S605  DETERMINE SPECIFIED PROVISIONAL INTEGRATION RANGE AS INTEGRATION RANGE

START

END

FIG. 17

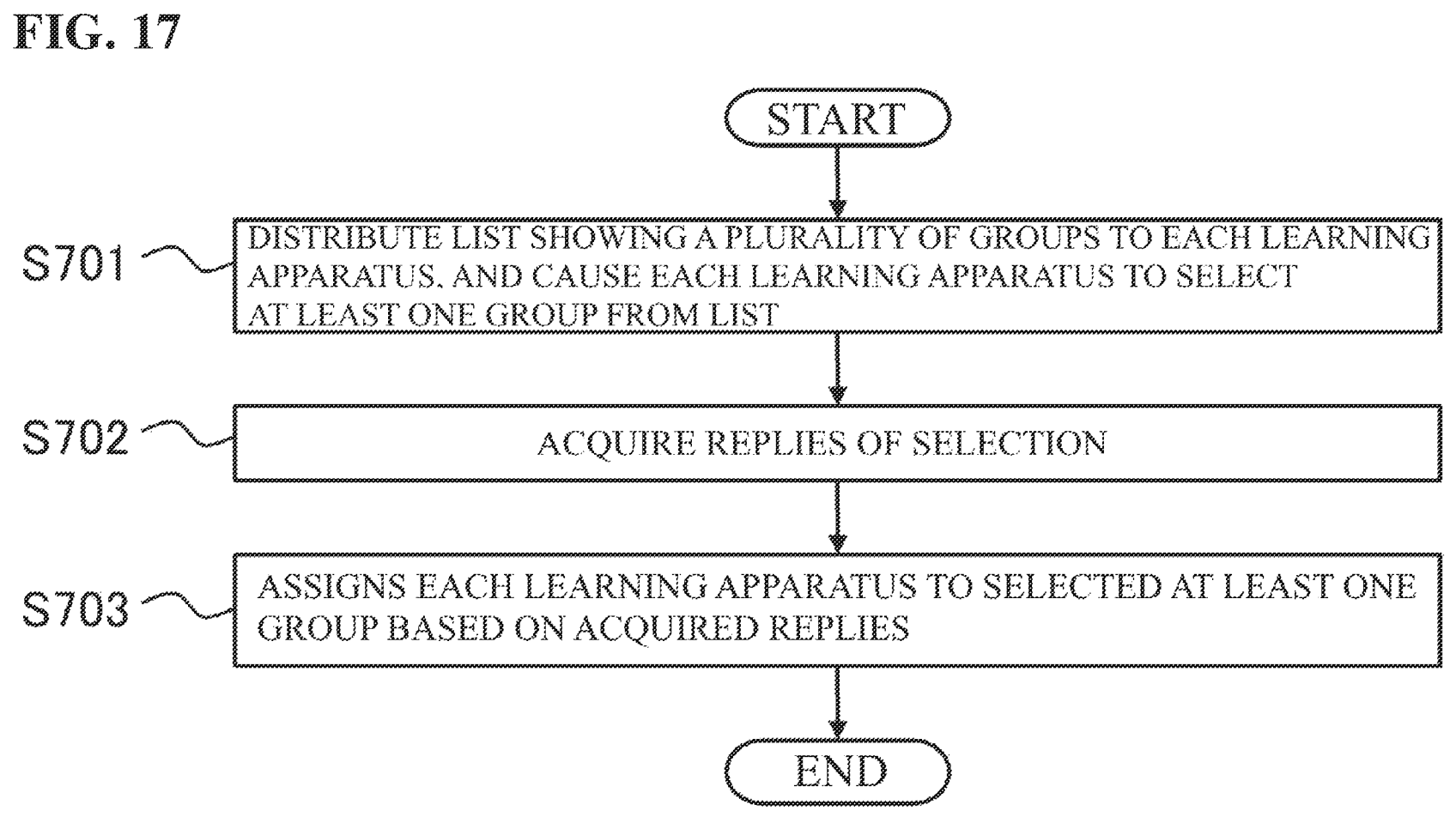

START

S701  DISTRIBUTE LIST SHOWING A PLURALITY OF GROUPS TO EACH LEARNING APPARATUS, AND CAUSE EACH LEARNING APPARATUS TO SELECT AT LEAST ONE GROUP FROM LIST

S702  ACQUIRE REPLIES OF SELECTION

S703  ASSIGNS EACH LEARNING APPARATUS TO SELECTED AT LEAST ONE GROUP BASED ON ACQUIRED REPLIES

END

FIG. 18

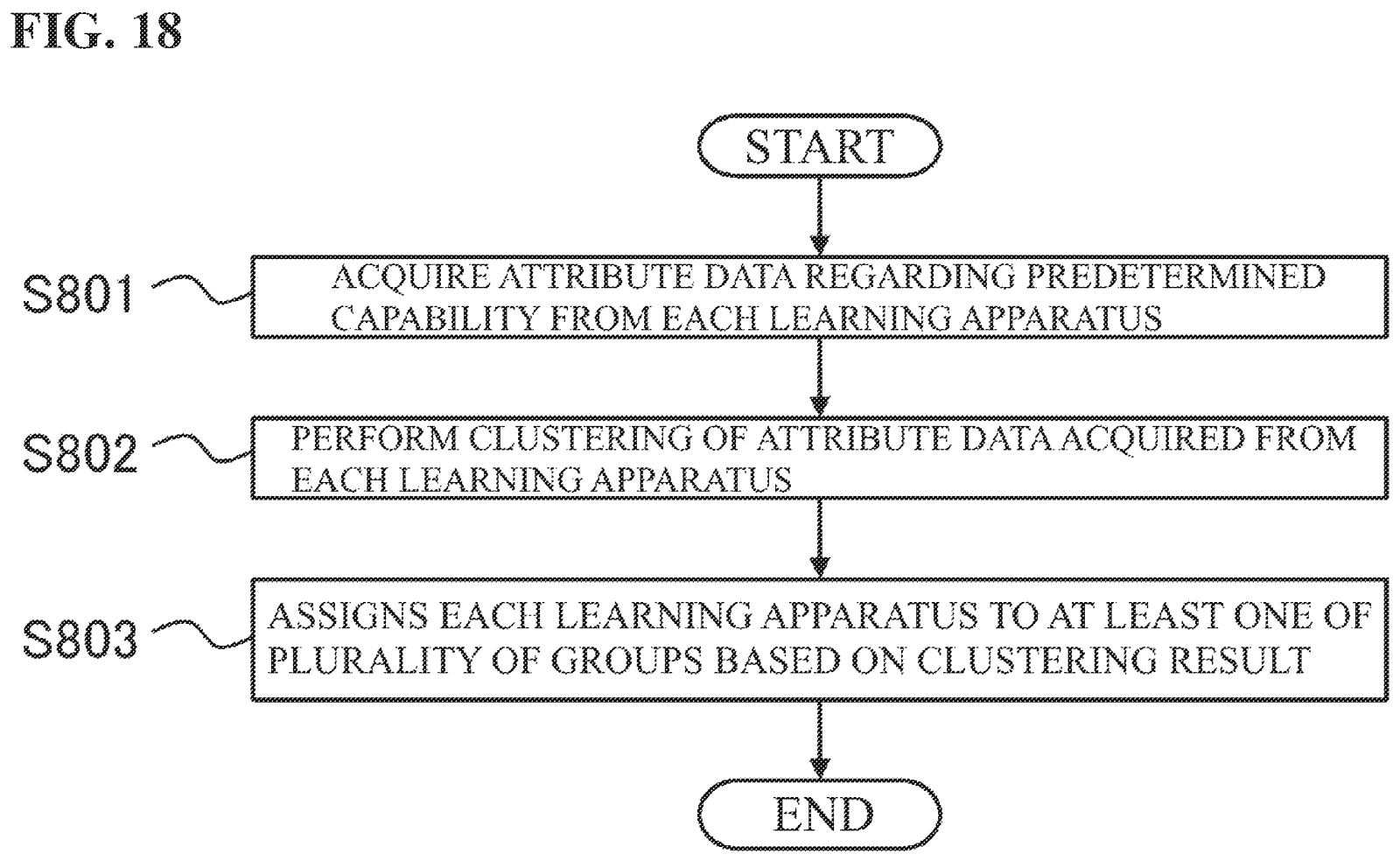

START

S801 — ACQUIRE ATTRIBUTE DATA REGARDING PREDETERMINED CAPABILITY FROM EACH LEARNING APPARATUS

S802 — PERFORM CLUSTERING OF ATTRIBUTE DATA ACQUIRED FROM EACH LEARNING APPARATUS

S803 — ASSIGNS EACH LEARNING APPARATUS TO AT LEAST ONE OF PLURALITY OF GROUPS BASED ON CLUSTERING RESULT

END

FIG. 19

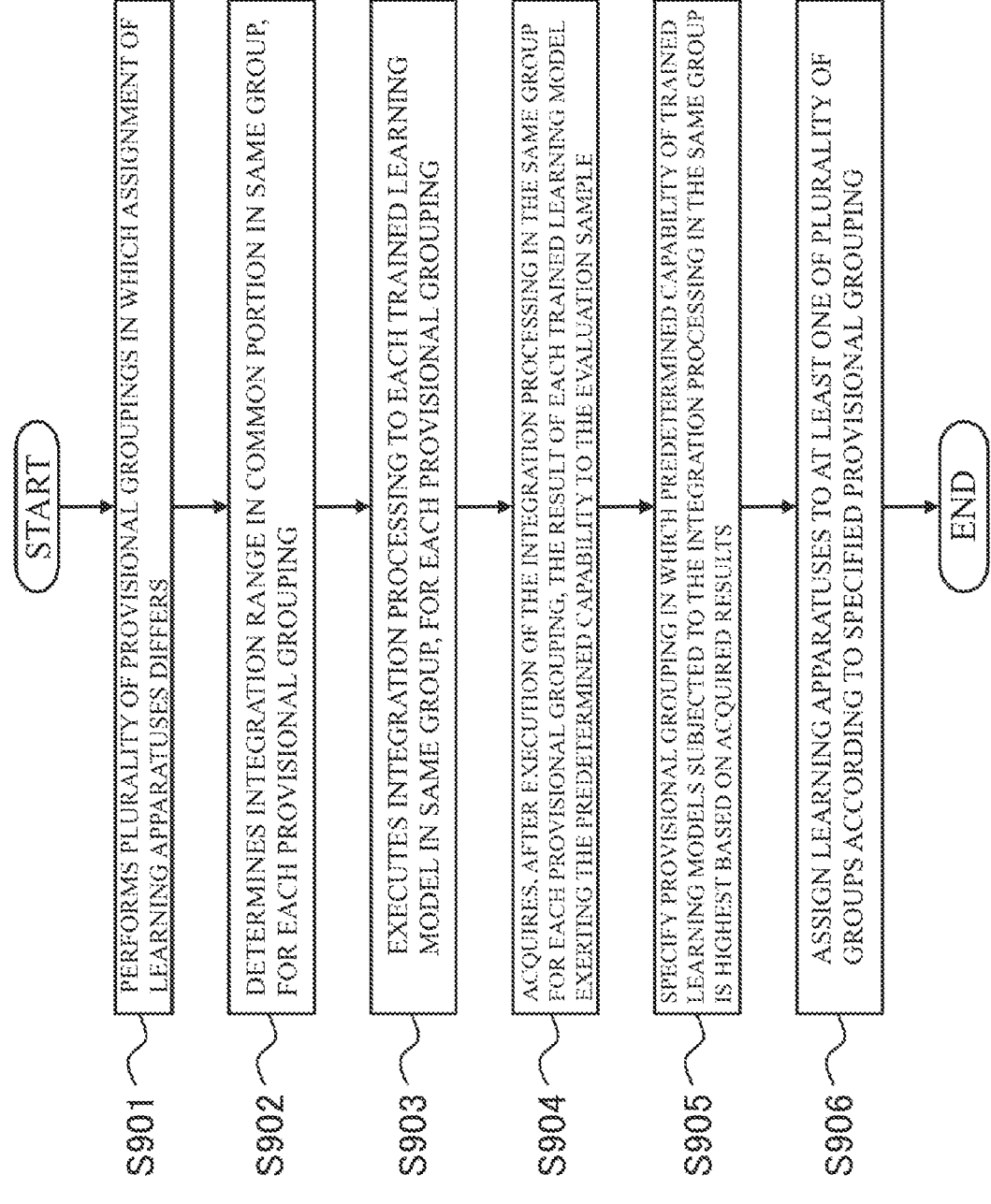

START

S901　PERFORMS PLURALITY OF PROVISIONAL GROUPINGS IN WHICH ASSIGNMENT OF LEARNING APPARATUSES DIFFERS

S902　DETERMINES INTEGRATION RANGE IN COMMON PORTION IN SAME GROUP, FOR EACH PROVISIONAL GROUPING

S903　EXECUTES INTEGRATION PROCESSING TO EACH TRAINED LEARNING MODEL IN SAME GROUP, FOR EACH PROVISIONAL GROUPING

S904　ACQUIRES, AFTER EXECUTION OF THE INTEGRATION PROCESSING IN THE SAME GROUP FOR EACH PROVISIONAL GROUPING, THE RESULT OF EACH TRAINED LEARNING MODEL EXERTING THE PREDETERMINED CAPABILITY TO THE EVALUATION SAMPLE

S905　SPECIFY PROVISIONAL GROUPING IN WHICH PREDETERMINED CAPABILITY OF TRAINED LEARNING MODELS SUBJECTED TO THE INTEGRATION PROCESSING IN THE SAME GROUP IS HIGHEST BASED ON ACQUIRED RESULTS

S906　ASSIGN LEARNING APPARATUSES TO AT LEAST ONE OF PLURALITY OF GROUPS ACCORDING TO SPECIFIED PROVISIONAL GROUPING

END

MODEL INTEGRATION APPARATUS, MODEL INTEGRATION METHOD, COMPUTER-READABLE STORAGE MEDIUM STORING A MODEL INTEGRATION PROGRAM, INFERENCE SYSTEM, INSPECTION SYSTEM, AND CONTROL SYSTEM

TECHNICAL FIELD

The present invention relates to a model integration apparatus, a model integration method, a model integration program, an inference system, an inspection system, and a control system.

RELATED ART

Heretofore, in scenarios such as production lines of producing products, a technique is used in which products to be produced are shot (photographed) by a shooting (photographing) apparatus, and the quality of the products are inspected based on the obtained image data. For example, Patent Document 1 proposes an inspection apparatus that determines whether an object to be inspected in an image is normal or anomalous based on a trained first neural network, and if it is determined that the object to be inspected is anomalous, classifies the type of the anomaly based on a trained second neural network.

RELATED ART DOCUMENT

Patent Document

Patent Document 1: JP 2012-026982A

SUMMARY

The inventors found that known inspection methods that use a learning model such as a neural network as described above have the following problem.

That is, there is a limit to the collection of learning data at individual sites, and therefore it is difficult to collect large volume learning data that is valuable for improving the inspection capability (e.g., data at the time when an anomaly occurs in the product) in a short period of time. Therefore, in order to solve this problem, it is conceivable that learning data obtained in many sites is gathered, and machine learning is performed using the gathered learning data, and with this, a trained learning model having a higher inspection capability is constructed.

However, individual sites may be independently operated based on their individual situation. At each site, learning data is basically collected irrespectively from other sites. Therefore, it is not necessarily the same object that is inspected at the various sites. Therefore, it is possible that original pieces of image data obtained in the various sites cannot be used for common machine learning, and what is more, the structures of the learning models to be used for machine learning in the respective sites are not necessarily the same. In addition, if large volume learning data obtained at individual site is gathered in a server, the cost of communication with the server is enormous. Also, the calculation cost of machine learning using the large amount of gathered learning data increases. Therefore, it is possible that problems occur such as shortage of memory used for calculation processing, lengthening of calculation processing time, and the calculation processing being not completed in a predetermined time.

As described above, there are various technical barriers in terms of gathering learning data in order to perform machine learning. Therefore, it is not realistic to construct a trained learning model having a higher inspection capability with this method for gathering learning data. Therefore, the inventors found that there is a problem that, with the known methods, the improvement of the inspection capability that the learning model is caused to acquire is limited. In other words, a trained learning model having a higher inspection capability is difficult to construct. Due to this, with the known methods, it is difficult to realize highly accurate visual inspection of products using image data.

Note that this problem is not specific to scenarios in which a learning model is caused to learn the capability of determining the state (quality) of a product. A similar problem occurs in any scenario in which a learning model is caused to learn a predetermined capability by machine learning using local learning data. Scenarios in which a learning model is caused to learn a predetermined capability includes a scenario in which a learning model is caused to learn the capability of determining a control instruction to be given to a cultivation apparatus of a plant according to the cultivation conditions of the plant, a scenario in which a learning model is caused to learn the capability of estimating the state of a driver from data obtained by observing the driver, a scenario in which a learning model is caused to learn the capability of estimating a power generation amount of a power generator from data regarding weather, a scenario in which a learning model is caused to learn the capability of estimating the health status of a subject from vital data of the subject, and so on. The local learning data that is used in these scenarios is image data, sound data, numerical data, text data, measurement data obtained by sensors, or the like. In these scenarios as well, it is difficult to collect large volume learning data that is valuable for improving the capability in a short period of time at individual site separately. Also, there are various technical barriers in terms of gathering learning data obtained in many sites in order to perform machine learning. Therefore, there is a problem in that it is difficult to construct a trained learning model having a higher capability, with the known methods.

In view of the foregoing situation, one or more embodiments may provide a technique for constructing a trained learning model having a higher capability.

A model integration apparatus model integration method, computer-readable storage medium storing a model integration program, inference system, inspection system, and control system according to one or more embodiments following configuration may solve the problem stated above.

That is, a model integration apparatus according to one or more embodiments may include: a model collecting unit configured to collect trained learning models from a plurality of learning apparatuses, wherein each of the plurality of learning apparatuses collects local learning data, and constructs a trained learning model that has acquired a predetermined capability by performing machine learning using the collected local learning data, the trained learning models each include a common portion having a common structure, and the trained learning models of some combination (i.e. at least one combination of the trained learning models) have different structures in a portion other than the common portion: an integration processing unit configured to execute integration processing of integrating the results of machine learning reflected in an integration range set in the common portion, with respect to the trained learning models; and a model updating unit configured to distribute a result of the integration processing to the learning apparatuses, and update the trained learning models retained by the learning apparatuses by causing the learning apparatuses to each apply the result of the integration processing to the integration range in the trained learning model.

The model integration apparatus according to the configuration collects trained learning models that are constructed by machine learning using local learning data from learning apparatuses, instead of the local learning data collected by the learning apparatuses. The trained learning model is configured to include a common portion having a common structure. That is, the trained learning models are configured to have a structure of the common portion in common. The model integration apparatus according to the configuration executes integration processing of integrating a result of machine learning reflected in an integration range set in the common portion, with respect to the trained learning models.

Therefore, in the configuration, instead of gathering the local learning data itself, trained learning models constructed by the learning apparatuses are collected, and integration processing is executed with respect to the collected trained learning models. Therefore, the communication cost and the calculation cost of the model integration apparatus can be kept low. Also, the integration processing is merely executed with respect to the integration range set in the common portion included in the trained learning models, and therefore the learning models are allowed to have different structures. That is, even if the learning models have different structures due to individual situation, the integration processing for the learning models can be executed, and with this integration processing, the result of machine learning reflected in one learning model can be appropriately reflected in the other learning models. Accordingly, the trained learning models subjected to the integration processing can also appropriately exert the predetermined capability on data that cannot be obtained by an individual learning apparatus, based on the results of machine learning in the other trained learning models. Therefore, according to the configuration, various problems that may occur in the aforementioned method for gathering learning data can be solved, and as a result, an environment for constructing a trained learning model having a higher capability can be realized.

Note that the learning model is a model that can acquire a predetermined capability by machine learning, and the type thereof may not be specifically limited, and may be selected as appropriate depending on the embodiment. A neural network or the like may be used for the learning model. The trained learning model may also be called differently depending on the application, such as an estimator or a discriminator. The type of the machine learning may not be specifically limited, and may be selected as appropriate depending on the embodiment. The local learning data is learning data that is used in machine learning of the learning model in the learning apparatus. The configuration of the local learning data may be selected as appropriate depending on the type of the learning model, the capability that the learning model is caused to acquire, or the like.

The predetermined capability is a capability of executing some information processing with respect to given data. The predetermined capability may not be specifically limited, and may be selected as appropriate depending on the embodiment. In one example, the predetermined capability is an inference capability of performing some estimation (regression or identification) with respect to unknown object data. The inference capability is a capability of estimating some feature included in unknown object data, for example. The feature may include any element that can be inferred from data. Examples of such inference capability are a capability of estimating the state (quality) of a product in an image of image data, a capability of determining the control instruction to be given to a cultivation apparatus according to the cultivation conditions of a plant, a capability of estimating the state of a driver from data obtained by observing the driver, a capability of estimating the power generation amount of a power generator from data regarding weather, and a capability of estimating the health status of a subject from vital data of the subject.

Also, the learning model includes computation parameters to be used for computation processing for exerting the predetermined capability. When the learning model is constituted by a neural network, the computation parameters are weights of connections between neurons, threshold values of the neurons, and the like. The result of machine learning is reflected in values of the computation parameters. In the integration processing, the results of machine learning reflected in an integration range of the learning models are integrated by performing integration regarding values of the computation parameters included in the integration range of the learning models. "model update" need only distribute the result of integration processing for updating the trained learning models, and need not include instructing the learning apparatuses to execute update processing.

A model integration apparatus according to above-described one or more embodiments may further include a range adjusting unit configured to determine the integration range in the common portion included in each of the collected trained learning models. According to a configuration, an appropriate integration range may be set to each learning model having a different structure, and with this, a trained learning model having a higher capability may be constructed.

In a model integration apparatus according to above-described one or more embodiments, the structure of each trained learning model may be given by a template, and the range adjusting unit may determine the integration range based on the template. According to a configuration, an appropriate integration range may be easily set to the learning models having different structures. Note that there is not limitation to the data format of the template, and may be determined as appropriate depending on the embodiment, as long as the template includes information for giving a model of the learning model. Also, the template may include information regarding initial values of the computation parameters of the learning model, in addition to information regarding the structure of the learning model. When the learning model is constituted by a neural network, an example of the structure of the learning model includes a number of layers in the neural network, the number of neurons (nodes) in each layer, and connection relationship between neurons in adjacent layers. Also, the weights of connections between neurons and the threshold values of the neurons are example of the computation parameters.

In a model integration apparatus according to above-described one or more embodiments, the common portion of each trained learning model may include a plurality of computation modules. Also, determining the integration range in the common portion may include: acquiring an output from each computation module included in the common portion by inputting an evaluation sample to each trained learning model, calculating at least one of similarity and correlation in the acquired output between the corresponding computation modules of the respective trained learning models, and designating the computation module for which at least one of the calculated similarity and correlation satisfies a predetermined condition as the integration range. According to a configuration, an appropriate integration range may be set to the learning models having a different structure. Note that each computation module may be constituted by at least one computation parameter. When the learning model is constituted by a neural network, each computation module may be constituted by a network from a first layer on the most input side to an Nth layer (N is a natural number of one or more).

In a model integration apparatus according to above-described one or more embodiments, the range adjusting unit may optimize the integration range such that that predetermined capability of the trained learning models improves after execution of the integration processing relative to that before execution of the integration processing. According to the configuration, the most suitable integration range may be set to the learning models having a different structure, and with this, a trained learning model having a higher capability may be constructed.

In a model integration apparatus according to above-described one or more embodiments, the range adjusting unit may designate a provisional integration range in the common portion, and the integration processing unit may execute integration processing of integrating results of the machine learning reflected in the designated provisional integration range, with respect to the trained learning models. Also, optimizing the integration range may include: acquiring a first result obtained by letting the trained learning models before execution of the integration processing exert the predetermined capability on an evaluation sample, acquiring a second result obtained by letting the trained learning models after execution of the integration processing exert the predetermined capability on the evaluation sample, determining whether or not the predetermined capability of the trained learning models improves after execution of the integration processing relative to that before execution of the integration processing, by comparing the first result with the second result, and determining the provisional integration range as integration range, if it is determined that the predetermined capability of the trained learning models improves after execution of the integration processing. According to a configuration, the most suitable integration range may be set to the learning models having a different structure, and with this, a trained learning model having a higher capability may be constructed.

In a model integration apparatus according to above-described one or more embodiments, the range adjusting unit may designate a plurality of provisional integration ranges in the common portion, and the integration processing unit may execute, for each provisional integration range, integration processing of integrating results of the machine learning reflected in the designated provisional integration range with respect to the trained learning models. Also, optimizing the integration range may include: acquiring, for each provisional integration range, a result obtained by letting the trained learning models after execution of the integration processing exert the predetermined capability on an evaluation sample, specifying a provisional integration range for which the predetermined capability of the trained learning models after execution of the integration processing is highest, based on the acquired results, and determining the specified provisional integration range as the integration range. According to a configuration, the most suitable integration range may be set to the learning models having a different structure, and with this, a trained learning model having a higher capability may be constructed.

A model integration apparatus according to above-described one or more embodiments may further include a grouping unit configured to assign each of the plurality of learning apparatuses to at least one of a plurality of groups. The model collecting unit may collect the trained learning models from a plurality of learning apparatuses belonging to the same group. The range adjusting unit may determine the integration range in a common portion included in each of the collected trained learning models in the same group. The integration processing unit may execute integration processing of integrating results of the machine learning reflected in the determined integration range, with respect to the trained learning models, in the same group. The model updating unit may distribute a result of the integration processing to the learning apparatuses, in the same group, and update the trained learning models retained by the learning apparatuses by causing the learning apparatuses to apply the result of the integration processing to the integration range in the trained learning models. According to a configuration, the learning apparatuses are classified into groups, and a trained learning model having a higher capability may be constructed for each group.

In the model integration apparatus according to the one aspect, the grouping unit may distribute a list of the plurality of groups to each learning apparatus, cause the learning apparatus to select at least one group from the plurality of groups on the list, and assign the learning apparatus to the selected at least one group. According to the configuration, the learning apparatuses can be classified into groups with a simple method.

In the model integration apparatus according to the one aspect, the grouping unit may acquire attribute data regarding the predetermined capability from each learning apparatus, perform clustering of the attribute data acquired from the learning apparatuses, and assign each of the plurality of learning apparatuses to at least one of the plurality of groups based on the clustering result. According to the configuration, the learning apparatuses can be classified into groups according to the attribute of learning model.

Note that the attribute data may also include any information regarding the predetermined capability, and may also include information indicating the type of the predetermined capability, information regarding the specification requested to the learning model, and the like. The information indicating the type of the predetermined capability may also include information for identifying the capability that the learning model for visual inspection, controlling a cultivation apparatus, or the like is caused to acquire. When the learning model is constituted by a neural network, as the number of layers in the neural network increases, while the accuracy of exerting the predetermined capability improves, the computation speed decreases because the calculation cost increases. That is, the structure of a learning model relates to the specification such as accuracy and computation speed of the learning model. Therefore, the information regarding the specification requested to the learning model may also include information regarding the structure of the learning model, such as accuracy and computation speed.

In a model integration apparatus according to above-described one or more aspects, the grouping unit may optimize the assignment of the learning apparatuses to the plurality of groups such that the predetermined capability of the trained learning models improves after execution of the integration processing relative to that before execution of the integration processing. According to a configuration, the learning apparatuses may be most suitably classified into groups, and with this, a trained learning model having a higher capability may be constructed for each group.

In a model integration apparatus according to above-described one or more aspects, the grouping unit may perform a plurality of provisional groupings that differ in assignment of the learning apparatuses to the plurality of groups. The range adjusting unit may determine, for each provisional grouping, the integration range in a common portion included in each collected trained learning model within the same group. The integration processing unit may execute, for each provisional grouping, integration processing of integrating results of the machine learning reflected in the determined integration range, with respect to the trained learning models in the same group. Also, optimizing the assignment of the learning apparatuses may include: acquiring, for each provisional grouping, a result obtained by letting the trained learning models after execution of the integration processing in the same group exert the predetermined capability on an evaluation sample, specifying a provisional grouping for which the predetermined capability of the trained learning models after execution of the integration processing is highest, in the same group, based on the acquired results, and assigning each of the plurality of learning apparatuses to at least one of the plurality of groups according to the specified provisional grouping. According to a configuration, the learning apparatuses may be most suitably classified into groups, and with this, a trained learning model having a higher capability may be constructed for each group.

In a model integration apparatus according to above-described one or more aspects, integrating results of the machine learning reflected in the integration range may include obtaining an average or a sum of values of a computation parameter included in the integration range. According to a configuration, integration may be appropriately performed with respect to the integration range of the trained learning models, and with this, a trained learning model having a higher capability may be constructed for each group.

A model integration apparatus according to above-described one or more embodiments may further include a weight setting unit that may set weights for the trained learning models, wherein the weights determine the priorities of the trained learning models in the integration processing. Also, integrating results of the machine learning reflected in the integration range may include obtaining an average or a sum of values of a computation parameter included in the integration range of the respective trained learning models, after subjecting the values to weighting using the set weights. According to a configuration, integration may be appropriately performed with respect to the integration range of the trained learning models, and with this, a trained learning model having a higher capability [can] may be constructed for each group.

In a model integration apparatus according to above-described one or more embodiments, the weight setting unit may set the weights such that the weight increases as the number of pieces of the local learning data used for the machine learning increases. According to a configuration, integration may be performed with respect to the integration range of the learning models such that reflection of the result of machine learning in which the number of pieces of used local learning data is large is prioritized, and with this, a trained learning model having a higher capability may be constructed for each group.

In a model integration apparatus according to above-described one or more embodiments, the local learning data may include specific learning data regarding a specific element of the predetermined capability, and the weight setting unit may set the weights such that the weight increases as the ratio of the specific learning data included in the local learning data used for the machine learning increases. According to a configuration, integration may be performed with respect to the integration range of the learning models such that reflection of the result of machine learning in which the ratio of specific learning data is high is prioritized, and with this, a trained learning model having a higher capability may be constructed for each group.

Note that the specific learning data is learning data regarding a specific element of the predetermined capability, of the local learning data. The specific element is not limited in particular, and may be selected from all elements regarding the predetermined capability. For example, in a scenario in which the learning model is caused to acquire a capability of performing visual inspection of a product in an image of image data, the specific element may be the fact of including a defect such as a stain, a smudge, and a flaw. In this case, the local learning data may be image data of an image of a product, and the specific learning data may be image data of an image of a product including a defect, of the local learning data.

In a model integration apparatus according to above-described one or more embodiments, integration of results of the machine learning reflected in the integration range may be performed by a secret calculation. According to a configuration, integration may be performed with respect to the integration range of the learning models, while securing the confidentiality of the result of machine learning in the learning models. Therefore, when learning data that is highly confidential is included in the local learning data obtained by the learning apparatuses, the confidentiality of the local learning data may be ensured.

As another aspect of the model integration apparatus according to one or more embodiments, aspect of the invention may also be an information processing method for realizing the configurations described above, a program, or a storage medium that may be read by a computer or the like, and stores such a program. Here, the storage medium that may be read by a computer or the like is a medium that stores information such as programs via an electrical, magnetic, optical, mechanical or chemical effect. Also, an inference system according to one or more embodiments may be constituted by the model integration apparatus according to any of the modes described above and a plurality of learning apparatuses.

For example, an inference system according to one or more embodiments may include a plurality of learning apparatuses, and a model integration apparatus. Each learning apparatus is configured to execute a step of collecting local learning data, and a step of constructing a trained learning model that has acquired a predetermined inference capability by machine learning using the collected local learning data. Each of the trained learning models includes a common portion having a common structure. The trained learning models of some combination have different structures in a portion other than the common portion. The model integration apparatus is configured to executes a step of collecting the trained learning models from the plurality of learning apparatuses, a step of executing integration processing of integrating results of the machine learning reflected in an integration range set in the common portion, with respect to the trained learning models, and a step of distributing a result of the integration processing to the learning apparatuses, and updating trained learning models retained by the learning apparatuses by causing the learning apparatuses to apply the result of the integration processing to the integration range in the trained learning models.

Also, for example, a model integration method according to one or more embodiments may be information processing method in which a computer executes: a step of collecting trained learning models from a plurality of learning apparatuses, wherein each of the plurality of learning apparatuses collects local learning data, and constructs a trained learning model that has acquired a predetermined capability by performing machine learning using the collected local learning data, each of the trained learning models includes a common portion having a common structure, and the trained learning models of some combination have different structures in a portion other than the common portion, a step of executing integration processing of integrating the results of machine learning reflected in an integration range set in the common portion, with respect to the trained learning models, and a step of distributing a result of the integration processing to the learning apparatuses, and updating the trained learning models retained by the learning apparatuses by causing the learning apparatuses to apply the result of the integration processing to the integration range in the trained learning models.

Also, for example, a non-transitory computer-readable storage medium storing a model integration program according to one or more embodiments may cause a computer to perform operations, which may include collecting trained learning models from a plurality of learning apparatuses, wherein each of the plurality of learning apparatuses collects local learning data, and constructs a trained learning model that has acquired a predetermined capability by performing machine learning using the collected local learning data, each of the trained learning models includes a common portion having a common structure, and the trained learning models of some combination have different structures in a portion other than the common portion, executing integration processing of integrating the results of machine learning reflected in an integration range set in the common portion, with respect to the trained learning models, and distributing a result of the integration processing to the learning apparatuses, and updating the trained learning models retained by the learning apparatuses by causing the learning apparatuses to apply the result of the integration processing to the integration range in the trained learning models.

One or more embodiments described above may be applied to any scenario in which a learning model is caused to learn a predetermined capability by machine learning. The modes described above may be applied to a scenario in which a learning model is caused to learn a capability of estimating the state (quality) of a product in an image of image data, a scenario in which a learning model is caused to learn a capability of determining a control instruction to be given to a cultivation apparatus of a plant according to the cultivation conditions of the plant, a scenario in which a learning model is caused to learn a capability of estimating the state of a driver from data obtained by observing the driver, a scenario in which a learning model is caused to learn a capability of estimating the power generation amount of a power generator from data regarding weather, a scenario in which a learning model is caused to learn a capability of estimating the health status of a subject from vital data of the subject, or the like. The predetermined data may be image data, sound data, numerical data, text data, measurement data obtained by a sensor, or the like.

For example, an image system according to one or more embodiments may include a plurality of learning apparatuses and a model integration apparatus. Each learning apparatus is configured to execute a step of collecting local learning data including image data, a step of constructing a trained learning model that has acquired a capability of estimating a predetermined feature from image data, by performing machine learning using the collected local learning data. Each trained learning model includes a common portion having a common structure. The trained learning models of some combination have different structures in a portion other than the common portion. The model integration apparatus is configured to execute a step of collecting the trained learning models from the plurality of learning apparatuses, a step of executing integration processing of integrating results of the machine learning reflected in an integration range set in the common portion, with respect to the trained learning models, and a step of distributing a result of the integration processing to the learning apparatuses, and updating trained learning models retained by the learning apparatuses by causing the learning apparatuses to apply the result of the integration processing to the integration range in the trained learning models.

For example, a sensor system according to one or more embodiments may include a plurality of learning apparatuses and a model integration apparatus. Each learning apparatus is configured to execute a step of collecting local learning data including sensing data obtained by a sensor, a step of constructing a trained learning model that has acquired a capability of estimating a predetermined feature from sensing data, by performing machine learning using the collected local learning data. The trained learning models includes a common portion having a common structure. The trained learning models of some combination have different structures in a portion other than the common portion. The model integration apparatus is configured to execute a step of collecting the trained learning models from the plurality of learning apparatuses, a step of executing integration processing of integrating results of the machine learning reflected in an integration range set in the common portion, with respect to the trained learning models, and a step of distributing a result of the integration processing to the learning apparatuses, and updating trained learning models retained by the learning apparatuses by causing the learning apparatuses to apply the result of the integration processing to the integration range in the trained learning models.

For example, an inspection system according to one or more embodiments may include a plurality of inspection apparatuses and a model integration apparatus, wherein each inspection apparatus may be configured to perform operations including collecting local learning data including image data of an image of a product, and constructing a trained learning model that has acquired a capability of determining a state of the product in an image of the image data by performing machine learning using the collected local learning data, each trained learning model includes a common portion having a common structure, the trained learning models of some combination have different structures in a portion other than the common portion, and the model integration apparatus may be configured to perform operations including collecting the trained learning models from the plurality of inspection apparatuses, a executing integration processing of integrating results of the machine learning reflected in an integration range set in the common portion, with respect to the trained learning models, and distributing a result of the integration processing to the inspection apparatuses, and updating trained learning models retained by the inspection apparatuses by causing the inspection apparatuses to apply the result of the integration processing to the integration range in the trained learning models.

Also, for example, a control system according to one or more embodiments may include a plurality of control apparatuses respectively connected to cultivation apparatuses that grows a plant by controlling a growth environment of the plant; and a model integration apparatus, wherein each control apparatus is configured to perform operations including collecting local learning data including a control instruction for instructing the corresponding cultivation apparatus to control the growth environment according to condition data regarding a cultivation condition of the plant and the cultivation condition, and constructing a trained learning model that has acquired a capability of determining a control instruction that is given to the cultivation apparatus according to a cultivation condition of the plant, by performing machine learning using the collected local learning data, each trained learning model includes a common portion having a common structure, the trained learning models of some combination have different structures in a portion other than the common portion, and the model integration apparatus is configured to execute collecting the trained learning models from the plurality of control apparatuses, executing integration processing of integrating results of the machine learning reflected in an integration range set in the common portion, with respect to the trained learning models, and distributing a result of the integration processing to the control apparatuses, and updating trained learning models retained by the control apparatuses by causing the control apparatuses to apply the result of the integration processing to the integration range in the trained learning models.

According to one or more embodiments, a trained learning model having a higher capability may be constructed.

BRIEF DESCRIPTION OF THE DRAWINGS

FIG. 5 is a schematic diagram illustrating an example of a configuration of assignment information according to one or more embodiments.

FIG. 6B is a schematic diagram illustrating an example of a software configuration for inference processing of a learning apparatus according to one or more embodiments.

FIG. 8 is a diagram illustrating an example of a processing procedure regarding exerting a predetermined capability by a learning apparatus according to one or more embodiments.

FIG. 9 is a diagram illustrating an example of a processing procedure of a model integration apparatus according to one or more embodiments.

FIG. 15 is a diagram illustrating an example of a processing procedure for determining an integration range by a model integration apparatus according to one or more embodiments.

FIG. 17 is a diagram illustrating an example of a processing procedure relating to grouping of learning apparatuses by a model integration apparatus according to one or more embodiments.

FIG. 18 is a diagram illustrating an example of a processing procedure relating to grouping of learning apparatuses by a model integration apparatus according to one or more embodiments.

FIG. 19 is a diagram illustrating an example of a processing procedure regarding grouping of learning apparatuses by a model integration apparatus according to one or more embodiments.

DETAILED DESCRIPTION

Hereinafter, an embodiment according to one aspect of the present invention (also referred to as "the present embodiment" below) will be described based on the drawings. However, the embodiment described below is merely an example of the present invention in every respect. Needless to say, various improvements and modifications may be made without departing from the scope of the present invention. That is to say, to implement the present invention, a specific configuration corresponding to that implementation may also be employed as appropriate. Note that, although data that is used in the embodiment is described using natural language, more specifically, the data is defined by pseudo-language, such data may be given by commands, parameters, machine language, or the like that can be recognized by a computer.

1. Application Example

Figure 1:
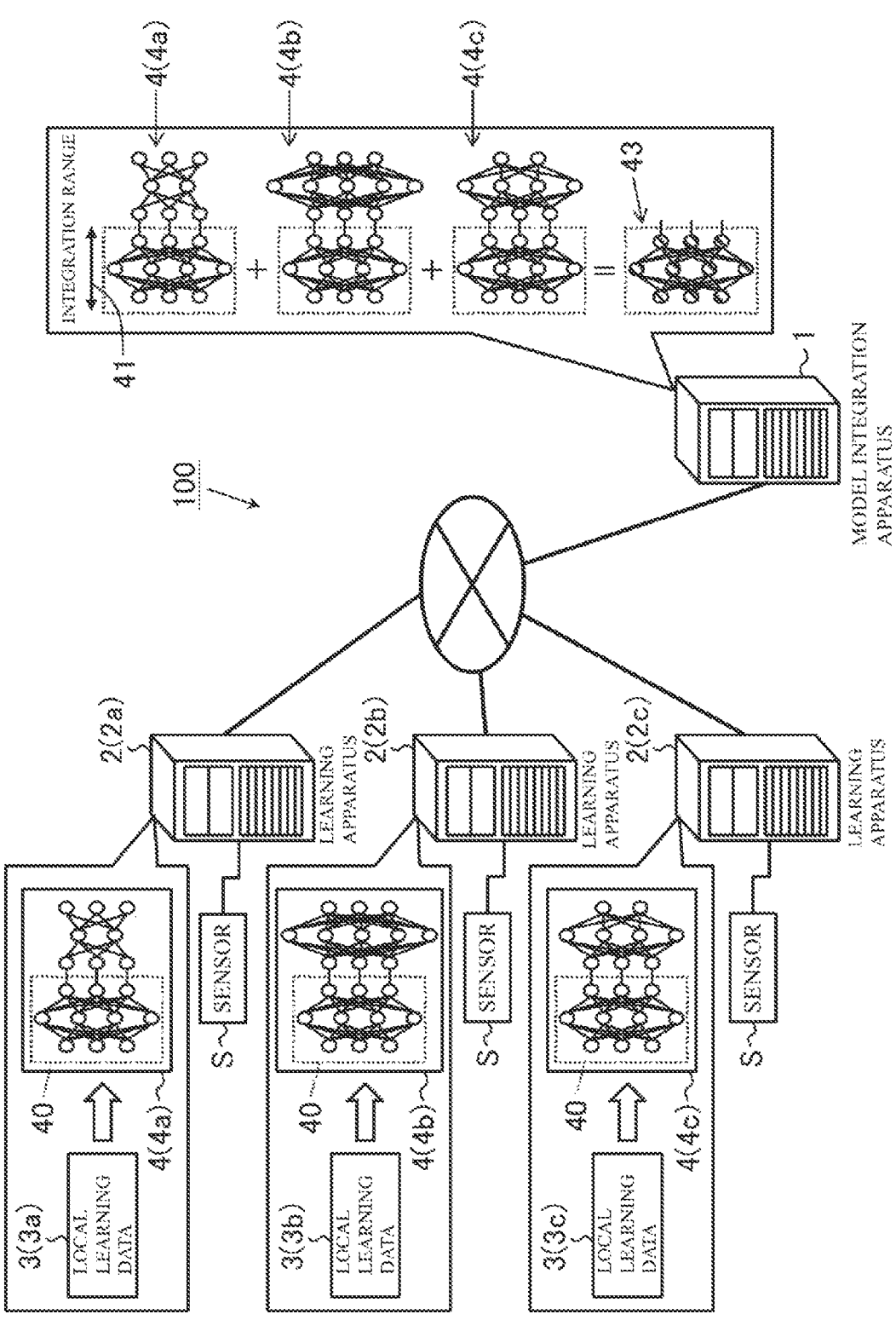
FIG. 1 is a schematic diagram illustrating an example of a scene to which one or more embodiments are applied.

First, an example of a scenario to which the present invention is applied will be described using FIG. 1. FIG. 1 schematically illustrates an example of the scenario to which the present invention is applied. As illustrated in FIG. 1, an inference system 100 according to the present embodiment includes a model integration apparatus 1 and a plurality of learning apparatuses 2. The model integration apparatus 1 and the learning apparatuses 2 may be connected to each other via a network. The type of the network may be selected as appropriate from the Internet, a wireless communication network, a mobile communication network, a telephone network, a dedicated network, and the like.

Each learning apparatus 2 according to the present embodiment is a computer configured to execute machine learning of a learning model 4 using local learning data 3. Specifically, each learning apparatus 2 according to the present embodiment collects local learning data 3. Also, each learning apparatus 2 according to the present embodiment constructs a trained learning model 4 that has acquired a predetermined capability by performing machine learning using the collected local learning data 3.

The predetermined capability is a capability of executing some information processing with respect to given data. The predetermined capability is not limited in particular, and may be selected as appropriate depending on the embodiment. The predetermined capability may be an inference capability of performing some estimation (regression or identification) with respect to unknown object data, for example. The inference capability may be a capability of estimating some feature included in the unknown object data, for example. The feature may be any element that can be inferred from the data. Examples of this inference capability are a capability of estimating the state (quality) of a product in an image of image data, a capability of determining the control instructions to be given to a cultivation apparatus according to the cultivation conditions of a plant, a capability of estimating the state of a driver from data obtained by observing the driver, a capability of estimating the power generation amount of a power generator from data regarding weather, and a capability of estimating the health status of a subject from vital data of the subject.

In the present embodiment, the learning apparatuses 2 cause the learning models 4 to learn the capability of inferring some feature included in sensing data obtained by the sensor S, as their predetermined capability. The sensor S may be a camera, a microphone, a photometer, a thermometer, a hygrometer, a vital sensor, or the like. For example, a camera that shoots appearances of products may be adopted as the sensor S. In this case, the sensing data may be image data of an image of the product, and the capability of inferring some feature may be a capability of estimating the state (quality) of the product in the image of the image data. The learning apparatuses 2 infer features included in sensing data obtained by the sensors S using the trained learning models 4.

The learning models 4 are models that can acquire the predetermined capability by machine learning, and there is no particular limitation to the model type, which may be selected as appropriate depending on the embodiment. The type of the machine learning is not limited in particular, and may be selected as appropriate depending on the embodiment. As shown in FIG. 1, in the present embodiment, each learning model 4 is constituted by a neural network. The trained learning model 4 may also be called differently depending on the application, such as "estimator" or "discriminator". The local learning data 3 is learning data that is used in the learning apparatus 2 for machine learning of the learning model 4. The configuration of the local learning data 3 may be selected as appropriate depending on the type of the learning model 4, the capability that the learning model 4 is caused to acquire, or the like.

The learning apparatuses 2 may be arranged at separate sites, and used by different users, for example. Each learning apparatus 2 may construct a trained learning model 4 for the purpose of inference according to its individual situation. Note that the arrangement and the user of the learning apparatus 2 are not limited in particular, and may be selected as appropriate depending on the embodiment. For example, at least some learning apparatuses 2 may be arranged at the same site and used by the same user.

In the present embodiment, the trained learning models 4 are configured to include a common portion 40 having a common structure. That is, the trained learning models 4 are configured to have the structure of the common portion 40. The trained learning models 4 of some combination have different structures apart from the common portion 40. The structure of the learning model 4 may be determined as appropriate depending on the type of a predetermined capability that the learning model 4 is caused to acquire, the needed specification of the learning model 4, and so on. For example, to improve the performance while sacrificing the calculation speed, the number of layers of the neural network that constitutes a learning model 4 may be set to a comparatively large number. On the other hand, to increase the calculation speed while sacrificing the performance, the number of layers of the neural network that constitutes a learning model 4 may be set to a comparatively small number.

In the example in FIG. 1, three learning apparatuses 2a to 2c are present. In the following, for the sake of description, further reference signs such as a, b, and c are added when the learning apparatuses are distinguished, and when the learning apparatuses are not distinguished, these reference signs are omitted such as "learning apparatus 2". The learning apparatuses 2a to 2c respectively collect local learning data 3a to 3c, and construct the trained learning models 4a to 4c by performing machine learning using the obtained local learning data 3a to 3c. In the example in FIG. 1, the trained learning models 4a to 4c are constituted by respective six-layer neural networks, and the number of neurons (nodes) and the connection relationship are the same in the networks of the first to third layers on the input side. On the other hand, in the networks of the other fourth to sixth layers, the number of neurons and their connection relationship are different. Therefore, the network of the first to third layers is the common portion 40.

Note that the number of learning apparatuses 2 and the configurations of the learning models 4 is not limited to this example, and may be determined as appropriate depending on the embodiment. The number of learning apparatuses 2 may be two or four or more. The structure of the neural network is not limited to the six-layer neural network. Also, in the example in FIG. 1, the overall structures of the learning models 4a to 4c are different. However, the relationship between the learning models 4 is not limited to this example, and as long as the learning models 4 of some combination have different structures apart from the common portion 40, the overall structures of the learning models 4 of the other combinations may be the same.

In contrast, the model integration apparatus 1 according to the present embodiment collects the trained learning models 4 from the learning apparatuses 2. Next, the model integration apparatus 1 according to the present embodiment executes integration processing of integrating the results of machine learning that are reflected in an integration range 41 set in the common portion 40, with respect to the collected trained learning models 4. The model integration apparatus 1 according to the present embodiment distributes a result 43 of the integration processing to the learning apparatuses 2, and updates the trained learning models 4 retained by the learning apparatuses 2 by causing the learning apparatuses 2 to apply the result of integration processing to the integration range 41 in the trained learning models 4.

In FIG. 1, a scenario is illustrated in which the network of the first to third layers is set as the integration range 41, and integration processing of performing integration with respect to this integration range 41 has been executed with respect to the trained learning models 4a to 4c. The result 43 of the integration processing is obtained by performing integration with respect to the values of the computation parameters, with respect to each of the neurons included in the first to third layers. The model integration apparatus 1 updates the trained learning models 4a to 4c by causing the learning apparatuses 2a to 2c to apply the result 43 of integration processing to the computation parameters of the neurons included in the first to third layers.

As described above, in the present embodiment, instead of gathering the local learning data 3 itself, the trained learning models 4 constructed by the respective learning apparatuses 2 are collected, and integration processing is executed with respect to the collected trained learning models 4. Therefore, the communication cost and calculation cost incurred in the model integration apparatus 1 can be kept low. Also, the integration processing is merely executed with respect to the integration range 41 set as the common portion 40 included in the trained learning models 4, and therefore the structures of the learning models 4 are allowed to be different. For example, in the example in FIG. 1, the learning models 4a to 4c have different structures in a portion other than the common portion 40. That is, even if the format of the local learning data 3 and the structure of the learning model 4 are not the same, the integration processing can be executed with respect to the trained learning models 4.

Also, with this integration processing, the result of machine learning as reflected in one trained learning model 4 can be appropriately reflected in the other trained learning models 4. Accordingly, a trained learning model 4 subjected to the integration processing can appropriately exert a predetermined capability on data that may not be obtained by the individual learning apparatus 2 as well, based on the results of machine learning in the other trained learning models 4. For example, the result of machine learning with the local learning data 3b that has been used to construct another trained learning model 4b is reflected in the trained learning model 4a subjected to the integration processing. With this, the trained learning model 4a subjected to the integration processing can appropriately exert the predetermined capability on data that is not included in the local learning data 3a, but is included in the local learning data 3b. Therefore, according to the present embodiment, an environment for constructing a trained learning model 4 having a higher capability can be realized.

2. Exemplary Configuration

[Hardware Configuration]
<Model Integration Apparatus>

Figure 2:
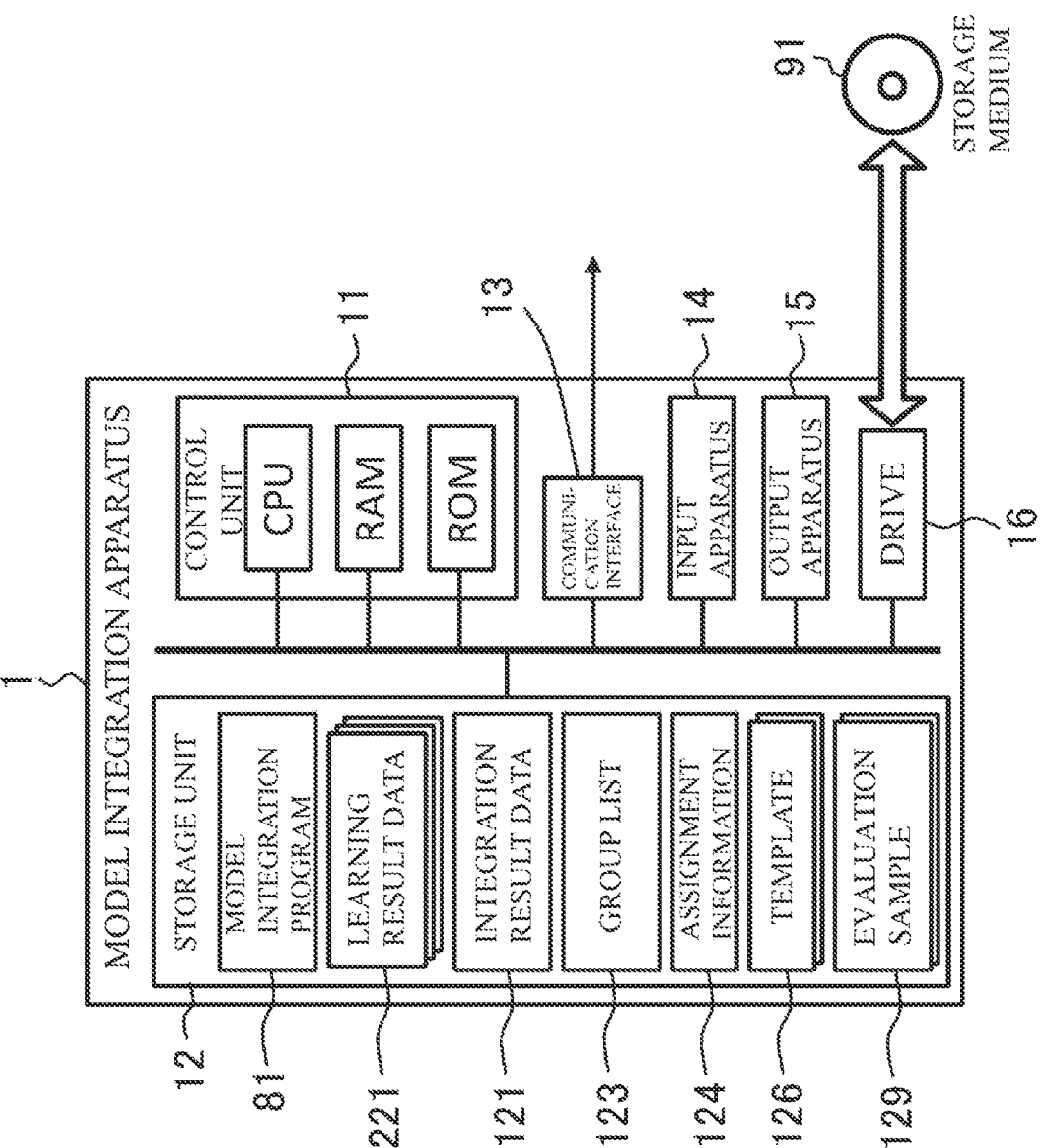
FIG. 2 is a schematic diagram illustrating an example of a hardware configuration of a model integration apparatus according to one or more embodiments.

Next, an example of the hardware configuration of the model integration apparatus 1 according to the present embodiment will be described using FIG. 2. FIG. 2 schematically illustrates an example of the hardware configuration of the model integration apparatus 1 according to the present embodiment.

As shown in FIG. 2, the model integration apparatus 1 according to the present embodiment is a computer in which a control unit 11, a storage unit 12, a communication interface 13, an input apparatus 14, an output apparatus 15, and a drive 16 are electrically connected. Note that, in FIG. 2, the communication interface is denoted as "communication I/F".

The control unit 11 includes a CPU (central processing unit), which is a hardware processor, a RAM (random access memory), ROM (read only memory), and the like, and is configured to execute information processing based on a program and various types of data. The storage unit 12 is an example of a memory, and is constituted by a hard disk drive, a solid-state drive, or the like. In the present embodiment, the storage unit 12 stores a wide variety of information such as a model integration program 81, a plurality of pieces of learning result data 221, a group list 123, assignment information 124, a template 126, and an evaluation sample 129.

The model integration program 81 is a program with which the model integration apparatus 1 executes later-described information processing (FIGS. 9, 11, 13, 15, 17 to 19) relating to integration of the learning models 4. The model integration program 81 includes a series of commands of this information processing. The learning result data 221 indicates information relating to the trained learning models 4 constructed by machine learning. The integration result data 121 indicates the result 43 of the integration processing. The integration result data 121 is obtained as a result of executing the model integration program 81. The group list 123 is a list of a plurality of groups that are candidates to which the learning apparatuses 2 are assigned. The assignment information 124 represents the correspondence relationship between the learning apparatuses 2 and the groups. The templates 126 provide boilerplates for the structure of the learning models 4. The learning apparatuses 2 may also use the templates 126 when determining the structure of the learning models 4. The evaluation samples 129 are used to evaluate the capability of the trained learning models 4 subjected to the integration processing. This will be described later in more detail.

The communication interface 13 is a wired LAN (Local Area Network) module, a wireless LAN module, or the like, and is an interface for performing wired or wireless communication via a network. The model integration apparatus 1 can perform data communication with another information processing apparatus (e.g. the learning apparatuses 2) via the network by using the communication interface 13.

The input apparatus 14 is an apparatus for performing input, such as a mouse or a keyboard. Also, the output apparatus 15 is an apparatus for performing output, such as a display, a speaker, or the like. An operator can operate the model integration apparatus 1 by using the input apparatus 14 and the output apparatus 15.

The drive 16 is a CD drive, a DVD drive, or the like, and is a drive apparatus for reading a program stored in a storage medium 91. The type of the drive 16 may be selected as appropriate depending on the type of the storage medium 91. At least one of the aforementioned model integration program 81, plurality of pieces of learning result data 221, group list 123, assignment information 124, template 126, and evaluation sample 129 may be stored in the storage medium 91.

The storage medium 91 is a medium that stores information such as programs via an electrical, magnetic, optical, mechanical or chemical effect such that the stored information, such as the programs, can be read by an apparatus or a machine such as a computer. The model integration apparatus 1 may acquire at least one of the aforementioned model integration program 81, plurality of pieces of learning result data 221, group list 123, assignment information 124, templates 126, and evaluation samples 129 from the storage medium 91.

Here, in FIG. 2, a disk-type storage medium such as a CD or a DVD is illustrated as an example of the storage medium 91. However, the type of the storage medium 91 is not limited to the disk type, and may be a medium other than a disk-type medium. Media other than disk-type media include semiconductor memories such as flash memories, for example.

Note that, regarding the specific hardware configuration of the model integration apparatus 1, constituent elements can be omitted, replaced, and added as appropriate depending on the embodiment. For example, the control unit 11 may also include a plurality of hardware processors. The hardware processors may also be constituted by a microprocessor, an FPGA (field-programmable gate array), a DSP (digital signal processor), and the like. The storage unit 12 may be constituted by the RAM and ROM included in the control unit 11. At least one of the communication interface 13, the input apparatus 14, the output apparatus 15, and the drive 16 may be omitted. The model integration apparatus 1 may also be constituted by a plurality of computers. In this case, the hardware configuration of the computers may be the same, or may not be the same. Also, the model integration apparatus 1 may not only be a general-purpose server apparatus, a PC (Personal Computer), or the like, but also an information processing apparatus that is specifically designed for the service to be provided.

<Learning Apparatus>

Figure 3:
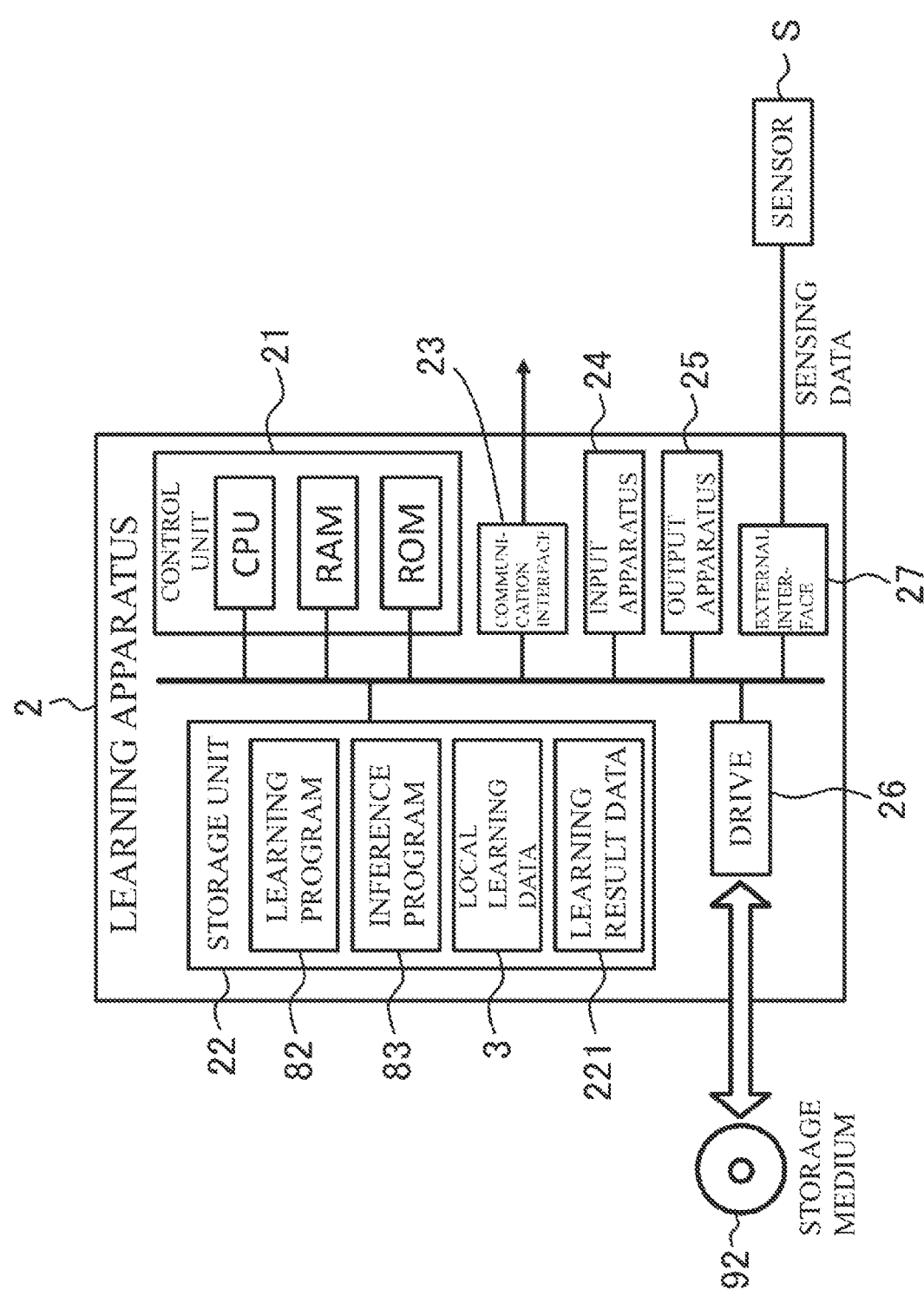
FIG. 3 is a schematic diagram illustrating an example of a hardware configuration of a learning apparatus according to one or more embodiments.

Next, an example of the hardware configuration of the learning apparatuses 2 according to the present embodiment will be described using FIG. 3. FIG. 3 schematically illustrates an example of the hardware configuration of the learning apparatuses 2 according to the present embodiment.

As shown in FIG. 3, each learning apparatus 2 according to the present embodiment is a computer in which a control unit 21, a storage unit 22, a communication interface 23, an input apparatus 24, an output apparatus 25, a drive 26, and an external interface 27 are electrically connected. Note that, in FIG. 3, the communication interface and the external interface are respectively denoted as "communication I/F" and "external I/F".

The units from the control unit 21 to the drive 26 of each learning apparatus 2 may be configured similarly to the units from the control unit 11 to the drive 16 of the model integration apparatus 1 described above. That is, the control unit 21 includes a CPU, which is a hardware processor, a RAM, ROM, and the like, and is configured to execute information processing based on a program and data. The storage unit 22 is constituted by a hard disk drive, a solid-state drive, or the like. The storage unit 22 stores various types of information such as a learning program 82, an inference program 83, local learning data 3, and learning result data 221.

The learning program 82 is a program with which the learning apparatus 2 executes later-described information processing (FIG. 7) relating to machine learning of the learning model 4. The learning program 82 includes a series of commands of this information processing. The learning result data 221 is obtained as a result of executing the learning program 82. Also, the inference program 83 is a program with which the learning apparatus 2 executes later-described information processing (FIG. 8) regarding predetermined inference using the trained learning model 4. The inference program 83 includes a series of commands of this information processing. The local learning data 3 is used for machine learning of causing the learning model 4 to acquire the predetermined capability. The details will be described later.

The communication interface 23 is a wired LAN module, a wireless LAN module, or the like, and is an interface for performing wired or wireless communication via a network. Each learning apparatus 2 can perform data communication with another information processing apparatus (e.g. the model integration apparatus 1) via the network by using the communication interface 23.

The input apparatus 24 is an apparatus for performing input, such as a mouse or a keyboard. Also, the output apparatus 25 is an apparatus for performing output, such as a display, a speaker, or the like. An operator can operate learning apparatus 2 by using the input apparatus 24 and the output apparatus 25.

The drive 26 is a CD drive, a DVD drive, or the like, and is a drive apparatus for reading a program stored in a storage medium 92. At least one of the aforementioned learning program 82, inference program 83, and local learning data 3 may be stored in the storage medium 92. Also, each learning apparatus 2 may acquire at least one of the aforementioned learning program 82, inference program 83, and local learning data 3 from the storage medium 92.

The external interface 27 is a USB (universal serial bus) port, a dedicated port, or the like, and is an interface for connecting to an external apparatus. The type and the number of external interfaces 27 may be selected as appropriate depending on the type and the number of external apparatuses to be connected. In the present embodiment, each learning apparatus 2 is connected to the sensor S via the external interface 27. With this, each learning apparatus 2 is configured to acquire sensing data with respect to which a predetermined inference is executed from the sensor S. Note that the configuration for acquiring the sensing data is not limited to this example, and may be determined as appropriate depending on the embodiment. For example, when the sensor S includes a communication interface, each learning apparatus 2 may also be connected to the sensor S via the communication interface 23 instead of the external interface 27.

Note that, as far as the specific hardware configuration of the learning apparatuses 2 is concerned, constituent elements can also be omitted, replaced, and added as appropriate depending on the embodiment. For example, the control unit 21 may include a plurality of hardware processors. The hardware processors may be constituted by a microprocessor, an FPGA, a DSP, and the like. The storage unit 22 may be constituted by the RAM and ROM included in the control unit 21. At least one of the communication interface 23, the input apparatus 24, the output apparatus 25, the drive 26, and the external interface 27 may be omitted. Each learning apparatus 2 may be constituted by a plurality of computers. In this case, the hardware configuration of the computers may be the same, or may not be the same. In the present embodiment, the hardware configuration of the learning apparatuses 2 is the same. However, the relationship of hardware configurations of the respective learning apparatuses 2 is not limited to this example. The hardware configuration may be different between one learning apparatus 2 and another learning apparatus 2. Each learning apparatus 2 may not only be a general-purpose server device, a general-purpose PC, or the like, but also an information processing apparatus that is specifically designed for the service to be provided.

[Software Configuration]
<Model Integration Apparatus>

Figure 4:
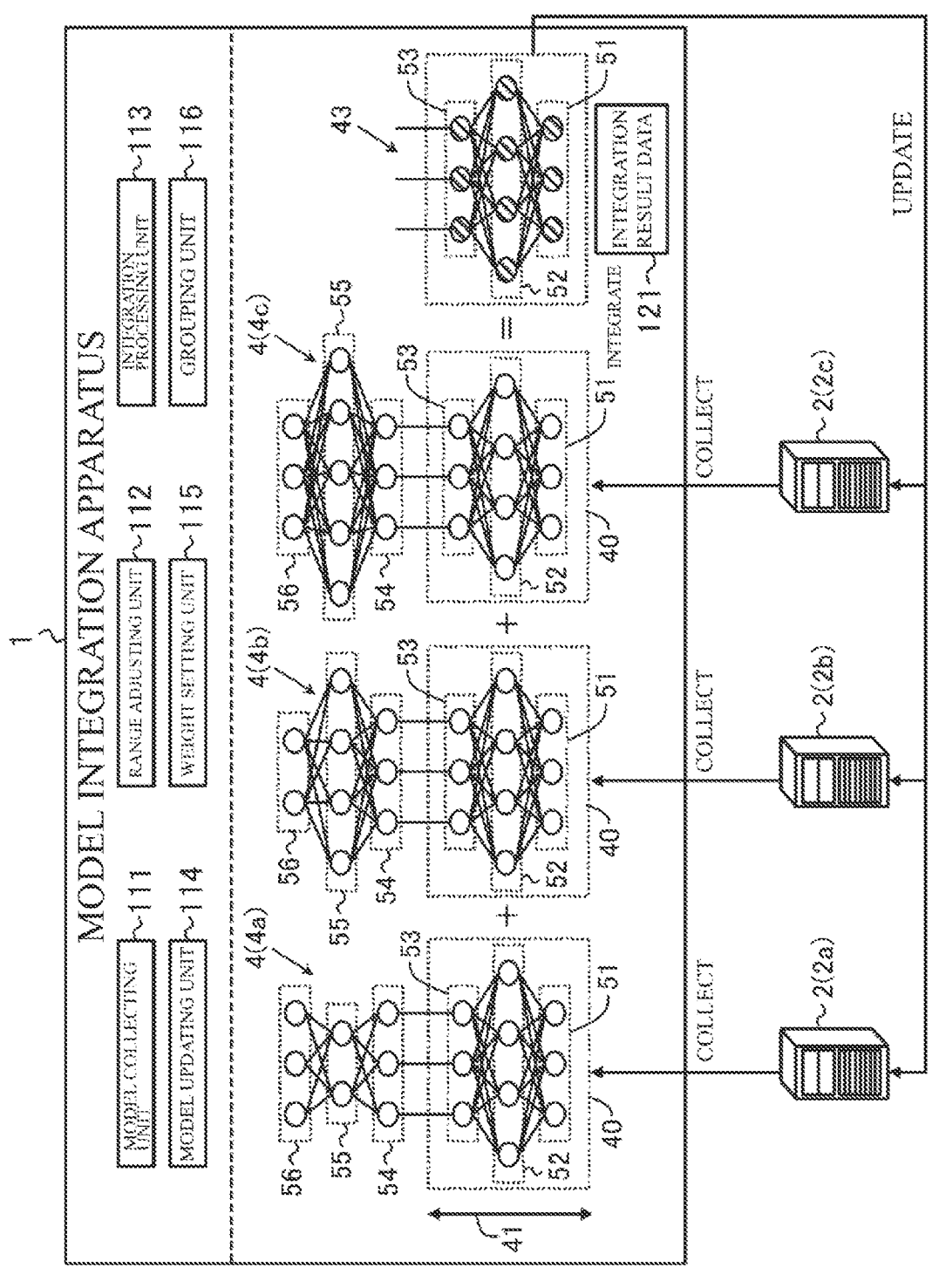
FIG. 4 is a schematic diagram illustrating an example of a software configuration of a model integration apparatus according to one or more embodiments.

Next, an example of the software configuration of the model integration apparatus 1 according to the present embodiment will be described using FIG. 4. FIG. 4 schematically illustrates an example of the software configuration of the model integration apparatus 1 according to the present embodiment.

The control unit 11 of the model integration apparatus 1 deploys the model integration program 81 stored in the storage unit 12 in the RAM. Then, the control unit 11 controls each constituent element by the CPU interpreting and executing the model integration program 81 deployed in the RAM. With this, as shown in FIG. 4, the model integration apparatus 1 according to the present embodiment operates as a computer including a model collecting unit 111, a range adjusting unit 112, an integration processing unit 113, a model updating unit 114, a weight setting unit 115, and a grouping unit 116, as software modules. That is, in the present embodiment, each software module of the model integration apparatus 1 is realized by the control unit 11 (CPU).

The model collecting unit 111 collects the trained learning models 4 from the learning apparatuses 2. The range adjusting unit 112 determines the integration range 41 within the common portion 40 included in the collected trained learning models 4. The integration processing unit 113 executes the integration processing of integrating the results of machine learning reflected in the integration range 41 set in the common portion 40, with respect to the trained learning models 4. The model updating unit 114 distributes the integration result data 121 indicating the result 43 of integration processing to the learning apparatuses 2, and updates the trained learning models 4 retained (held) by the learning apparatuses 2 by causing the learning apparatuses 2 to apply the result 43 of integration processing to the integration range 41 in the trained learning models 4. Note that "model update" need only include distributing the result 43 of integration processing for updating the trained learning model 4, and need not include instructing the learning apparatus 2 to execute the update processing.

The weight setting unit 115 sets weights with respect to the respective trained learning models 4. The weights determine the priorities of the respective trained learning models 4 in the integration processing. In accordance therewith, integrating the results of machine learning reflected in the integration range 41 may include calculating the average or total sum after giving weights to the values of the computation parameters included in the integration ranges 41 of the trained learning models 4, using the set weights.

The grouping unit 116 assigns each learning apparatus 2 to at least one of the plurality of groups. In accordance therewith, the model collecting unit 111 may collect the trained learning models 4 from a plurality of learning apparatuses 2 belonging to the same group. The range adjusting unit 112 may determine, in the same group, the integration range 41 within the common portion 40 included in the collected trained learning models 4. The integration processing unit 113 may also execute integration processing of integrating the results of machine learning reflected in the determined integration range 41, with respect to the trained learning models 4 in the same group. The model updating unit 114 may also distribute the result 43 of integration processing to the learning apparatuses 2, in the same group, and update the trained learning models 4 retained by the learning apparatuses 2 by causing the learning apparatuses 2 to apply the result 43 of integration processing to the integration range 41 in the trained learning models 4. Note that the integration processing in a group may also be executed across a plurality of groups. That is, the integration processing unit 113 may execute, after executing the integration processing with respect to the trained learning models 4 in one group, the integration processing with respect to the trained learning models 4 in another group to which a learning apparatus 2 belonging to the one group belongs, using the result 43 of integration processing. In this case, different ranges between the one group and another group may also be set as the integration range 41.

In correspondence therewith, the integration range 41 regarding which the integration processing is executed in one group may also be different from the integration range 41 regarding which the integration processing is executed in another group. In the present embodiment, the grouping unit 116 stores the result of assigning the learning apparatuses 2 to the groups in the assignment information 124.

FIG. 5 schematically illustrates a data configuration of the assignment information 124 according to the present embodiment. In the present embodiment, the assignment information 124 is structured in a table format, and each record (row data) includes a "user ID" field and a "group ID" field. In the "user ID" field, information for identifying each learning apparatus 2 is stored, and in the "group ID" field, information for identifying the group to which the learning apparatus 2 of interest is assigned is stored. One record shows one assignment result. Note that the data configuration of the assignment information 124 is not limited to this example, and may be determined as appropriated depending on the embodiment.

(Learning Model)

Next, an example of the learning model 4 will be described. As shown in FIG. 4, in the present embodiment, the learning model 4 is constituted by a neural network. Specifically, the learning model 4 is constituted by a neural network having a six-layer structure, and includes an input layer 51, intermediate (hidden) layers 52 to 55, and an output layer 56, in this order from the input side. Note that the structure of the learning model 4 is not limited to this example, and may be determined as appropriate in each learning apparatus 2. For example, the number of intermediate layers included in the learning model 4 is not limited to four, and may also be three or less or five or more.

The numbers of neurons included in the respective layers 51 to 56 may be selected as appropriate depending on the embodiment. Neurons in the adjacent layers are appropriately connected, and a weight (connection load) is set to each connection. A threshold value is set to each neuron, and basically, the output of each neuron is determined based on whether or not the sum of products of inputs and respective weights exceeds the threshold value. The weights of connections between neurons included in the layers 51 to 56 and the threshold value of each neuron are examples of the computation parameters of the learning model. Note that the number of neurons included in the respective layers 51 to 56 and the connection relationship between adjacent layers, shown in FIG. 4, are merely examples for the sake of description, and do not limit the present invention and the present embodiment.

In the example in FIG. 4, a scenario in which the model collecting unit 111 has collected the trained learning models 4a to 4c from the respective three learning apparatuses 2a to 2c is envisioned. In the trained learning models 4a to 4c, the number of neurons and the connection relationship with adjacent layers are the same in the network from the input layer 51 (first layer) to the intermediate layer 53 (third layer). On the other hand, the number of neurons and the connection relationship are different in the network from the intermediate layer 54 (fourth layer) to the output layer 56 (sixth layer). Therefore, the network from the input layer 51 to the intermediate layer 53 is the common portion 40.

The range adjusting unit 112 can determine the range (integration range 41) to which the integration processing is applied as the range (common portion 40) from the input layer 51 to the intermediate layer 53. In the example in FIG. 4, a scenario in which the range adjusting unit 112 has determined the range from the input layer 51 to the intermediate layer 53 as the integration range 41 is envisioned. The result of machine learning is reflected in the values of the computation parameters included in each learning model 4. Therefore, the integration processing unit 113 integrates the results of machine learning reflected in the integration ranges 41 of the respective learning models 4, by integrating the values of the computation parameters included in the integration ranges 41 of the respective learning models 4.

The model updating unit 114 distributes the integration result data 121 indicating the result 43 of integration processing to the learning apparatuses 2a to 2c, and causes the learning apparatuses 2a to 2c to apply the result 43 of integration processing to the integration ranges 41 in the respective trained learning models 4a to 4c. That is, the model updating unit 114 causes the learning apparatuses 2a to 2c to replace the values of the parameters in the integration range 41 with the values of the parameters obtained by the integration processing. With this, the model updating unit 114 updates the trained learning models 4a to 4c retained by the respective learning apparatuses 2a to 2c.

<Learning Apparatus>

(A) Learning Processing

Figure 6A:
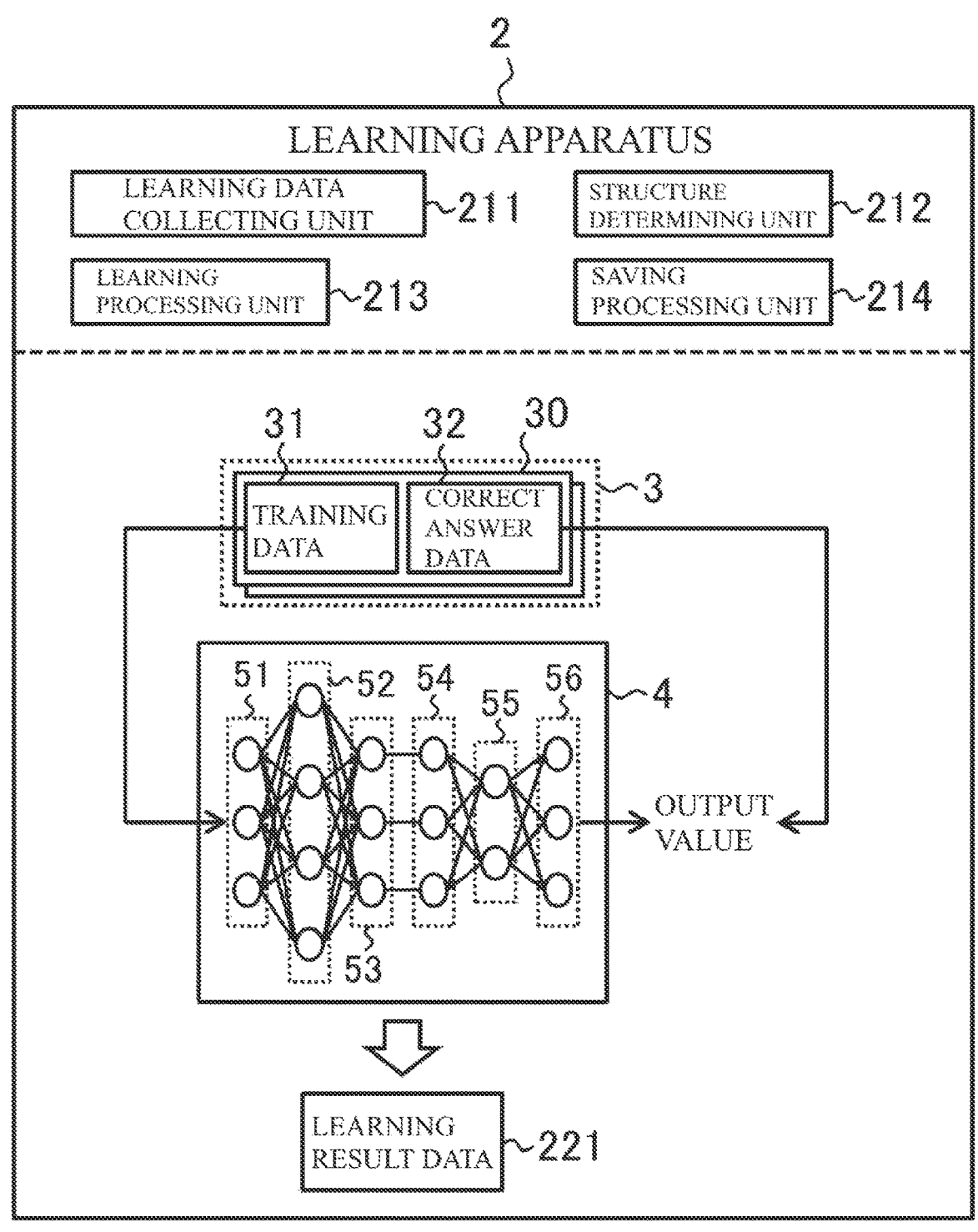
FIG. 6A is a schematic diagram illustrating an example of a software configuration for machine learning of a learning apparatus according to one or more embodiments.

Next, an example of the software configuration for the learning processing of the learning apparatuses 2 according to the present embodiment will be described using FIG. 6A. FIG. 6A schematically illustrates an example of the software configuration for the learning processing of the learning apparatuses 2 according to the present embodiment.

The control unit 21 of each learning apparatus 2 deploys the learning program 82 stored in the storage unit 22 in the RAM. Then, the control unit 21 controls each constituent element by the CPU interpreting and executing the learning program 82 deployed in the RAM. With this, each learning apparatus 2 according to the present embodiment operates as a computer including a learning data collecting unit 211, a structure determining unit 212, a learning processing unit 213, and a saving processing unit 214, as software modules, as shown in FIG. 6A. That is, in the present embodiment, each software module relating to the learning processing of the learning apparatuses 2 is realized by the control unit 21 (CPU).

The learning data collecting unit 211 collects the local learning data 3 to be used for machine learning of the learning model 4. In the present embodiment, the learning model 4 is constituted by a neural network, and therefore, the local learning data 3 is constituted by a plurality of learning data sets 30 that each include a combination of training data 31 and correct answer data 32. The training data 31 (input data) is data on which a predetermined capability is to be exerted. The correct answer data 32 (training data) is data indicating the result (correct answer) of exerting the predetermined capability on the training data 31. The correct answer data 32 may also be referred to as a label.

The training data 31 and correct answer data 32 may be selected as appropriate depending on the predetermined capability that the learning model 4 is caused to learn. For example, when the learning model 4 is caused to learn a capability of estimating the state (quality) of a product in an image of the image data as its predetermined capability, the training data 31 may be constituted by image data of images of a product, and the correct answer data 32 may be constituted by data indicating the state (quality) of the product. In the present embodiment, the learning model 4 is caused to learn the capability of inferring some feature included in the sensing data obtained by the sensor S as its predetermined capability. Therefore, the training data 31 is data of the same type as the sensing data obtained by the sensor S, and the correct answer data 32 is data indicating the correct answer of inference regarding the feature included in the training data 31.

The structure determining unit 212 determines the structure of the learning model 4. The structure of the learning model 4 defines the computation processing using the computation parameters. The structure of the learning model 4 may be appropriately defined according to the type of the learning model 4. In the present embodiment, the learning model 4 is constituted by a neural network. Therefore, the structure of the learning model 4 may be defined by the number of layers of the neural network, the number of neurons included in each layer, the connection relationship between the layers, and the like. In each learning apparatus 2, the structure of the learning model 4 may be determined as appropriate. As a result, each learning model 4 may be configured to include the common portion 40 having a common structure. Also, the learning models 4 of some combination may be configured to include different structures in a portion other than the common portion 40.

The learning processing unit 213 constructs a trained learning model 4 that has acquired a predetermined capability by performing machine learning using the collected local learning data 3. In the present embodiment, the learning processing unit 213 trains the learning model 4 by machine learning such that when the training data 31 is input, an output value corresponding to the correct answer data 32 is output. With this, s trained learning model 4 that has acquired the predetermined capability is constructed.

The saving processing unit 214 saves information regarding the constructed trained learning model 4 in a predetermined storage area. In the present embodiment, the saving processing unit 214 generates information indicating the structure and computation parameters of the trained learning model 4 (neural network) that is constructed by the machine learning, as the learning result data 221, and saves the generated learning result data 221 in a predetermined storage area.

(B) Inference Processing

Next, an example of a software configuration for the inference processing of the learning apparatuses 2 according to the present embodiment is explained using FIG. 6B. FIG. 6B schematically illustrates an example of the software configuration for the inference processing of the learning apparatuses 2 according to the present embodiment.

The control unit 21 of each learning apparatus 2 deploys the inference program 83 stored in the storage unit 22 in the RAM. Also, the control unit 21 controls the constituent elements by the CPU interpreting and executing the inference program 83 deployed in the RAM. With this, each learning apparatus 2 according to the present embodiment operates as a computer including an object data acquiring unit 216, an inference unit 217, and an output unit 218 as software modules, as shown in FIG. 6B. That is, in the present embodiment, the software modules for the inference processing of the learning apparatuses 2 are realized by the control unit 21 (CPU).

The object data acquiring unit 216 acquires object data 225 on which the predetermined capability is exerted that the trained learning model 4 has been caused to learn. In the present embodiment, the object data acquiring unit 216 acquires the object data 225 from the sensor S. The inference unit 217 includes the trained learning model 4 by retaining the learning result data 221. The inference unit 217 infers features included in the object data 225 using the trained learning model 4. Specifically, the inference unit 217 configures the settings of the trained learning model 4 by referring to the learning result data 221. Next, the inference unit 217 inputs the acquired object data 225 to the input layer 51 of the trained learning model 4, and executes the computation processing of the trained learning model 4. With this, the inference unit 217 acquires an output value corresponding to the result of inferring a feature included in the object data 225 from the output layer 56 of the trained learning model 4. In the present embodiment, obtaining this output value corresponds to exerting the predetermined capability. Note that this "inferring" may be either of deriving a discrete value (e.g., a class corresponding to a specific feature) by grouping (classification, identification) or deriving a continuous value (e.g., probability that a specific feature is present) by regression, for example. The output unit 218 outputs information representing the result of inference of a feature.

OTHER CONSIDERATIONS

The software modules of the model integration apparatus 1 and the learning apparatuses 2 will be described in detail in a later-described exemplary operation. Note that, in the present embodiment, an example is described in which the software modules of the model integration apparatus 1 and the learning apparatuses 2 are realized by a general-purpose CPU. However, some of or all of the software modules described above may be realized by at least one dedicated processor. Also, regarding the software configuration of the model integration apparatus 1 and the learning apparatuses 2, software modules may also be omitted, replaced, and added as appropriate depending on the embodiment.

3. Exemplary Operation

[Learning Apparatus]
(A) Learning Processing

Figure 7:
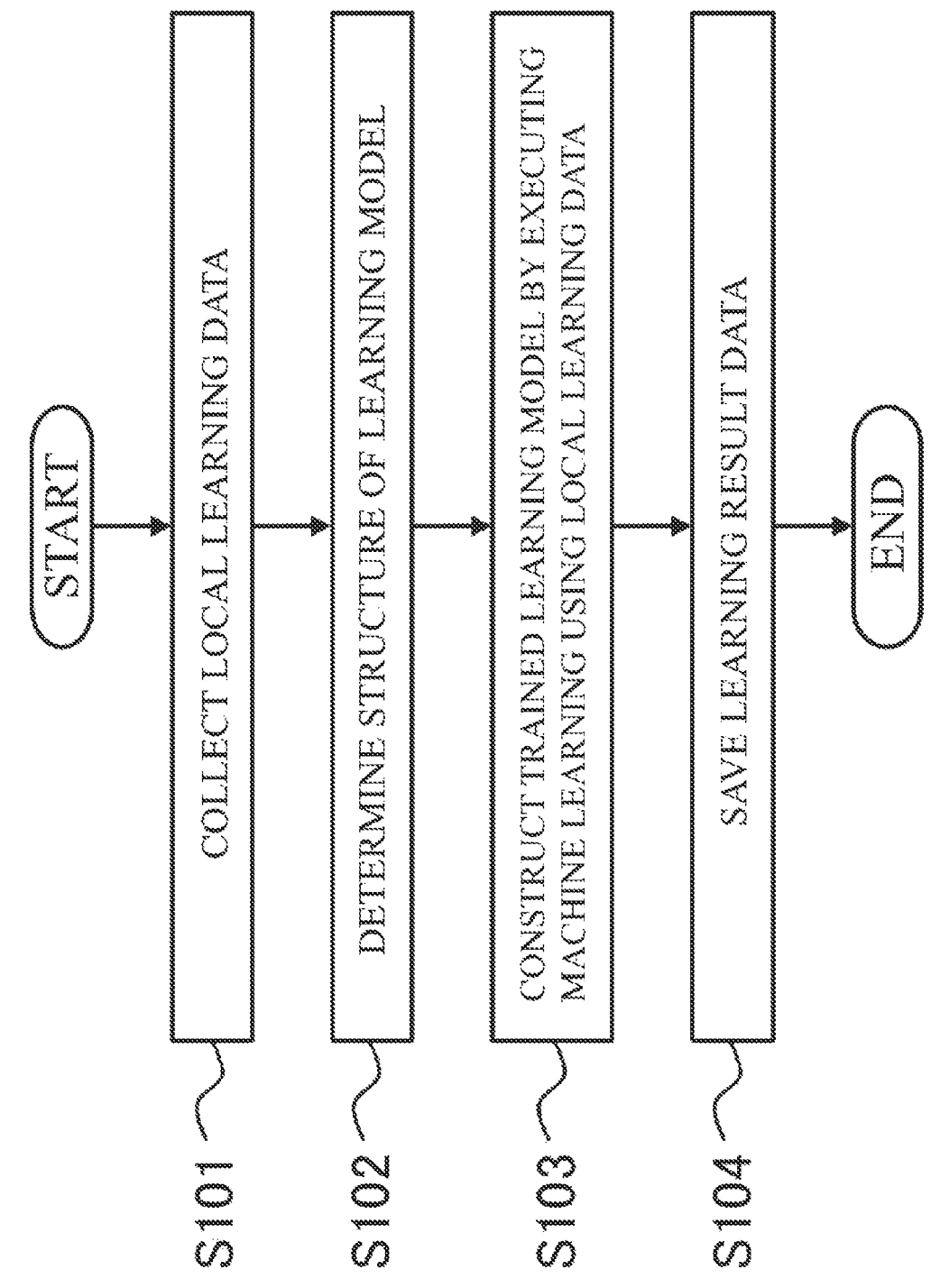
FIG. 7 is a diagram illustrating an example of a processing procedure of machine learning by a learning apparatus according to one or more embodiments.

Next, an exemplary operation of the learning apparatuses 2 relating to the machine learning will be described using FIG. 7. FIG. 7 is a flowchart illustrating an example of the processing procedure relating to the machine learning by the learning apparatuses 2. Note that the processing procedures to be described in the following are merely examples, and each step may be modified to the extent possible. Moreover, in the processing procedure described below, steps may also be omitted, replaced, or added as appropriate depending on the embodiment.

(Step S101)

In step S101, the control unit 21 operates as the learning data collecting unit 211, and collects the local learning data 3 to be used for machine learning of the learning model 4. In the present embodiment, the control unit 21 collects a plurality of learning data sets 30 that each include a combination of training data 31 and correct answer data 32, as the local learning data 3.

The method for acquiring the learning data sets 30 is not limited in particular, and may be selected as appropriate depending on the embodiment. For example, a sensor of the same type as the sensor S is prepared, and observation is performed under various conditions by the prepared sensor, and with this, the training data 31 can be acquired. Also, the acquired training data 31 is associated with correct answer data 32 that indicates the feature appearing in the training data 31. With this, the learning data sets 30 can be generated.

The learning data sets 30 may be automatically generated by the operation of a computer, or may be manually generated by operator's manipulation. Also, the learning data sets 30 may be generated by the learning apparatuses 2, or may be generated by a computer other than the learning apparatuses 2. When the learning data sets 30 are generated by the learning apparatuses 2, the control units 21 may collect the local learning data 3 constituted by a plurality of learning data sets 30 automatically, or by manually executing the series of processing described above by operator's manipulation via the input apparatuses 24. On the other hand, when the learning data sets 30 are generated by another computer, the control units 21 may also collect the local learning data 3 constituted by a plurality of learning data sets 30 generated by the other computer via a network, a storage medium 92, or the like.

The number of learning data sets 30 to be collected is not limited in particular, and may be selected as appropriate depending on the embodiment. Upon collecting the local learning data 3, the control unit 21 advances the processing to the next step S102.

(Step S102)

In step S102, the control unit 21 operates as the structure determining unit 212, and determines the structure of the learning model 4. In the present embodiment, the learning model 4 is constituted by a neural network. Therefore, in this step S102, the control unit 21 determines the structure of a neural network that constitutes the learning model 4. The structure of a neural network is defined by the number of layers in the neural network, the number of neurons included in each layer, the connection relationship between neurons, and the like.

The method for determining the structure of the learning model 4 is not limited in particular, and may be selected as appropriate depending on the embodiment. For example, the control unit 21 may determine the structure of the neural network, the initial values of the weights of connections between neurons, and the initial values of the threshold values of the neurons, by receiving a designation by the operator via the input apparatus 24. The control unit 21 may also determine the structure of the neural network, the initial values of the weights of connections between neurons, and the initial values of the threshold values of the neurons, from a template, for example. In this case, the control unit 21 may also acquire a template 126 from the model integration apparatus 1 in accordance with the answer in the processing in the later-described steps S701 to S703. The data format of the template 126 is not limited in particular, and may be determined as appropriate depending on the embodiment, as long as the template 126 includes information indicating the model of the learning model 4. The template 126 may also include information regarding the initial values of the computation parameters of the learning model 4 in addition to the information regarding the structure of the learning model 4. In the present embodiment, the template 126 may also include information indicating the number of layers in the neural network, the number of neurons (nodes) included in each layer, the connection relationship between neurons in adjacent layers, as the information regarding the structure of the learning model 4. The template 126 may also include information indicating the initial values of the weights of connections between neurons, the initial values of the threshold values of the neurons, and the like, as the information regarding the initial values of the computation parameters. The control unit 21 may also determine the structure of the neural network that constitutes the learning model 4, the initial values of the weights of connections between neurons, and the initial values of the threshold values of the neurons, based on the acquired template 126.

As a result of the structures of the learning models 4 being determined as appropriate in the respective learning apparatuses 2, the trained learning models 4 are each configured to include the common portion 40 having a common structure. Also, the trained learning models 4 of some combination are configured to have different structures in a portion other than the common portion 40. Upon determining the structure of the learning model 4, the control unit 21 advances the processing to the next step S103.

(Step S103)

In step S103, the control unit 21 operates as the learning processing unit 213, and constructs a trained learning model 4 that has acquired a predetermined capability by performing machine learning using the collected local learning data 3. In the present embodiment, the control unit 21 executes learning processing of the neural network that constitutes the learning model 4 using the training data 31 and correct answer data 32 included in each learning data set 30. Stochastic gradient descent or the like may be used in this learning processing.

For example, in the first step, the control unit 21 inputs the training data 31, of each learning data set 30, to the input layer 51, and determines, sequentially from the input side, how each of the neurons included in the layers 51 to 56 fires. With this, the control unit 21 acquires an output value corresponding to the result of exerting the predetermined capability on the training data 31 from the output layer 56. In the second step, the control unit 21 calculates an error between the acquired output value and the corresponding correct answer data 32. In the third step, the control unit 21 calculates, by back propagation, an error of each of the weights of connections between the neurons and the threshold value of each neuron, using the calculated errors of the output values. In the fourth step, the control unit 21 updates the values of the weights of connections between the neurons and the threshold values of the neurons based on the calculated errors.

The control unit 21 adjusts the values of the computation parameters of the neural network that constitutes the learning model 4 such that when the training data 31 of each learning data set 30 is input, an output value that matches the corresponding correct answer data 32 is output from the output layer 56, by repeating the first to fourth steps described above. For example, the control unit 21 repeats the first to fourth steps until the sum of errors between output values obtained from the output layer 56 and respective values corresponding to the correct answer data 32 of the learning data sets 30 is reduced to a threshold value or less. That the value of the correct answer data 32 matches the output value of the output layer 56 may include a case where an error of the threshold value occurs between the value of the correct answer data 32 and the output value of the output layer 56. The threshold value may be set as appropriate depending on the embodiment. With this, the control unit 21 can construct a trained learning model 4 that has been trained to output, when the training data 31 is input, an output value that matches the corresponding correct answer data 32. Upon completing the machine learning using the local learning data 3, the control unit 21 advances the processing to the next step S104.

(Step S104)

In step S104, the control unit 21 operates as the saving processing unit 214, and saves the information regarding the trained learning model 4 that has been constructed by machine learning in a predetermined storage area. In the present embodiment, the control unit 21 generates information indicating the structure and the computation parameters of the trained neural network (learning model 4) constructed by machine learning in step S103, as the learning result data 221. Also, the control unit 21 saves the generated learning result data 221 in a predetermined storage area.

The predetermined storage area may be the RAM in the control unit 21, the storage unit 22, an external storage apparatus, or a storage medium, or a combination of these, for example. The storage media may be a CD, a DVD, or the like, and the control unit 21 may store the learning result data 221 in the storage media via the drive 26. The external storage apparatus may be a data server such as a NAS (network attached storage). In this case, the control unit 21 may also store the learning result data 221 in the data server via a network using the communication interface 23. Moreover, the external storage apparatus may also be an external storage apparatus connected to the learning apparatus 2, for example.

The learning result data 221 may also include the number of learning data sets 30 used for the machine learning, additional information indicating a later-described ratio of specific learning data, and the like. Upon completing saving the learning result data 221 with this, the control unit 21 ends the series of processing regarding the machine learning of the learning model 4.

(B) Inference Processing

Next, exemplary operations of each learning apparatus 2 regarding the inference processing will be described using FIG. 8. FIG. 8 is a flowchart illustrating an example of the processing procedure regarding the inference processing performed by each learning apparatus 2. Note that each processing procedure described below is merely an example, and each step may be changed to the extent possible. Moreover, in the processing procedure described below, steps may also be omitted, replaced, or added as appropriate depending on the embodiment.

(Step S201)

In step S201, the control unit 21 operates as the object data acquiring unit 216, and acquires object data 225 with respect to which the predetermined capability that the trained learning model 4 has been caused to learn is to be exerted. In the present embodiment, each learning apparatus 2 is connected to the sensor S via the external interface 27. Therefore, the control unit 21 acquires the object data 225 from the sensor S via the external interface 27.

Note that the path through which the object data 225 is acquired is not limited to this example, and may be determined as appropriate depending on the embodiment. For example, another computer that is different from the learning apparatuses 2 may be connected to the sensor S. In this case, the control unit 21 may also acquire the object data 225 by receiving the object data 225 transmitted from the other computer. Upon acquiring the object data 225, the control unit 21 advances the processing to the next step S202.

(Step S202)

In step S202, the control unit 21 operates as the inference unit 217, and infers a feature included in the object data 225 using the trained learning model 4. In the present embodiment, the control unit 21 configures the settings of the trained learning model 4 by referring to the learning result data 221. Next, the control unit 21 inputs the acquired object data 225 to the trained learning model 4, and executes the computation processing of the trained learning model 4. That is, the control unit 21 inputs the object data 225 to the input layer 51 of the trained learning model 4, and determines, sequentially from the input side, how each of the neurons included in the layers 51 to 56 fires. With this, the control unit 21 acquires an output value corresponding to the result of inferring a feature included in the object data 225 from the output layer 56 of the trained learning model 4.

In the present embodiment, obtaining this output value corresponds to exerting the predetermined capability and inferring the feature included in the object data 225. The contents of inference are not limited in particular, and may be selected as appropriate depending on the embodiment. For example, when the trained learning model 4 has learned a capability of estimating the state of a product in an image of the image data by the machine learning, inferring the feature included in the object data 225 may mean estimating the state of a product in an image of the image data that is the object data 225. Upon completing inferring the feature included in the object data 225, the control unit 21 advances the processing to the next step S203.

(Step S203)

In step S203, the control unit 21 operates as the output unit 218, and outputs information regarding the result of inferring a feature.

The output destination and the contents of information to be output may be determined as appropriate depending on the embodiment. For example, the control unit 21 may output the result of inferring a feature included in the object data 225 in step S202 to the output apparatus 25 as is. Moreover, the control unit 21 may also execute some information processing based on the result of inferring the feature, for example. Also, the control unit 21 may output the result of executing the information processing as the information regarding the inference result. The outputting of the result of executing the information processing may include outputting a specific message such as a warning according to the inference result, controlling the operation of an apparatus to be controlled according to the inference result, or the like. The output destination may be the output apparatus 25, an apparatus to be controlled, or the like. Upon completing the output of information regarding the inference result, the control unit 21 ends the series of processing regarding the predetermined inference processing using the trained learning model 4.

[Model Integration Apparatus]

Next, an exemplary operation of the model integration apparatus 1 will be described using FIG. 9. FIG. 9 is a flowchart illustrating an example of the processing procedure relating to model integration by the model integration apparatus 1. The processing procedure described below is an example of the "model integration method" of the present invention. Note that each processing procedure described below is merely an example, and each step may be changed to the extent possible. Moreover, in the processing procedure described below, steps may also be omitted, replaced, or added as appropriate depending on the embodiment.

(Step S301)

In step S301, the control unit 11 operates as the model collecting unit 111, and collects the trained learning models 4 from the learning apparatuses 2. In the present embodiment, collecting the trained learning models 4 is constituted by collecting the learning result data 221 generated by the learning apparatuses 2.

The method for collecting the learning result data 221 may be determined as appropriate depending on the embodiment. For example, the control unit 11 may directly collect the learning result data 221 from the learning apparatuses 2 by accessing the learning apparatuses 2 via the network. Also, for example, the learning result data 221 generated by the learning apparatuses 2 may also be stored in an external storage apparatus such as a data server. In this case, the control unit 11 may also indirectly collect the learning result data 221 from the learning apparatuses 2 by acquiring the learning result data 221 from the external storage apparatus. Upon collecting the trained learning model 4 from the learning apparatuses 2, the control unit 11 advances the processing to the next step S302.

(Step S302)

In step S302, the control unit 11 operates as the range adjusting unit 112, and determines the integration range 41 within the common portion 40 included in each of the collected trained learning models 4. The details of the method for determining the integration range 41 will be described later. Upon determining the integration range 41, the control unit 11 advances the processing to the next step S303.

Note that this step S302 may also be executed before step S301. In this case, the control unit 11 may also retain information regarding the structure of the learning models 4 to be used by the respective learning apparatuses 2. When the structure of each learning model 4 is given by a template 126, the information regarding the structure of the learning models 4 may be constituted by these templates 126. The control unit 11 may determine the integration range 41 within the common portion 40 of the learning models 4 based on the information regarding the structure of the learning models 4. Also, in step S301, the control unit 11 may also acquire only the data regarding the integration range 41 of the learning result data 221.

(Step S303)

In step S303, the control unit 11 operates as the integration processing unit 113, and executes, with respect to the trained learning models 4, integration processing of integrating the result of machine learning reflected in the integration range 41 that is set within the common portion 40.

The result of machine learning is reflected in the values of the computation parameters (e.g., weights of connections between neurons, threshold values of neurons) included in the learning model 4. Therefore, in the present embodiment, integrating the results of machine learning reflected in the integration ranges 41 of the respective learning models 4 is constituted by performing an integration regarding the values of the computation parameters included in the integration range 41 of the trained learning models 4. The method for integrating the values of computation parameters may be determined as appropriate depending on the embodiment. In the present embodiment, the control unit 11 integrates the values of the computation parameters included in the integration range 41 using one of the following two methods.

(A) First Method

In the first method, the control unit 11 integrates the values of the computation parameters included in the integration range 41 by calculating an average or a total sum of the values of the computation parameters included in the integration range 41. According to this first method, a result 43 of integration processing in which the values of the computation parameters included in the integration range 41 of the trained learning models 4 are uniformly reflected can be obtained.

(B) Second Method

In the second method, the control unit 11 performs weighting on the values of the computation parameters included in the integration range 41 of the trained learning models 4, in the integration processing. In this case, the control unit 11 operates as the weight setting unit 115, and sets weights to the respective trained learning models 4 before executing this step S303. Each weight determines the priority of each trained learning model 4 in the integration processing in this step S303. In the present embodiment, the control unit 11 sets the weights of the respective trained learning models 4 using one of the following two setting methods.

(I) First Weight Setting Method

As the number of the pieces of local learning data 3 (that is, the number of learning data sets 30) used for machine learning increases, the accuracy of exerting the predetermined capability of the trained learning model 4 may improve. Therefore, in a first setting method, the control unit 11 sets the weights such that the weight increases as the number of pieces of local learning data 3 used for machine learning increases. With this, the integration ranges 41 of the respective trained learning models 4 can be integrated such that the result of machine learning in which the number of used pieces of local learning data 3 is larger is prioritized higher.

Note that the information indicating the number of pieces of local learning data 3 used for machine learning may be acquired as appropriate. For example, the learning result data 221 may also include information indicating the number of sets of local learning data 3 used for machine learning of its learning apparatus 2. In this case, the control unit 11 specifies the number of sets of local learning data 3 used for constructing the trained learning model 4 by referring to the information included in the learning result data 221, and can set the weight according to the specified result. The correspondence relationship between the number of sets of local learning data 3 used for machine learning of the learning apparatus 2 and the weight to be set may be determined as appropriate depending on the embodiment. For example, the weights may be set in proportion to the number of pieces of local learning data 3.

(II) Second Weight Setting Method

Assume a scenario in which each learning model 4 is caused to acquire a capability of performing visual inspection of a product in an image of image data, for example. In this scenario, as the ratio of image data of images of products including a defect such as a stain, a smudge, or a flaw in local learning data 3 increases, the accuracy of defect estimation made by the trained learning model 4 constructed by machine learning using the local learning data 3 may improve. Therefore, in a second setting method, when the local learning data 3 includes specific learning data relating to specific elements of a predetermined capability, the control unit 11 sets the weights such that the weight increases as the ratio of the specific learning data included in the local learning data 3 used for machine learning increases.

Here, "specific learning data" is local learning data 3 relating to a specific element of a predetermined capability. The specific element is not limited in particular, and may be selected from all elements regarding the predetermined capability. As in the example described above, in a scenario in which the learning model is caused to acquire a capability of performing visual inspection of a product in an image of image data, the specific element may the inclusion of a defect such as a stain, a smudge, and a flaw. In this case, the training data 31 included in the learning data sets 30 that constitute the local learning data 3 may be image data of product images. Also, the training data 31 included in the learning data sets 30 that constitute the specific learning data may be image data of products including a defect (hereinafter, defective product image data). In this case, the ratio of the specific learning data corresponds to the ratio of the defective product image data included in the local learning data 3. According to the second setting method, the integration ranges 41 of the respective trained learning models 4 can be integrated such that the reflection of the result of machine learning in which the ratio of the specific learning data is high is prioritized higher.

Note that the information indicating the ratio of the specific learning data included in local learning data 3 may be acquired as appropriate. Similarly to the first setting method, the learning result data 221 may also include information indicating the ratio of the specific learning data included in the local learning data 3 used for machine learning of the learning apparatus 2. In this case, the control unit 11 specifies the ratio of the specific learning data included in the local learning data 3 used for constructing the trained learning model 4 by referring to the information included in the learning result data 221, and can set the weight according to the specified result. The correspondence relationship between the ratio of the specific learning data included in the local learning data 3 used for machine learning of the learning apparatus 2 and the weight to be set may be determined as appropriate depending on the embodiment. For example, the weights may be set in proportion to the ratio of the specific learning data.

In the present embodiment, the control unit 11 sets the weights to the trained learning models 4 with one of the two setting methods described above. Note that the method for setting weights is not limited to this example, and may be determined as appropriate depending on the embodiment. For example, the weights may also be designated by an operator. In this case, the control unit 11 may also receive the designation of the weights made by the operator via the input apparatus 14 or the like, and set the weights according to the input values.

Also, in this step S303, the control unit 11 performs integration with respect to the values of the computation parameters included in the integration range 41 by calculating an average or a total sum after performing weighting on the values of each computation parameter of the trained learning models 4 included in the integration range 41 using the set weights. According to this second method, a result 43 of integration processing can be obtained in which the values of those computation parameters that are included in the integration range 41 of a trained learning model 4 whose weight is larger are reflected with higher priority.

Upon integrating the results of machine learning reflected in the integration range 41 with one of the two methods described above, the control unit 11 advances the processing to the next step S304.

(Step S304)

In step S304, the control unit 11 operates as the model updating unit 114, and distributes the integration result data 121 indicating the result 43 of integration processing to the learning apparatuses 2. With this, the control unit 11 updates the trained learning models 4 retained by the learning apparatuses 2 by causing the learning apparatuses 2 to apply the result 43 of integration processing to the integration range 41 in the trained learning models 4. Here, whether or not the control unit 11 transmits an instruction for updating the trained learning model 4 using the distributed result 43 of integration processing to the learning apparatuses 2 may be selected as appropriate depending on the embodiment.

The method for distributing the integration result data 121 may be determined as appropriate depending on the embodiment. For example, the control unit 11 may directly distribute the integration result data 121 to the learning apparatuses 2 via a network in response to its own processing or upon request from the learning apparatus 2. The configuration may also be such that the control unit 11 transmits the integration result data 121 to an external storage apparatus such as a data server, and causes the learning apparatuses 2 to acquire the integration result data 121 saved in the external storage apparatus, for example. In this way, the control unit 11 may also indirectly distribute the integration result data 121 to the learning apparatuses 2.

Upon acquiring the integration result data 121, the control unit 21 of each learning apparatus 2 replaces the value of each parameter in the integration range 41 with the value of the parameter obtained by the integration processing by referring to the acquired integration result data 121. With this, the control unit 11 updates the trained learning model 4 retained by the learning apparatuses 2 by causing the learning apparatuses 2 to apply the result 43 of integration processing to the integration range 41 in the trained learning models 4. Upon completing updating of each trained learning model 4, the control unit 11 ends the series of processing regarding the model integration.

Note that the data configuration of the integration result data 121 is not limited in particular, and may be determined as appropriate depending on the embodiment. The integration result data 121 may be constituted by only the values of the computation parameters included in the integration range 41, or may also be configured to include the values of computation parameters outside the integration range 41. When the integration result data 121 is configured to include the values of computation parameters outside the integration range 41, the control unit 11 may also generate the integration result data 121 for the learning apparatuses 2 separately, and may also distribute the generated integration result data 121 to the learning apparatuses 2.

<Method for Determining Integration Range>

Next, a specific example of the method for determining the integration range 41 in step S302 described above will be described. In the present embodiment, the control unit 11 determines the integration range 41 within the common portion 40 with at least one of the following three methods.

(A) First Method

The structure of the trained learning models 4 in the learning apparatuses 2 may be given by the templates 126 (step S102). In correspondence therewith, in a first method, the control unit 11 determines the integration range 41 based on the templates 126.

For example, a plurality of templates 126 that define the model structures of the learning models 4 that have different structures but include the common portion 40 may be prepared. The integration range 41 may be set in advance to the common portion 40 defined by the templates 126. Each learning apparatus 2 may determine the structure of the learning model 4 to be used using one of the plurality of templates 126 in step S102.

In this case, the control unit 11 may refer to the templates 126 used by the learning apparatuses 2 to determine the integration range 41 for which the processing in step S303 is to be performed by specifying the set integration range 41.

According to the first method, the control unit 11 can determine the integration range 41 with a simple method.

(B) Second Method

Figure 10:
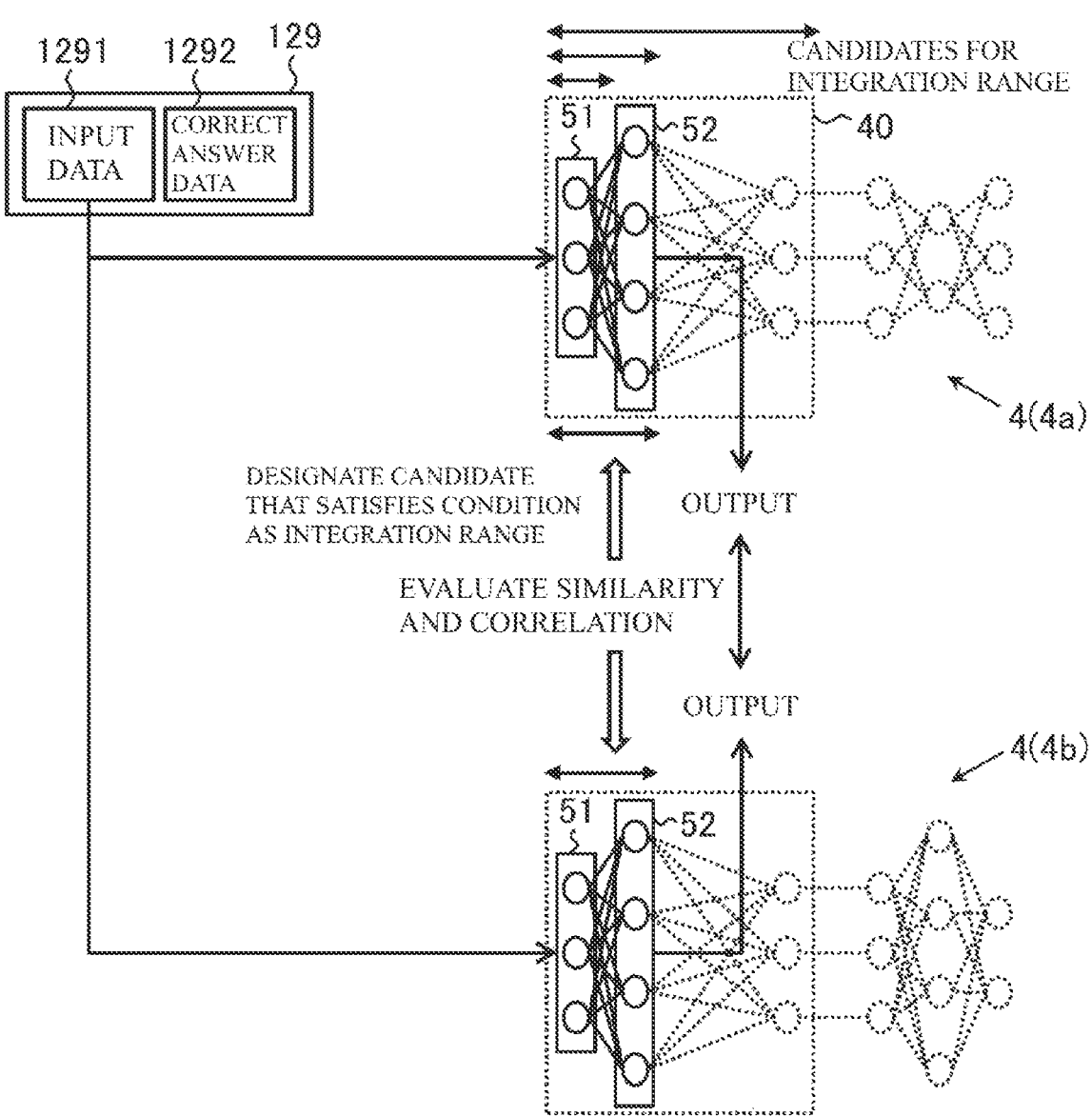
FIG. 10 is a schematic diagram illustrating an example of a method for determining an integration range according one or more embodiments.

Next, an example of a second method for determining the integration range 41 will be described using FIG. 10. FIG. 10 schematically illustrates an example of a scenario in which the integration range 41 is determined with the second method. It is not necessarily the case that the structure of each learning model 4 is determined after the integration range 41 has been set in advance. Therefore, in the second method, the control unit 11 determines a portion in which the computation processing is similar in the common portions 40 of the trained learning models 4, as the integration range 41.

Specifically, the common portion 40 of each trained learning model 4 includes a plurality of computation modules. A computation module is constituted by one or more computation parameters. That is, a computation module forms a unit for executing computation processing in the learning model 4. In the present embodiment, the computation module is constituted by a layer of the neural network, for example. In the example in FIGS. 4 and 10, the common portion 40 includes the layers from the input layer 51 to the intermediate layer 53. In this case, a first network constituted by only the input layer 51, a second network constituted by the input layer 51 and the intermediate layer 52, and a third network constituted by the input layer 51 and the two intermediate layers (52, 53) correspond to computation modules, for example. Each computation module may be a candidate for the integration range 41.

In the second method, the control unit 11 determines whether or not the outputs obtained by giving evaluation samples 129 to the computation modules that are candidates for the integration range 41 are similar between the learning models 4. The fact that the outputs of corresponding computation modules, that is, the outputs of same portions in the common portions 40 are similar corresponds to the fact that the same portions execute computation processing of similar intention on the input data. Therefore, the control unit 11 determines a candidate regarding which the outputs are determined to be similar as the integration range 41.

Figure 11:
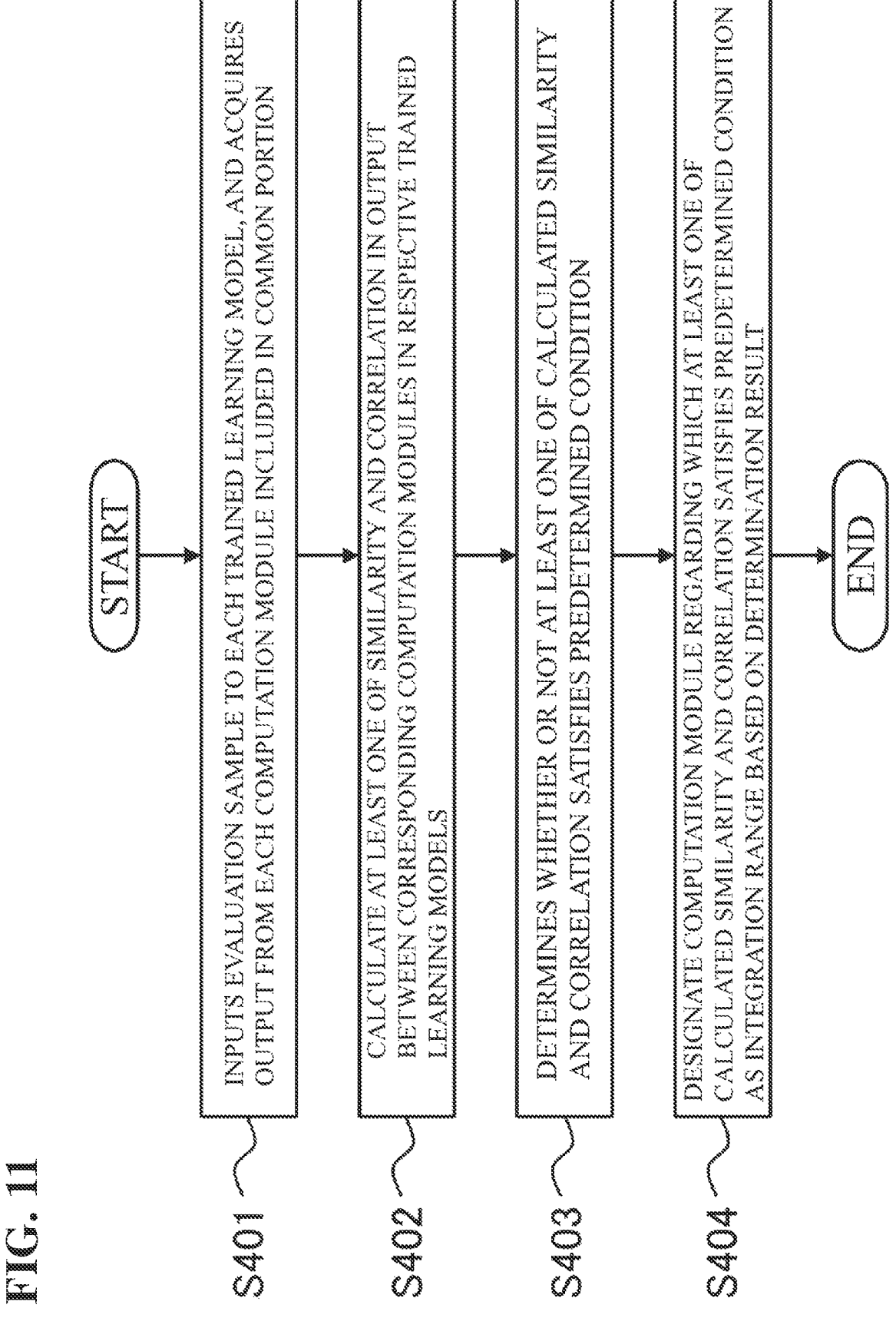
FIG. 11 is a diagram illustrating an example of a processing procedure for determining an integration range by a model integration apparatus according to one or more embodiments.

Here, an example of the processing procedure of the second method will be described further using FIG. 11. FIG. 11 is a flowchart illustrating an example of the processing procedure relating to the determination of the integration range 41 with the second method. When the second method is adopted as the method for determining the integration range 41, the processing in the aforementioned step S302 includes the processing of the following steps S401 to S404. Note that the processing procedure described below is merely an example, and each processing may be changed to the extent possible. Furthermore, in the processing procedure described below, steps may also be omitted, replaced, or added as appropriate depending on the embodiment.

First, before executing step S401, the control unit 11 acquires an evaluation sample 129. In the present embodiment, the evaluation sample 129 is stored in the storage unit 12, and therefore, the control unit 11 acquires the evaluation sample 129 from the storage unit 12. Note that the path through which the evaluation sample 129 is acquired is not limited to this example. For example, the evaluation sample 129 may also be saved in a storage medium 91, an external storage apparatus, or the like. In this case, the control unit 11 may also acquire the evaluation sample 129 from the storage medium 91, the external storage apparatus, or the like.

As shown in FIG. 10, the evaluation sample 129 is used for evaluating the output of each computation module, and is configured similarly to the local learning data 3. In the present embodiment, the evaluation sample 129 is constituted by a combination of input data 1291 and correct answer data 1292, similarly to the learning data set 30. The input data 1291 is data of the same type as the aforementioned training data 31 and object data 225. The correct answer data 1292 is data indicating the result (correct answer) of exerting the predetermined capability on the input data 1291, similarly to the aforementioned correct answer data 32. The number of evaluation samples 129 to be used may be determined as appropriate depending on the embodiment. Upon acquiring one or more evaluation samples 129, the control unit 11 advances the processing to step S401.

(Step S401)

In step S401, the control unit 11 inputs the evaluation sample 129 to the trained learning models 4, and acquires an output from the computation modules included in the common portion 40. In the present embodiment, the control unit 11 inputs input data included in the evaluation sample 129 to the input layer 51, and determines, sequentially from the input side, how each neuron fires. With this, the control unit 11 acquires output values from the layers 51 to 53, which correspond to output layers of respective computation modules.

In FIG. 10, a scenario is illustrated in which outputs are obtained from computation modules constituted by the input layer 51 and the intermediate layer 52 in the common portion 40 of the trained learning models (4a, 4b) obtained from the learning apparatuses (2a, 2b). The control unit 11 can similarly obtain outputs with respect to other computation modules. Upon acquiring outputs from the computation modules, the control unit 11 advances the processing to the next step S402.

(Step S402)

In step S402, the control unit 11 calculates at least one of similarity and correlation between acquired outputs from corresponding computation modules of the respective trained learning models 4. The similarity and correlation may be calculated using known methods. The similarity may be calculated by a normal (distance), for example. The correlation may be calculated by calculating a correlation coefficient, a partial correlation coefficient, or the like. In the example in FIG. 10, the similarity and correlation between outputs from the respective intermediate layers 52 obtained by inputting the input data 1291 to the input layers 51 of the trained learning models (4a, 4b) are calculated. Upon at least one of the similarity and correlation being calculated, the processing is advanced to the next step S403.

(Step S403)

In step S403, the control unit 11 determines whether or not at least one of the calculated similarity and correlation satisfies a predetermined condition. The predetermined condition is set as appropriate to evaluate whether or not the outputs from corresponding computation modules of the trained learning models 4 are similar. For example, the predetermined condition may be defined by threshold values for the similarity and correlation. In this case, the control unit 11 determines whether or not at least one of the calculated similarity and correlation satisfies the predetermined condition by comparing at least one of the similarity and correlation calculated in step S402 with the threshold value or values. Upon completing the determination with respect to the computation modules, the control unit 11 advances the processing to the next step S404.

(Step S404)

In step S404, the control unit 11 designates those computation modules for which at least one of the calculated similarity and correlation satisfies the predetermined condition as the integration range 41, based on the determination result. If there are a plurality of candidates that satisfy the predetermined condition, the control unit 11 may also appropriately select a candidate to be designated as the integration range 41 from the plurality of candidates. For example, the control unit 11 may also designate a candidate having the widest range, a candidate having the narrowest range, or a candidate for which at least one of the calculated similarity and correlation is highest as the integration range 41, for example. The configuration may also be such that the control unit 11 outputs a plurality of candidates to the output apparatus 15, receives the selection of candidate to be designated as the integration range 41 out of the plurality of candidates via the input apparatus 14, and designates the candidate selected by an operator or the like as the integration range 41, for example. The control unit 11 may also select a candidate to be designated as the integration range 41 randomly from a plurality of candidates, for example. Upon completing the designation of the integration range 41, the control unit 11 ends the series of processing relating to determination of the integration range 41. Note that if the calculated similarity and correlation between outputs of any computation modules do not satisfy the predetermined condition, the integration range 41 may also be determined with another method. Alternatively, the integration processing in step S303 and onward may also be omitted in that case.

Accordingly, the control unit 11 can determine a portion for which the computation processing is similar as the integration range 41. According to this second method, even if the integration range 41 has not been set in advance, an appropriate integration range 41 can be determined with respect to the trained learning models 4. Note that when the second method is adopted, the correct answer data 1292 may be omitted in the evaluation sample 129.

(C) Third Method

The integration processing in step S303 is executed in order to improve the capability of the trained learning models by reflecting the result of machine learning reflected in one trained learning model on the other trained learning models. Therefore, in a third method, the control unit 11 optimizes the integration range 41 such that the predetermined capability of the trained learning models 4 is improved after execution of the integration processing relative to the predetermined capability before execution of the integration processing in step S303, that is, the accuracy of exerting the predetermined capability is improved.

Specifically, the control unit 11 designates a provisional integration range in the common portion 40. Next, the control unit 11 executes provisional integration processing similar to that in step S303 with respect to the designated provisional integration range. Also, the control unit 11 evaluates the capability of the trained learning models 4 subjected to the integration processing using the evaluation sample 129, and optimizes the integration range 41 based on the evaluation result. The optimization method may be determined as appropriate depending on the embodiment. In the present embodiment, the control unit 11 optimizes the integration range 41 with at least one of the following two methods.

(C-1) First Optimization Method

Figure 12:
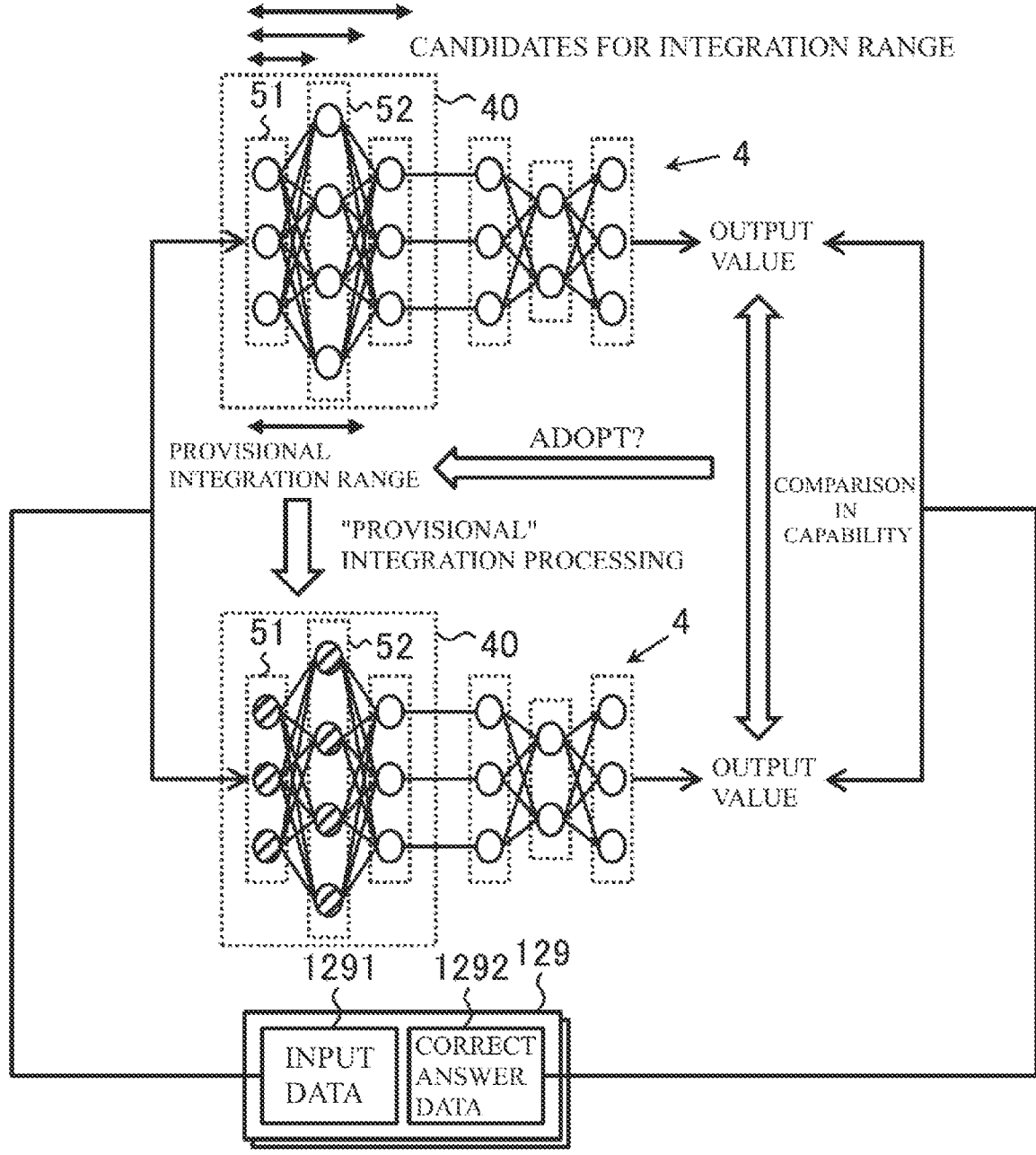
FIG. 12 is a schematic diagram illustrating an example of a method for determining an integration range according to one or more embodiments.
Figure 13:
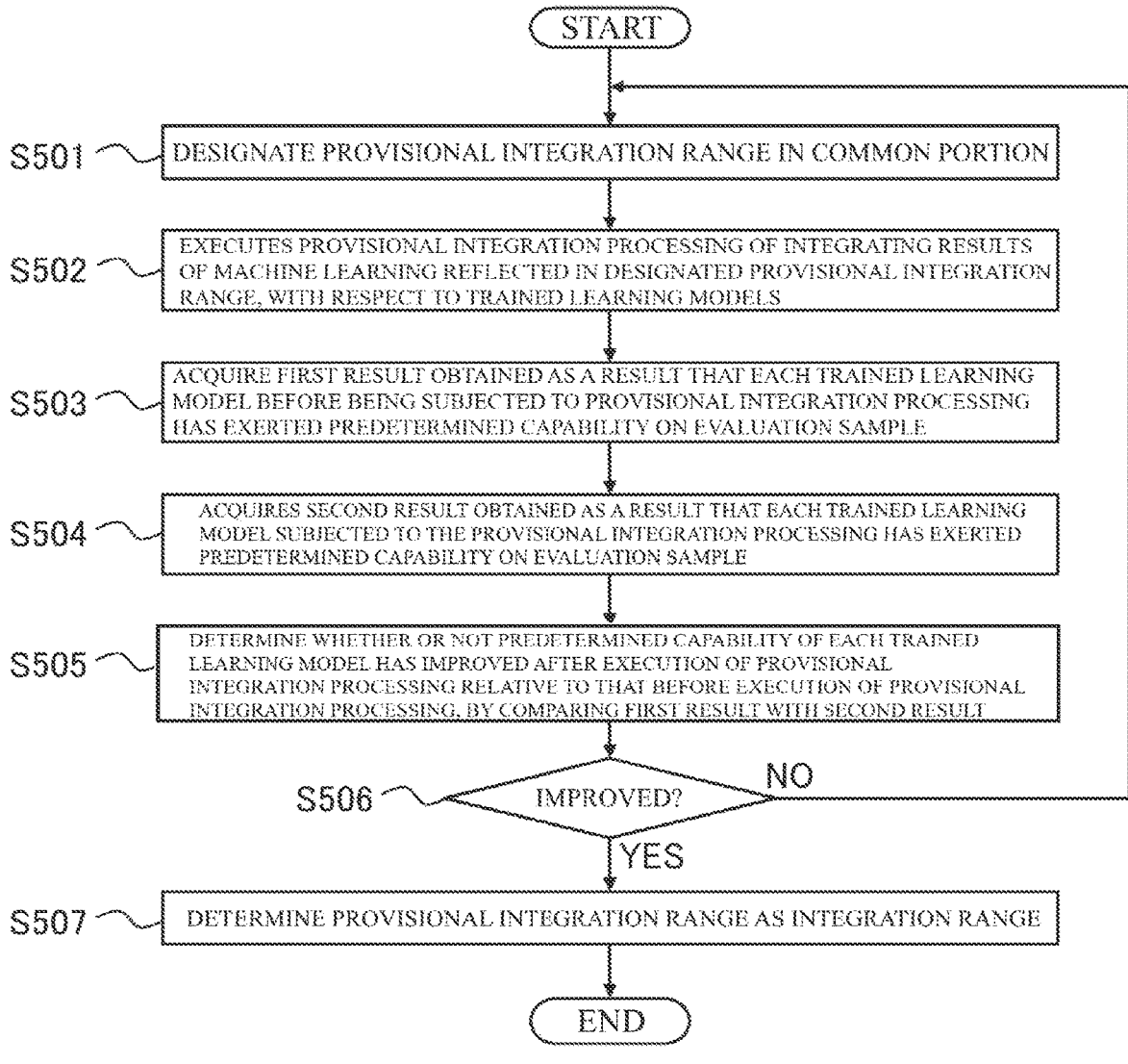
FIG. 13 is a diagram illustrating an example of the processing procedure for determining an integration range by a model integration apparatus according to one or more embodiments.

First, an example of a first optimization method will be described using FIGS. 12 and 13. FIG. 12 schematically illustrates an example of the scenario in which the integration range 41 is optimized by the first optimization method. FIG. 13 is a flowchart illustrating an example of the processing procedure for determining the integration range 41 by the first optimization method. In the first optimization method, the control unit 11 optimizes the integration range 41 by comparing the capability of the trained learning models 4 before provisional integration processing with the capability of the trained learning models 4 after being subjected to the provisional integration processing.

Note that when the first optimization method is adopted as the method for determining the integration range 41, the processing in the aforementioned steps S302 and S303 includes the processing in steps S501 to S507 below. In particular, optimization of the integration range 41 is constituted by the processing in steps S503 to S507 below. Note that the processing procedure described below is merely an example, and the processing may be changed to the extent possible. Also, in the processing procedure described below, steps may also be omitted, replaced, or added as appropriate depending on the embodiment.

(Step S501)

In step S501, the control unit 11 operates as the range adjusting unit 112, and designates a provisional integration range in the common portions 40 of the trained learning models 4. For example, the control unit 11 selects a candidate to be designated as the provisional integration range from a plurality of candidates (computation modules) of the integration range 41 that can be set in the common portion 40. In FIG. 12, a scenario is illustrated in which a second network constituted by the input layer 51 and the intermediate layer 52, out of the three candidates that can be designated in the common portion 40, is designated as the provisional integration range. Upon designating the provisional integration range, the control unit 11 advances the processing to the next step S502.

(Step S502)

In step S502, the control unit 11 operates as the integration processing unit 113, and executes provisional integration processing of integrating the results of machine learning reflected in the designated provisional integration range, with respect to the trained learning models 4. The provisional integration processing is executed similarly to the integration processing described above. One of the two methods described above may be adopted as the method for integrating the values of the computation parameters included in the provisional integration range, in the provisional integration processing. With this, the control unit 11 can obtain the result of provisional integration processing with respect to the provisional integration range. Also, as shown in FIG. 12, the control unit 11 can obtain the trained learning models 4 subjected to the integration processing by applying the result of the provisional integration processing to the provisional integration ranges of the trained learning models 4. The method for applying the result of provisional integration processing is similar to the method for applying the result 43 of integration processing described above. Upon executing the provisional integration processing, the control unit 11 advances the processing to the next step S503.

(Steps S503 and S504)

In step S503, the control unit 11 operates as the range adjusting unit 112, and acquires a first result obtained as a result in which each trained learning model 4 before being subjected to the provisional integration processing, that is, each trained learning model 4 to which the result of provisional integration processing has not yet been applied, has exerted the predetermined capability on the evaluation sample 129. Step S503 may be executed similarly to the aforementioned step S202. That is, the control unit 11 inputs input data 1291 to the input layer 51 of the trained learning models 4 before they are subjected to the provisional integration processing, and determines, sequentially from the input side, how each of the neurons included in the layers 51 to 56 fires. With this, the control unit 11 acquires an output value corresponding to the result of exerting the predetermined capability on the input data 1291 (in the present embodiment, the result of inferring a feature included in the input data 1291) from the output layer 56 of each trained learning model 4 before they are subjected to the provisional integration processing. Note that, with respect to the processing in step S504 and onward described below, the control unit 11 operates as the range adjusting unit 112, and executes the process.

In step S504, the control unit 11 acquires a second result obtained as a result in which each trained learning model 4 subjected to the provisional integration processing, that is, each trained learning model 4 to which the result of provisional integration processing has been applied has exerted the predetermined capability on the evaluation sample 129. The method for acquiring the second result is similar to the method for acquiring the first result in step S503 described above. The control unit 11 inputs input data 1291 to the input layer 51 of the trained learning models 4 subjected to the provisional integration processing, and determines, sequentially from the input side, how each of the neurons included in the layers 51 to 56 fires. With this, the control unit 11 acquires an output value corresponding to the result of exerting the predetermined capability to the input data 1291 from the output layer 56 of each trained learning model 4 subjected to the provisional integration processing.

Upon acquiring the first and second results, the control unit 11 advances the processing to the next step S505. Note that the processing sequence of steps S503 and S504 is not limited to this example. For example, the processing sequence of steps S503 and S504 may be switched. Also, the number of evaluation samples 129 to be used in steps S503 and S504 is not limited in particular, and may be determined as appropriate depending on the embodiment.
(Step S505)

In step S505, the control unit 11 determines whether or not the predetermined capability of the trained learning models 4 has improved after execution of the provisional integration processing relative to that before execution of the provisional integration processing, by comparing the first result with the second result.

The method for determination may be determined as appropriate depending on the embodiment. In the present embodiment, the fact that the output value obtained from a trained learning model 4 matches the correct answer data 1292 indicates the fact that that trained learning model 4 has appropriately exerted the predetermined capability on the input data 1291. On the other hand, the fact that the output value obtained from a trained learning model 4 does not match the correct answer data 1292 indicates the fact that that trained learning model 4 has not appropriately exerted the predetermined capability on the input data 1291. That is, the output value is compared with the correct answer data 1292, and a correct answer rate of result of exerting the predetermined capability on input data 1291 of the evaluation samples 129 is calculated. As a result, the control unit 11 can evaluate the predetermined capability of the trained learning models 4.

Therefore, the control unit 11 calculates the correct answer rate of the trained learning models 4 with respect to input data 1291 from the results, before executing the provisional integration processing and after executing the provisional integration processing, and compares the calculated correct answer rates, and with this, determines whether or not the predetermined capability of the trained learning models 4 has improved by the provisional integration processing. If the correct answer rate of each trained learning model 4 subjected to provisional integration processing is higher than the correct answer rate of the trained learning model 4 before being subjected to provisional integration processing, the control unit 11 determines that the predetermined capability of the trained learning model 4 has improved after execution of the provisional integration processing relative to that before execution of the provisional integration processing. On the other hand, if not, the control unit 11 determines that the predetermined capability of the trained learning model 4 has not improved after execution of the provisional integration processing relative to that before execution of the provisional integration processing. Upon completing the determination, The control unit 11 advances the processing to the next step S506.
(Step S506)

In step S506, the control unit 11 determines the branch destination of the processing based on the determination result in step S505. In step S505, if it is determined that the predetermined capability of each trained learning model 4 has improved after execution of the provisional integration processing relative to that before execution of the provisional integration processing, the control unit 11 advances the processing to the next step S507. On the other hand, if not, the control unit 11 returns the processing to step S501, and repeats the processing in step S501 and onward. In this repetition, the control unit 11 changes the provisional integration range by designating a different provisional integration range in step S501, and executes the processing in step S502 onward.
(Step S507)

In step S507, the control unit 11 determines (adopts) the provisional integration range designated in step S501 as the integration range 41. Upon completing determination of the integration range 41, the control unit 11 ends the series of processing regarding the determination of the integration range 41 with the first optimization method. Note that when the first optimization method is adopted, the control unit 11 uses the result of provisional integration processing obtained in step S502 as the result 43 of integration processing in step S303, in the series of processing until step S507.

Figure 14:
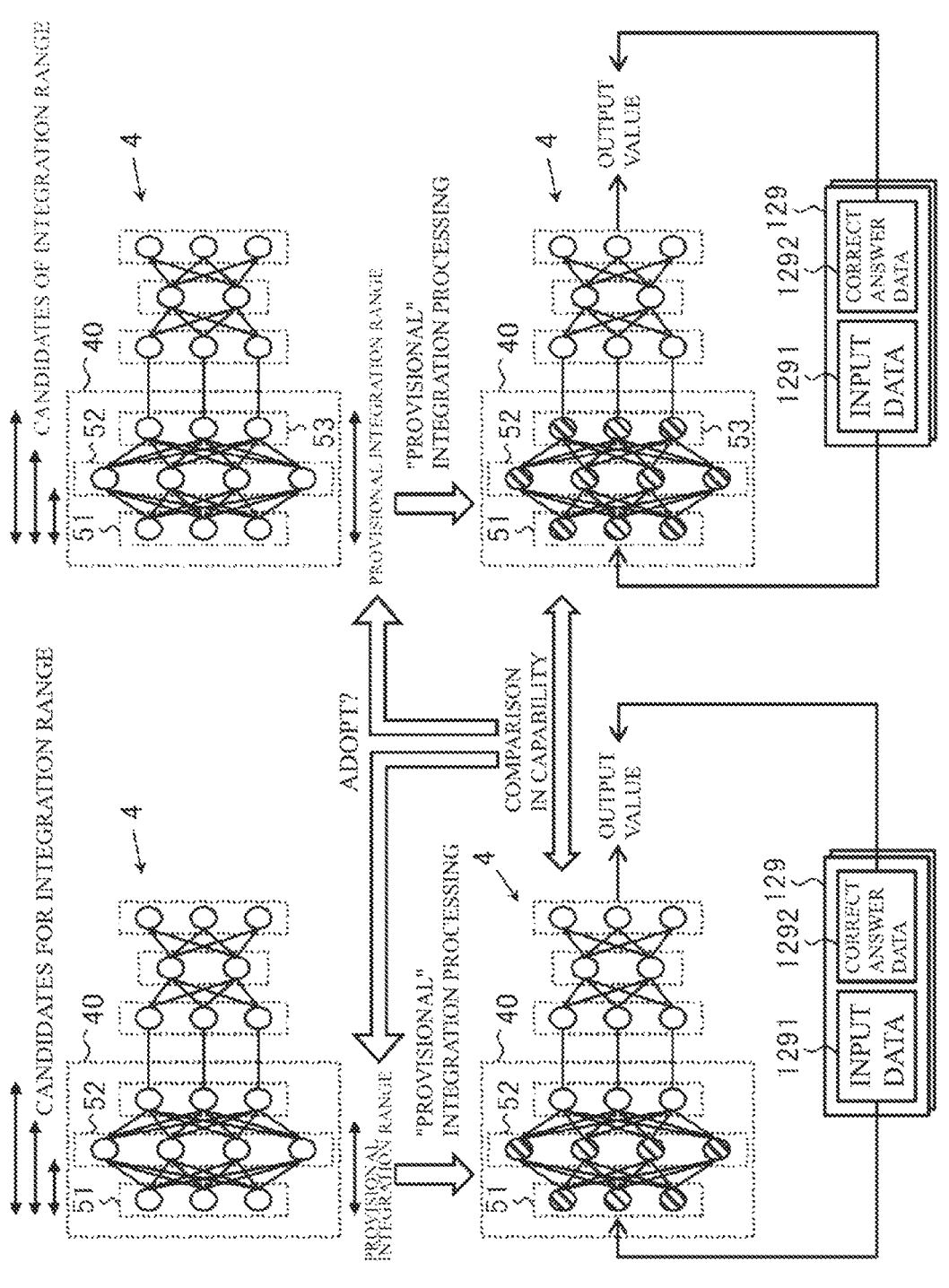
FIG. 14 is a schematic diagram illustrating an example of a method for determining an integration range according to one or more embodiments.

With this, the control unit 11 can determine the integration range 41 such that the predetermined capability of the trained learning models 4 improve after the integration processing. Therefore, according to the first optimization method, even when the integration range 41 has not been set in advance, the most suitable integration range 41 with which the predetermined capability improves after integration processing can be determined for the trained learning models 4.
(C-2) Second Optimization Method Next, an example of a second optimization method will be described using FIGS. 14 and 15. FIG. 14 schematically illustrates an example of a scenario in which the integration range 41 is optimized with the second optimization method. FIG. 15 shows a flowchart illustrating an example of the processing procedure for determining the integration range 41 with the second optimization method. In the second optimization method, the control unit 11 designates a plurality of provisional integration ranges, and specifies the provisional integration range with which the predetermined capability improves the most by the integration processing, out of the designated plurality of provisional integration ranges, and with this, optimizes the integration range 41.

Note that when the second optimization method is adopted as the method for determining the integration range 41, the processing in steps S302 and S303 described above includes the processing in steps S601 to S605 below. In particular, optimization of the integration range 41 is constituted by the processing in steps S603 to S605 below. Note that the processing procedure described below is merely an example, and the processing may be changed to the extent possible. Also, in the processing procedure described below, steps can be omitted, replaced, or added as appropriate depending on the embodiment.
(Step S601)

In step S601, the control unit 11 operates as the range adjusting unit 112, and designates a plurality of provisional integration ranges in the common portions 40 of the trained learning models 4. The method for designating the provisional integration range may be similar to that in step S501 described above. The number of provisional integration ranges to be designated is not limited in particular, and may be determined as appropriate depending on the embodiment. In FIG. 14, a scenario is illustrated in which two candidates, namely a second network constituted by the input layer 51 and the intermediate layer 52, and a third network constituted by the input layer 51 and the two intermediate layers (52, 53), are designated as the plurality of provisional integration ranges. Upon designating the plurality of provisional integration ranges, the control unit 11 advances the processing to the next step S602.
(Step S602)

In step S602, the control unit 11 operates as the integration processing unit 113, and executes, for each of the designated provisional integration ranges, provisional integration processing of integrating the results of machine learning reflected in the designated provisional integration range, of the trained learning models 4. The provisional integration processing for each provisional integration range may be executed similarly to step S502 described above. With this, the control unit 11 can obtain the result of provisional integration processing for each provisional integration range. Also, as shown in FIG. 14, the control unit 11 can obtain the trained learning models 4 subjected to the provisional integration processing by applying the result of the provisional integration processing to the trained learning models 4, for each provisional integration range. The method for applying the result of provisional integration processing is similar to the method for applying the result 43 of integration processing described above. Upon executing the provisional integration processing for each of the designated provisional integration ranges, the control unit 11 advances the processing to the next step S603.
(Step S603)

In step S603, the control unit 11 operates as the range adjusting unit 112, and acquires, for each of the designated provisional integration ranges, the result that is obtained when the trained learning models 4 subjected to the provisional integration processing have exerted the predetermined capability on the evaluation sample 129. The method for acquiring the results may be similarly to that in step S504 described above. That is, the control unit 11 inputs input data 1291 to the input layers 51 of the trained learning models 4 subjected to the provisional integration processing, and determines, sequentially from the input side, how each of the neurons included in the layers 51 to 56 fires, for each of the designated provisional integration ranges. With this, the control unit 11 acquires an output value corresponding to the result of exerting the predetermined capability on the input data 1291 from the output layers 56 of the trained learning models 4 that have been subjected to the provisional integration processing, for each of the designated provisional integration ranges. Upon acquiring the results, the control unit 11 advances the processing to the next step S604. Note that, with respect to the processing in step S604 and onward to be described below as well, the control unit 11 operates as the range adjusting unit 112, and executes the processing.
(Step S604)

In step S604, the control unit 11 specifies the provisional integration range for which the predetermined capability of the trained learning models 4 subjected to the provisional integration processing is highest, based on the acquired results. The method for comparing the predetermined capabilities of the trained learning models 4 obtained by the provisional integration processing, with respect to the designated respective provisional integration ranges may be similar to that in step S505 described above. That is, the control unit 11 may calculate the correct answer rate of each trained learning model 4 subjected to the provisional integration processing with respect to input data 1291 based on the results, by comparing the output value obtained from the trained learning model 4 with the correct answer data 1292, for each of the designated provisional integration ranges. Next, the control unit 11 may compare the correct answer rates of the trained learning models 4 calculated for the respective provisional integration ranges. Then, the control unit 11 may specify the provisional integration range for which the correct answer rate of the trained learning models 4 is highest based on the comparison result. With this, the control unit 11 can specify the provisional integration range for which the predetermined capability of the trained learning models 4 subjected to the provisional integration processing is highest. Upon specifying the provisional integration range for which the predetermined capability of the trained learning models 4 subjected to the provisional integration processing is highest, the control unit 11 advances the processing to the next step S605.
(Step S605)

In step S605, the control unit 11 determines (adopts) the provisional integration range specified in step S604 as the integration range 41. Upon completing determination of the integration range 41, the control unit 11 ends the series of processing for determining the integration range 41 with the second optimization method. Note that, when the second optimization method is adopted, the control unit 11 uses the result of executing the provisional integration processing in step S602 with respect to the provisional integration range for which the predetermined capability of the trained learning models 4 subjected to the provisional integration processing is highest, as the result 43 of integration processing in step S303.

With this, the control unit 11 can determine, as the integration range 41, the candidate regarding which the predetermined capability improves the most by the integration processing, out of the plurality of candidates for the integration range. Therefore, according to the second optimization method, even when the integration range 41 has not been set in advance, the most suitable integration range 41 regarding which the predetermined capability of the trained learning models 4 improves the most after the integration processing can be determined. The control unit 11 may also adopt both of the second optimization method and the aforementioned first optimization method as the method for determining the integration range 41. Furthermore, the control unit 11 may also execute the determination processing of the integration range 41 with at least one of the first optimization method and the second optimization method a plurality of times, and specify the integration range 41 regarding which the predetermined capability improves the most after the integration processing. The number of times of repetition of the determination processing of the integration range 41 may be set as appropriate using a threshold value or the like.

As a result of adopting at least one of the three methods described above, the control unit 11 can appropriately determine the integration range 41 within the common portion 40 of the trained learning models 4. The control unit 11 may also determine the integration range 41 by adopting the three methods in combination. Note that the method for determining the integration range 41 is not limited to these example, and may be determined as appropriate depending on the embodiment. For example, the control unit 11 may also accept a designation of the integration range 41 made by an operator via the input apparatus 14. In this case, the control unit 11 may also determine the integration range 41 according to the designation by the operator.

[Grouping of Learning Apparatuses]

Figure 16:
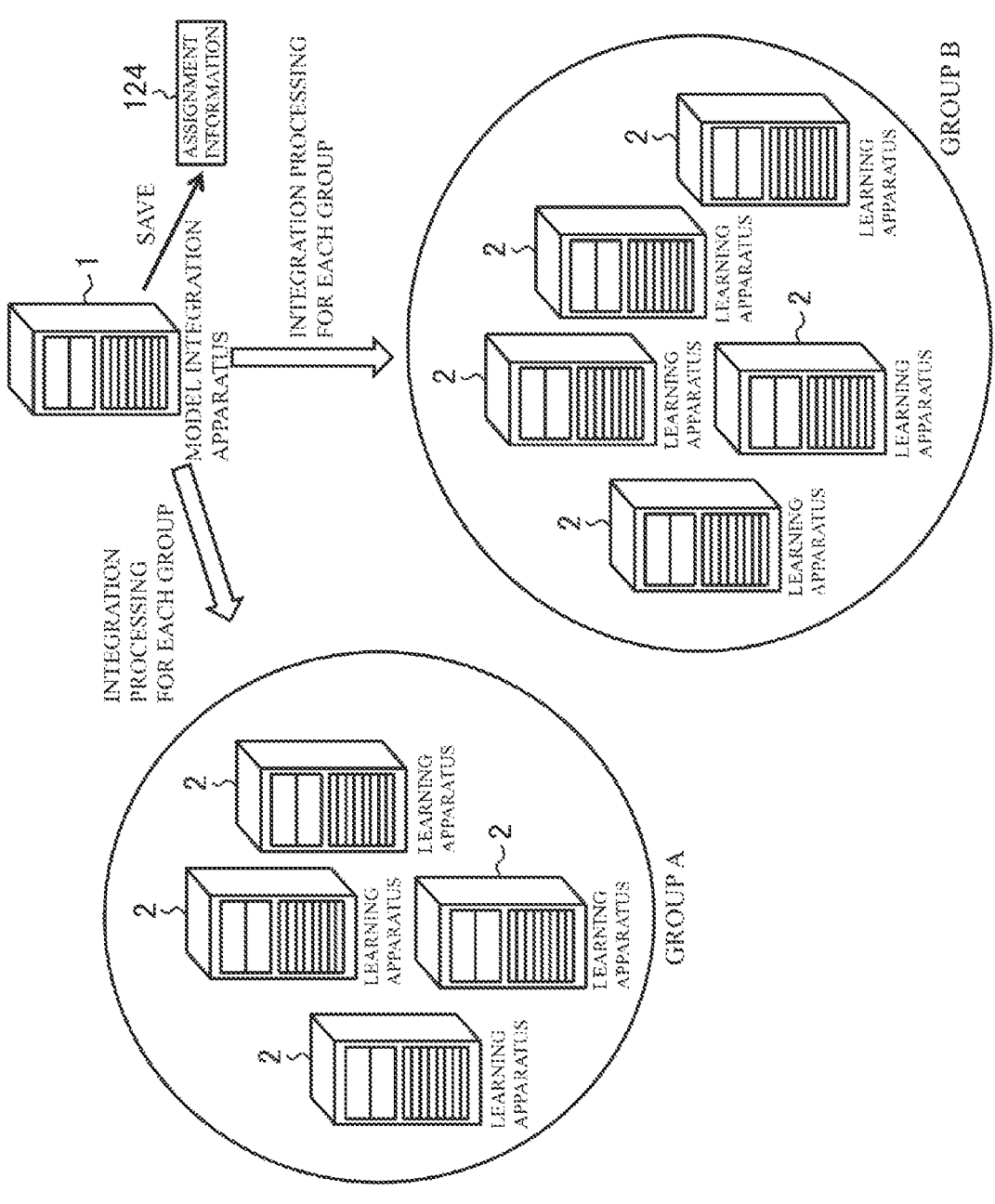
FIG. 16 is a schematic diagram illustrating grouping processing according to one or more embodiments.

Next, an example of grouping of the learning apparatuses 2 will be described using FIG. 16. FIG. 16 schematically illustrates an example of a scenario in which the learning apparatuses 2 are grouped together.

The integration processing in step S303 is executed in order to improve the capability of the trained learning models by reflecting a result of machine learning reflected in one trained learning model on other trained learning models. For example, assume that the computation processing may be similar between one trained learning model and another trained learning model due to the predetermined capability to be learned by the learning models being the same. In this case, with the integration processing in step S303 described above, the result of machine learning reflected in the one trained learning model can be appropriately reflected in the other trained learning model. On the other hand, assume that the computation processing differs extremely between one trained learning model and another trained learning model due to the predetermined capability to be learned by the learning models being entirely different. In this case, it is difficult to reflect the result of machine learning reflected in one trained learning model on the other trained learning model by the integration processing in step S303.

Therefore, in the present embodiment, the control unit 11 may operate as the grouping unit 116, and may assign the learning apparatuses 2 to at least one of a plurality of groups. Each group may be set as appropriate. For example, each group may be set as appropriate according to the type of predetermined capability, the needed specification of the learning model, or the like. In FIG. 16, a scenario, is illustrated in which the learning apparatuses 2 are assigned to one of two groups, namely a group A and a group B. The control unit 11 stores the group assignment result regarding the learning apparatuses 2 in assignment information 124.

When the grouping processing is executed, the control unit 11 executes the processing in steps S301 to S304 within the same group, in other words, for each group. That is, in step S301, the control unit 11 collects the trained learning models 4 from a plurality of learning apparatuses 2 that belong to the same group. In step S302, the control unit 11 determines the integration range 41 in common portions 40 included in the trained learning models 4 collected from the learning apparatuses 2 belonging to the same group. In step S303, the control unit 11 executes integration processing of integrating the results of machine learning reflected in the determined integration range 41, with respect to the trained learning models 4 collected from the learning apparatuses 2 belonging to the same group. Also, in step S304, the control unit 11 distributes the result 43 of integration processing to the learning apparatuses 2 belonging to the same group, and updates the trained learning models 4 retained by the learning apparatuses 2 by causing the learning apparatuses 2 to apply the result 43 of integration processing to the integration range 41 of the trained learning models 4. Note that this integration processing within the same group may also be executed across a plurality of groups. That is, the control unit 11 may, after executing integration processing with respect to the trained learning models 4 in one group, execute, using the result 43 of the integration processing, integration processing with respect to the trained learning models 4 in another group to which a learning apparatus 2 belonging to the one group belongs. In this case, ranges that are different between one group and another group may also be set as the integration ranges 41. In correspondence therewith, the integration range 41 regarding which integration processing is executed in one group may also be different from the integration range 41 for which integration processing is executed in another group.

The method for grouping may be determined as appropriated depending on the embodiment. In the present embodiment, the control unit 11 assigns each learning apparatus 2 to at least one of plurality of groups using at least one of the following three methods.

(A) First Grouping Method

First, an example of a first grouping method will be described using FIG. 17. FIG. 17 is a flowchart illustrating an example of the processing procedure relating to assigning each learning apparatus 2 to a group by the first grouping method. In the first grouping method, the control unit 11 assigns each learning apparatus 2 to at least one of a plurality of groups by causing the learning apparatus 2 to select a desired group from a group list.

Note that when the first grouping method is adopted as the method for assigning each learning apparatus 2 to a group, the processing of assigning each learning apparatus 2 to at least one of the plurality of groups is constituted by the processing in steps S701 to S703 below. Note that the processing procedure described below is merely an example, and the processing may be modified to the extent possible. Also, in the processing procedure described below, the steps can be omitted, replaced, or added as appropriate depending on the embodiment.

In step S701, the control unit 11 distributes the group list 123 listing a plurality of groups to each learning apparatus 2. With this, the control unit 11 causes each learning apparatus 2 to select at least one group from the plurality of groups in the group list 123. The groups included in the group list 123 may be set in accordance with attributes such as the local learning data 3, the learning apparatus 2, or the user of the learning apparatus 2. For example, in an example of visual inspection, groups may be set in accordance with attributes such as line number, factory name, or corporate name. Also, a new group may be set to the group list 123 by request from the learning apparatuses 2. An operator of each learning apparatus 2 can refer to the group list 123 output to the output apparatus 25, and select at least one group from the group list 123 by operating the input apparatus 24. Also, the operator can add a new group to the group list 123 by operating the input apparatus 24. The control unit 21 of each learning apparatus 2 returns the reply of group selection to the model integration apparatus 1, according to this operation.

In step S702, the control unit 11 acquires this reply of selection from the learning apparatuses 2. Also, in step S703, the control unit 11 assigns each learning apparatus 2 to at least one selected group based on the acquired replies. Upon completing assignment of at least one group, the control unit 11 ends the series of processing regarding the assignment of groups by the first grouping method. According to this first grouping method, the control unit 11 can perform grouping of the learning apparatuses 2 with a simple method.

Note that, in this case, the model integration apparatus 1 can control the structure of the learning model 4 to be used by individual learning apparatuses 2 based on the replies from the learning apparatuses 2. Therefore, the control unit 11 may also select templates 126 to be used by the respective learning apparatuses 2 from a plurality of templates 126 according to the replies acquired in step S702, and transmit the selected templates 126 to the learning apparatus 2, respectively. With this, the control unit 11 may also allow the learning apparatuses 2 to determine the structure of the respective learning models 4 using the templates 126 selected in step S102.

(B) Second Grouping Method

Next, an example of a second grouping method will be described using FIG. 18. FIG. 18 is a flowchart illustrating an example of the processing procedure relating to assigning each learning apparatus 2 to a group by the second grouping method. In the second grouping method, the control unit 11 assigns each learning apparatus 2 to an appropriate group according to the attribute of its learning model 4.

Note that when the second grouping method is adopted as the method for assigning each learning apparatus 2 to a group, the processing of assigning each learning apparatus 2 to at least one of a plurality of groups is constituted by the processing in steps S801 to S803 below. Note that the processing procedure described below is merely an example, and the processing may be modified to the extent possible. Also, in the processing procedure described below, steps may also be omitted, replaced, or added as appropriate depending on the embodiment.

(Step S801)

In step S801, the control unit 11 acquires attribute data regarding the predetermined capability that the learning models 4 is caused to learn from the learning apparatuses 2. The method for acquiring the attribute data may be similar to the method for collecting the learning result data 221 in step S301 described above. The control unit 11 may directly or indirectly acquire the attribute data from each learning apparatus 2. Also, the control unit 11 may also acquire attribute data in addition to the learning result data 221 in step S301 described above.

The attribute data may include any information regarding the predetermined capability, and may include information indicating the type of the predetermined capability, information regarding the needed specification of the learning model 4, or the like. The information indicating the type of the predetermined capability may include information for identifying the capability that the learning model 4 is caused to acquire such as visual inspection or control of a cultivation apparatus. The information regarding the needed specification of the learning model 4 may also include information regarding the structure of the learning model 4 such as accuracy and computation speed. The attribute data may be generated when the structure of the learning model 4 is determined in step S102 in each learning apparatus 2. Upon acquiring the attribute data, the control unit 11 advances the processing to the next step S802.

(Steps S802 and S803)

In step S802, the control unit 11 performs clustering of the attribute data acquired from each learning apparatus 2. The method for clustering is not limited in particular, and may be selected as appropriate depending on the embodiment. A known method such as k-means clustering may be adopted for clustering, for example.

In step S803, the control unit 11 assigns each learning apparatus 2 to at least one of the plurality of groups based on the clustering result. The control unit 11 assigns a plurality of learning apparatuses 2 for which acquired attribute data obtained therefrom is assigned to the same class to the same group, for example. In this case, each group may be set in accordance with the class of the attribute data. The control unit 11 may also assign each learning apparatus 2 to two or more groups based on the clustering result.

Upon completing assignment of groups based on the clustering result, the control unit 11 ends the series of processing regarding the assignment of groups by the second grouping method. According to this second grouping method, the control unit 11 can assign each learning apparatus 2 to an appropriate group according to the attribute of the learning model 4.

(C) Third Grouping Method

When the grouping of the learning apparatuses 2 is changed, the trained learning models 4 to which integration processing is to be applied are also changed. With this, the degree of improvement of the capabilities that the trained learning models 4 are caused to learn by executing the integration processing may differ. Therefore, in the third grouping method, the control unit 11 optimizes the assignment of the learning apparatuses 2 to the plurality of groups such that the predetermined capability of the trained learning models 4 improves after execution of the integration processing relative to that before execution of the integration processing in step S303, similarly to the third method for determining the integration range 41 described above. The optimization method may be determined as appropriate depending on the embodiment, similarly to the third method for determining the integration range 41 described above.

FIG. 19 is a flowchart illustrating an example of the processing procedure regarding assignment of the learning apparatuses 2 to groups according to the third grouping method. Note that optimization of assignment of the learning apparatus 2 to the groups is constituted by processing in steps S904 to S906 below. Note that the processing procedure described below is merely an example, and the processing may be changed to the extent possible. In the processing procedure described below, steps may also be omitted, replaced, or added as appropriate depending on the embodiment.

(Step S901)

In step S901, the control unit 11 operates as the grouping unit 116, and performs a plurality of provisional groupings in which the assignment of the learning apparatuses 2 to the plurality of groups differs. Each provisional grouping may be determined as appropriate. For example, the control unit 11 may also perform the plurality of provisional groupings by assigning each learning apparatus 2 to one of a plurality of groups at random. Also, for example, the control unit 11 may perform provisional grouping with at least one of the first grouping method and the second grouping method. Upon performing a plurality of provisional groupings in which assignment differs, the control unit 11 advances the processing to the next step S902. Note that the control unit 11 collects the trained learning models 4 from the learning apparatuses 2 by executing step S301 described above before or after step S901.

(Step S902)

In step S902, the control unit 11 operates as the range adjusting unit 112, and determines, for each provisional grouping, the integration range 41 within the common portion 40 included in the collected trained learning models 4 in the same group. In step S902, the method for determining the integration range 41 may be similar to that in step S302 described above. Upon determining the integration range 41 in the same group for each provisional grouping, the control unit 11 advances the processing to the next step S903.

(Step S903)

In step S903, the control unit 11 operates as the integration processing unit 113, and executes, for each provisional grouping, integration processing of integrating the result of machine learning reflected in the determined integration range 41 to the trained learning models 4 in the same group. The integration processing in step S903 may be similar to that in step S303. Upon executing the integration processing in the same group for each provisional grouping, the control unit 11 advances the processing to the next step S904.

(Step S904)

In step S904, the control unit 11 operates as the grouping unit 116, and acquires, after executing the integration processing in the same group for each provisional grouping, the result obtained by each trained learning model 4 exerting the predetermined capability on the evaluation sample 129. The method for acquiring the results in step S904 may be similar to that in step S603 described above. That is, the control unit 11 inputs input data 1291 to the input layer 51 of each trained learning model 4 subjected to the integration processing in the same group, and determines, for each provisional grouping and sequentially from the input side, how each of the neurons included in the layers 51 to 56 fires. With this, the control unit 11 acquires an output value corresponding to the result of exerting the predetermined capability on the input data 1291 from the output layer 56 of each trained learning model 4 subjected to the integration processing in the same group, for each provisional grouping. Upon acquiring the results, the control unit 11 advances the processing to the next step S905. Note that, with respect to the processing in step 905 and onward as well, the control unit 11 operates as the grouping unit 116, and executes the processing.

(Step S905)

In step S905, the control unit 11 specifies the provisional grouping in which the predetermined capability of the trained learning models 4 subjected to the integration processing in the same group is highest, based on the acquired results. The method for comparing the predetermined capability of the trained learning models 4 in the group that is obtained by the integration processing with respect to each provisional grouping may be similar to that in step S604 described above. That is, the control unit 11 may also calculate the correct answer rates of the trained learning models 4 subjected to the integration processing in the same group, with respect to the input data 1291, from the result, by comparing the output value obtained from the trained learning models 4 with the correct answer data 1292 for each provisional grouping. Next, the control unit 11 may compare the correct answer rates of the trained learning models 4 calculated in the respective groups, for each provisional grouping. Also, the control unit 11 may specify the provisional grouping for which the trained learning model 4 having the highest correct answer rate is obtained, based on the comparison result. With this, the control unit 11 can specify the provisional grouping for which the predetermined capability of the trained learning models 4 after the integration processing has been executed in the same group is highest. Upon specifying the provisional grouping for which the predetermined capability of the trained learning models 4 after the integration processing is highest, the control unit 11 advances the processing to the next step S906.

(Step S906)

In step S906, the control unit 11 adopts the specified provisional grouping as the grouping of the learning apparatuses 2. That is, the control unit 11 assigns each learning apparatus 2 to at least one of the plurality of groups according to the specified provisional grouping. Upon completing the assignment of the learning apparatuses 2, the control unit 11 ends the series of processing relating to the group assignment with the third grouping method.

Note that when the third grouping method is adopted, the control unit 11 uses the result of executing step S902 with respect to the provisional grouping for which the predetermined capability of the trained learning models 4 subjected to the integration processing is highest as the execution result of step S302. Also, the control unit 11 uses the result of executing step S903 with respect to the provisional grouping as the execution result of step S303.

With this, for the grouping of the learning apparatuses 2, the control unit 11 can adopt a candidate for which the predetermined capability improves by the integration processing, out of a plurality of grouping candidates (provisional groupings). Therefore, according to the third grouping method, the most suitable grouping with which the predetermined capability improves the most by the integration processing can be performed.

Note that when a learning apparatus 2 whose predetermined capability improves and a learning apparatus 2 whose predetermined capability degrades after integration processing are both present in the learning apparatuses 2 included in a group of the provisional grouping, the handling of this provisional grouping may be selected as appropriate depending on the embodiment. For example, the control unit 11 may not adopt the provisional grouping, and adopt a different provisional grouping as the grouping of the learning apparatuses 2. Also, for example, the control unit 11 may, along with adopting the provisional grouping as the grouping of the learning apparatuses 2, distribute the result 43 of integration processing to learning apparatuses 2 whose predetermined capability improves after integration processing, and may not distribute the result 43 of integration processing to learning apparatuses 2 whose predetermined capability degrades, for example.

As a result of adopting at least one of the three method described above, the control unit 11 can appropriately perform grouping of the learning apparatuses 2. Note that the method for grouping is not limited to these examples, and may be determined as appropriate depending on the embodiment. For example, the control unit 11 may also accept grouping designated by an operator via the input apparatus 14, for example. In this case, the control unit 11 may perform grouping of the learning apparatuses 2 according to the designation made by the operator.

Note that each learning apparatus 2 may also be assigned to two or more groups. In this case, the learning apparatuses 2 assigned to two or more groups may selectively apply the result 43 of integration processing executed in one group to the integration range 41 of their trained learning model 4. For example, the configuration may be such that the learning apparatus 2 selects the result of integration processing in which the predetermined capability improves the most from the results of integration processing obtained in the respective groups, and applies the selected result of integration processing to the integration range 41 of their trained learning model 4.

[Features]

As described above, the model integration apparatus 1 according to the present embodiment does not gather the local learning data 3 itself, but collects the trained learning models 4 constructed by the learning apparatuses 2 and executes integration processing with respect to the collected trained learning models 4, with the processing in steps S301 and S303. Therefore, the communication cost and the calculation cost incurred by the model integration apparatus 1 can be kept low. Also, the integration processing in step S303 is merely executed with respect to the integration range 41 set in the common portion 40, which is included in each of the trained learning models 4, and therefore a difference in structure among the learning models 4 is permitted. That is, even if the formats of the local learning data 3 and the structures of the learning models 4 differ, the integration processing with respect to the trained learning models 4 in step S303 can be executed.

Also, the result of machine learning reflected in any of the trained learning models 4 can be appropriately reflected in another trained learning model 4 by the integration processing. With this, a trained learning model 4 subjected to the integration processing can appropriately exert the predetermined capability on data that cannot be obtained by the individual learning apparatus 2 as well, based on the results of machine learning with the other trained learning models 4. Therefore, according to the model integration apparatus 1 according to the present embodiment, an environment for constructing a trained learning model 4 having a higher predetermined capability can be realized. Moreover, with the model integration apparatus 1 according to the present embodiment, as a result of determining the most suitable integration range 41 and the most suitable grouping by processing in step S302 and grouping, a trained learning model 4 having a higher predetermined capability can be obtained.

4. Modifications

Although an embodiment of the present invention has been described above in detail, the above descriptions are merely examples of the present invention in all aspects. Needless to say, various improvements and modifications can be made without departing from the scope of the present invention. For example, the following modifications are possible. Note that, in the following description, the same constituent elements as the constituent elements described in the above embodiment are assigned the same reference numerals, and descriptions of the same points as the points described in the above embodiment are omitted as appropriate. The following modifications may be combined as appropriate.

<4.1>

The model integration apparatus 1 according to the embodiment described above is applied to a scenario in which features included in sensing data obtained by the sensor S are inferred. However, the application range of the embodiment described above is not limited to this example. The model integration apparatus 1 according to the embodiment described above can be applied to any scenario in which a learning model is caused to learn a predetermined capability by machine learning. In the following, five modifications in which the application scenario is limited will be illustrated.

(A) Scenario of Visual Inspection

Figure 20:
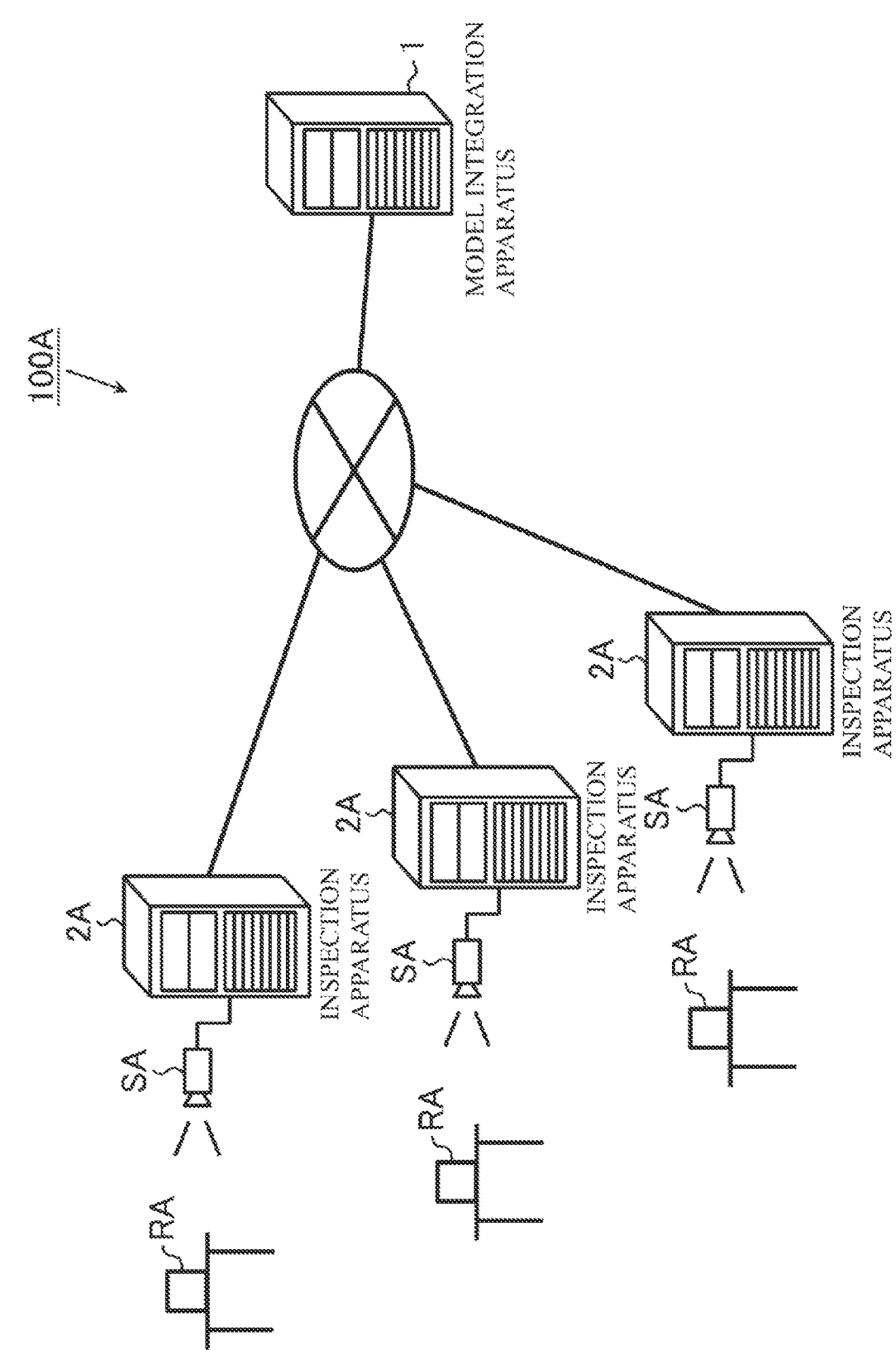
FIG. 20 is a schematic diagram illustrating an example of another scenario to which an embodiment is applied.

FIG. 20 schematically illustrates an example of the application scenario of an inspection system 100A according to a first modification. This modification is an example in which the model integration apparatus 1 according to the embodiment described above is applied to a scenario in which products RA produced in a production line are visually inspected. As shown in FIG. 20, the inspection system 100A according to this modification includes the model integration apparatus 1 and a plurality of inspection apparatuses 2A. Similarly to the embodiment described above, the model integration apparatus 1 and the inspection apparatuses 2A may be connected to each other via a network.

The inspection apparatuses 2A correspond to the learning apparatus 2 described above. The inspection apparatuses 2A may be configured similarly to the above-described learning apparatus 2, except that the data that they handle is different. In this modification, the inspection apparatuses 2A are each connected to a camera SA. Each inspection apparatus 2A acquires image data of a product RA by shooting the product RA with the camera SA. The type of the camera SA is not limited in particular. The camera SA may be a common digital camera configured to acquire an RGB image, a depth camera configured to acquire a depth image, an infrared camera configured to image an infrared amount, or the like. Each inspection apparatus 2A inspects the state of a product RA (that is, determines the quality of a product RA) based on the obtained image data.

<Hardware Configuration of Inspection Apparatus>

Figure 21:
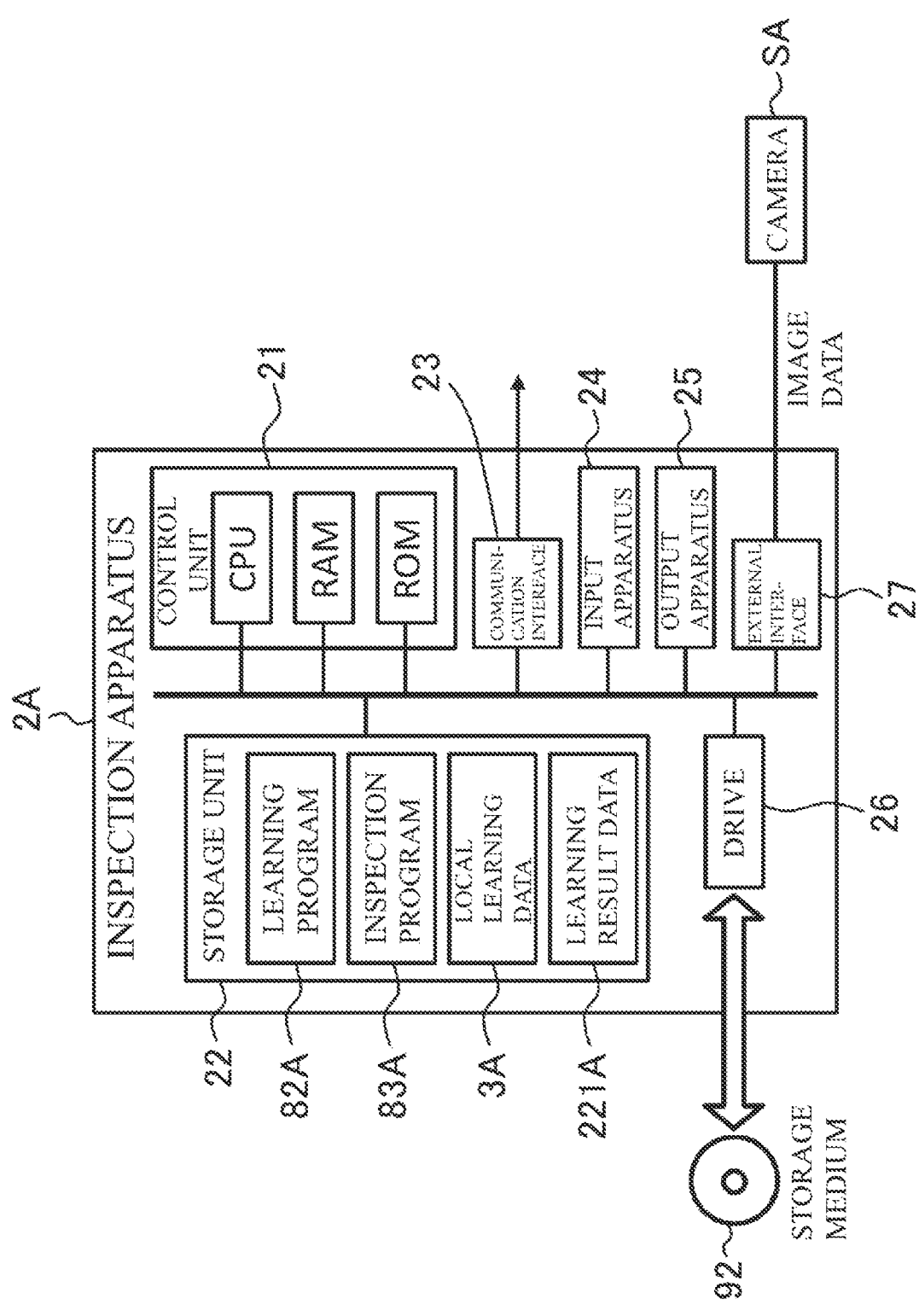
FIG. 21 is a schematic diagram illustrating an example of a hardware configuration of an inspection apparatus according to another mode.

FIG. 21 schematically illustrates an example of the hardware configuration of the inspection apparatuses 2A according to this modification. As shown in FIG. 21, each inspection apparatus 2A according to this modification is a computer in which a control unit 21, a storage unit 22, a communication interface 23, an input apparatus 24, an output apparatus 25, a drive 26, and an external interface 27 are electrically connected, similarly to the above-described learning apparatus 2. Each inspection apparatus 2A is connected to the camera SA via an external interface 27. Note that the hardware configuration of the inspection apparatuses 2A is not limited to this example. As far as the specific hardware configuration of the inspection apparatuses 2A is concerned, constituent elements can be omitted, replaced, or added as appropriate depending on the embodiment. The inspection apparatuses 2A may not only be general-purpose server apparatuses, general-purpose PCs, PLCs (programmable logic controllers), or the like, but also information processing apparatuses that are specifically designed for the service to be provided.

The storage unit 22 of the inspection apparatuses 2A according to this modification stores various types of information such as a learning program 82A, an inspection program 83A, local learning data 3A, and learning result data 221A. The learning program 82A, the inspection program 83A, the local learning data 3A, and the learning result data 221A respectively correspond to the learning program 82, the inference program 83, the local learning data 3, and the learning result data 221 according to the embodiment described above. At least one of the learning program 82A, the inspection program 83A, and the local learning data 3A may also be stored in a storage medium 92. Furthermore, the inspection apparatuses 2A may also acquire at least one of the learning program 82A, the inspection program 83A, and the local learning data 3A from the storage medium 92.

<Learning Processing>

Figure 22A:
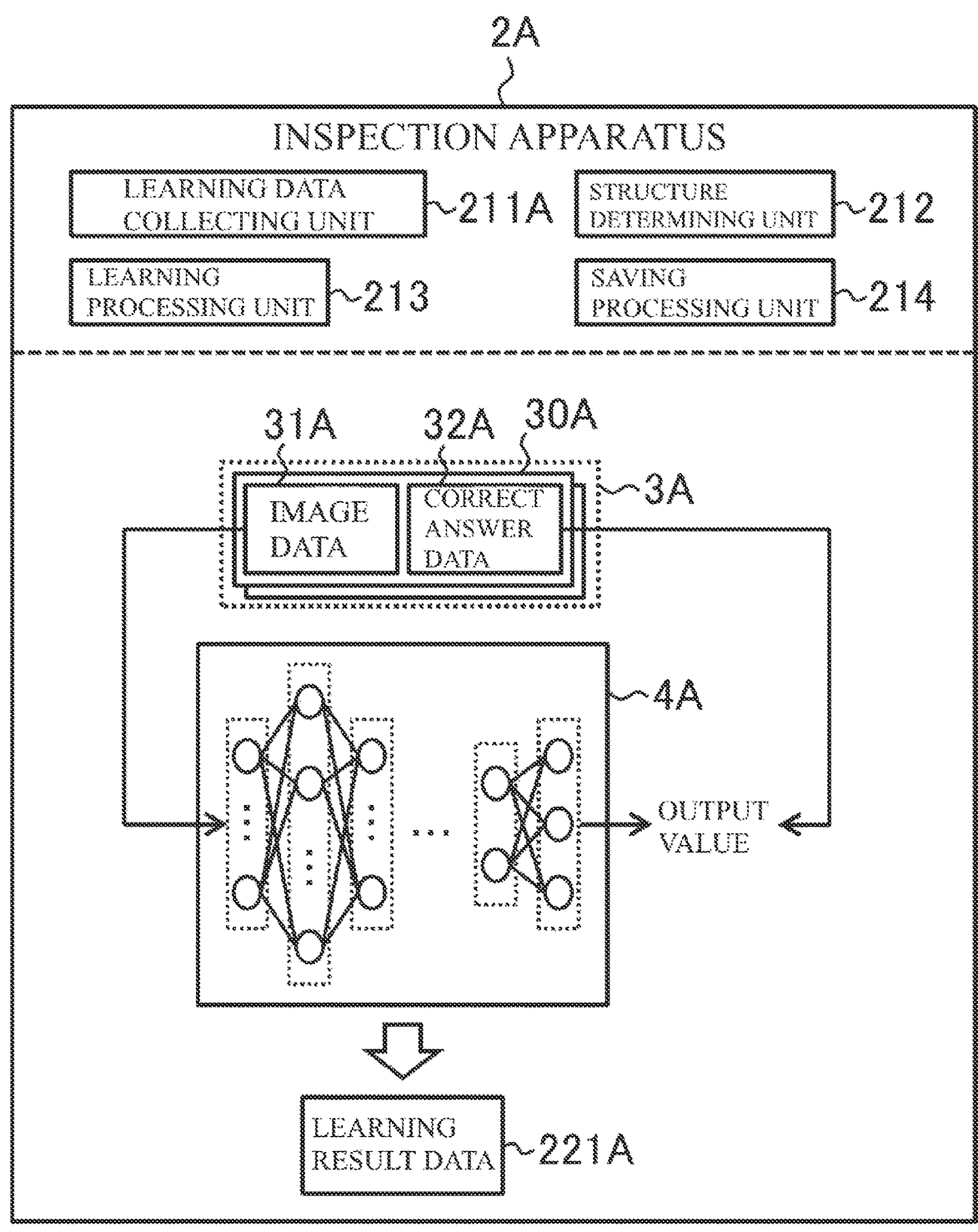
FIG. 22A is a schematic diagram illustrating an example of a software configuration for machine learning of an inspection apparatus according to another mode.

FIG. 22A schematically illustrates an example of the software configuration for learning processing of the inspection apparatuses 2A according to this modification. Similarly to the embodiment described above, the software configuration for the learning processing of the inspection apparatuses 2A is realized by the control unit 21 executing the learning program 82A. As shown in FIG. 22A, the software configuration for the learning processing of the inspection apparatuses 2A is similar to the software configuration for the learning processing of the learning apparatuses 2 described above, except for the fact that the data to be handled is changed from sensing data to image data. With this, each inspection apparatus 2A executes a series of processing for machine learning, similarly to the learning apparatuses 2 described above.

That is, in step S101, the control unit 21 of each inspection apparatus 2A operates as a learning data collecting unit 211A, and collects local learning data 3A to be used for machine learning of a learning model 4A. In this modification, the learning model 4A is constituted by a neural network, similarly to the learning model 4A according to the embodiment described above. Also, the local learning data 3A is constituted by a plurality of learning data sets 30A that each include a combination of image data 31A and correct answer data 32A. The image data 31A corresponds to the training data 31.

The method for acquiring the learning data set 30A may be selected as appropriate depending on the embodiment, similarly to the embodiment described above. For example, the image data 31A may be obtained by shooting products RA that include or do not include a defect such as a stain, a smudge, and a flaw, under various conditions by a camera, for example. Also, the obtained image data 31A is associated with the correct answer data 32A indicating the state (correct answer) of the product RA in the image of the image data 31A. With this, the learning data sets 30A may be generated.

In step S102, the control unit 21 operates as the structure determining unit 212, and determines the structure of the learning model 4A. In step S103, the control unit 21 operates as the learning processing unit 213, and executes machine learning using the collected local learning data 3A. That is, the control unit 11 trains the learning model 4A such that, for each learning data set 30A, when the image data 31A is input, an output value that matches the corresponding correct answer data 32A is output. With this, the control unit 11 can construct a trained learning model 4A that has acquired the capability of determining the state of a product RA in an image of the image data 31A. In step S104, the control unit 21 operates as the saving processing unit 214, and generates information indicating the structure and computation parameters of the trained learning model 4A constructed by the machine learning, as the learning result data 221A. Also, the control unit 21 saves the generated learning result data 221A in a predetermined storage area.

<Inspection Processing>

Figure 22B:
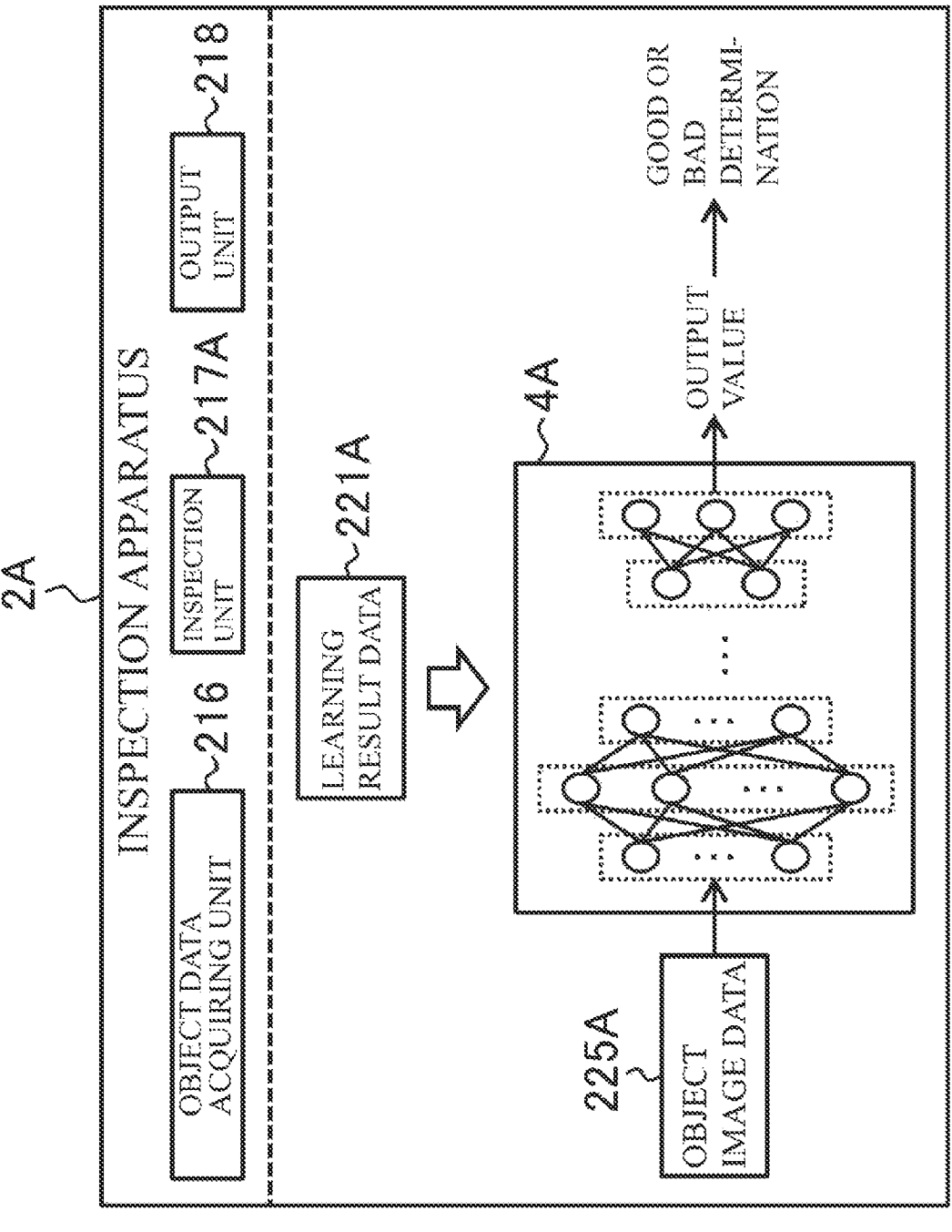
FIG. 22B is a schematic diagram illustrating an example of a software configuration for inspection processing of an inspection apparatus according to another mode.

FIG. 22B schematically illustrates an example of the software configuration for inspection processing of the inspection apparatuses 2A according to this modification. Similarly to the embodiment described above, the software configuration for the inspection processing of the inspection apparatuses 2A is realized by the control unit 21 executing the inspection program 83A. As shown in FIG. 22B, the software configuration for the inspection processing of the inspection apparatuses 2A is similar to the software configuration for the inference processing of the learning apparatuses 2 described above, except for the fact that the data to be handled is changed from sensing data to image data. With this, each inspection apparatus 2A executes a series of processing regarding the inspection processing, similarly to the learning apparatuses 2 described above.

That is, in step S201, the control unit 21 operates as the object data acquiring unit 216, and acquires, from the camera SA object image data 225A of images of the product RA on which visual inspection is performed. In step S202, the control unit 21 operates as the inspection unit 217A, and determines the state (quality) of a product RA in the image of the object image data 225A using the trained learning model 4A. Specifically, the control unit 21 configures the settings of the trained learning model 4A by referring to the learning result data 221A. Next, the control unit 21 inputs the acquired object image data 225A to the trained learning model 4A, and determines, sequentially from the input side, how each neuron fires. With this, the control unit 21 acquires an output value corresponding to the result of estimating the state of the product RA in the image of the object image data 225A from the trained learning model 4A. Note that the inspection unit 217A corresponds to the inference unit 217 described above. The inspection unit 217A includes the trained learning model 4A by retaining the learning result data 221A.

In step S203, the control unit 21 operates as the output unit 218, and outputs information regarding the result of estimating the state of the product RA. The output destination and output information may be determined as appropriate depending on the embodiment, similarly to the embodiment described above. For example, the control unit 21 may output the result of determining the state of a product RA to the output apparatus 25 as is. Also, the control unit 21 may output, if the product RA includes a defect, a warning for notifying this fact to the output apparatus 25. Also, when the inspection apparatuses 2A are connected to a conveyor apparatus (not illustrated) for conveying the products RA, the conveyor apparatus may be controlled such that products RA including no defect and products RA including a defect are conveyed on different lines based on the result of determining the states of the products RA, for example.

<Model Integration>

Each trained learning model 4A is configured to include a common portion having a common structure similarly to the learning model 4 described above. Also, the trained learning models 4A of some combination have different structures in a portion other than the common portion. The model integration apparatus 1 executes the processing in steps S301 to S304 described above with respect to the trained learning models 4A, similarly to the embodiment described above.

That is, in step S301, the model integration apparatus 1 collects the trained learning models 4A from the respective inspection apparatuses 2A. In step S302, the model integration apparatus 1 determines the integration range in the common portion included in each collected trained learning model 4A. In step S303, the model integration apparatus 1 executes integration processing of integrating the results of machine learning reflected in the integration range set in the common portion, with respect to the trained learning models 4A. In step S304, the model integration apparatus 1 distributes the result of the integration processing to the inspection apparatuses 2A, and updates the trained learning models 4A retained by the inspection apparatuses 2A by causing the inspection apparatuses 2A to apply the result of the integration processing to the integration range in the trained learning models 4A.

According to this modification, in a scenario in which the state of a product in an image of the image data is inspected, the result of machine learning reflected in one trained learning model 4A can be appropriately reflected in other trained learning models 4A. With this, each trained learning model 4A subjected to the integration processing can also appropriately estimate the state of a product RA with respect to object image data 225A that cannot be obtained by the individual inspection apparatus 2A, based on the results of machine learning performed in the other trained learning models 4A. For example, assume that a scenario in which a defect has occurred that has not been experienced by one inspection apparatus 2A. In this scenario, if another inspection apparatus 2A has experienced that defect, this experience can be reflected in the trained learning model 4A of the one inspection apparatus 2A via the trained learning model 4A constructed in the other inspection apparatus 2A. Therefore, as a result of using the trained learning model 4A subjected to the integration processing, the one inspection apparatus 2A can estimate that the product RA includes this not yet experienced defect. Therefore, according to this modification, a trained learning model 4A having a higher capability of estimating the state of the product RA can be constructed.

Note that, in this modification, the data to be used for determining the state of the product RA is not limited to image data. For example, sound data obtained by a microphone or measurement data obtained by an encoder may also be used along with or instead of the image data.

(B) Scenario of Controlling Cultivation Apparatus

Figure 23:
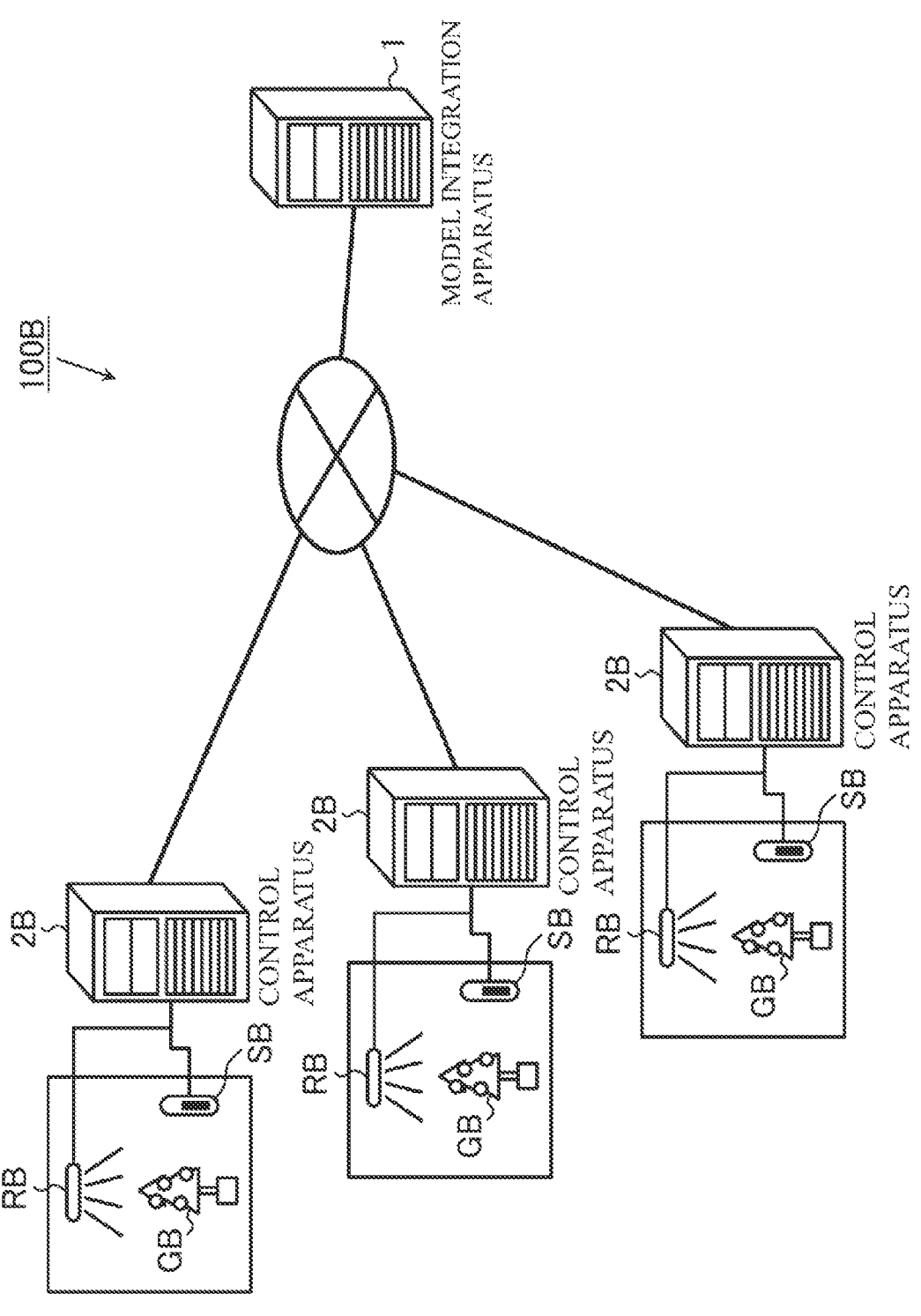
FIG. 23 is a schematic diagram illustrating an example of another scenario to which one or more embodiments may be applied.

FIG. 23 schematically illustrates an example of the application scenario of a control system 100B according to a second modification. This modification shows an example in which the model integration apparatus 1 according to the embodiment described above is applied to a scenario in which the operation of a cultivation apparatus RB is controlled according to the cultivation conditions. As shown in FIG. 23, a control system 100B according to this modification includes the model integration apparatus 1 and a plurality of control apparatuses 2B. Similarly to the embodiment described above, the model integration apparatus 1 and the control apparatuses 2B may be connected to each other via a network.

Each control apparatus 2B corresponds to the learning apparatus 2 described above. Each control apparatus 2B may be configured similarly to the learning apparatus 2, apart from the fact that the data to be handled is different. In this modification, each control apparatus 2B is connected to a corresponding cultivation apparatus RB and a sensor SB.

The cultivation apparatus RB is configured to cultivate the plant GB by controlling the growth environment of the plant GB. The type of the cultivation apparatus RB is not specifically limited, as long as it is able to control the growth environment of the plant GB, and may be selected as appropriate depending on the embodiment. The growth environment relates to the conditions of growing the plant GB, and includes the time for irradiating the plant GB with light, the temperature around the plant GB, the amount of water to the plant GB, and the like. The cultivation apparatus RB may be a curtain apparatus, an illumination apparatus, air conditioning equipment, a water sprinkling apparatus, or the like. The curtain apparatus is configured to open and close a curtain attached to a window of a building. The illumination apparatus is LED (light emitting diode) illumination, a fluorescent light, or the like. The air conditioning equipment is an air conditioner or the like. The water sprinkling apparatus is a sprinkler or the like. The curtain apparatus and the illumination apparatus are used to control the time for irradiating the plant GB with light. The air conditioning equipment is used for controlling the temperature around the plant GB. The water sprinkling apparatus is used to control the amount of water supplied to the plant GB.

Each control apparatus 2B acquires sensing data from its sensor SB as the condition data regarding the cultivation conditions of the plant GB, by the sensor SB sensing the cultivation conditions of the plant GB. The cultivation conditions relate to any element for cultivating the plant GB, and may be specified by the growth environment until the time of cultivation, the growth state, or the like. The growth state may be specified by the growth degree of the plant GB or the like. The type of the sensor SB is not limited in particular, as long as it is able to sense the cultivation conditions of the plant GB, and may be selected as appropriate depending on the embodiment. The sensor SB may be a photometer, a thermometer, a hygrometer, a camera, or the like. The camera may be an ordinary camera, a depth camera, an infrared camera, or the like. The control apparatuses 2B specify the cultivation conditions of the plant GB based on the obtained condition data, and control the operation of the cultivation apparatus RB so as to realize a growth environment that is suitable for the specified cultivation condition.

<Hardware Configuration of Control Apparatus>

Figure 24:
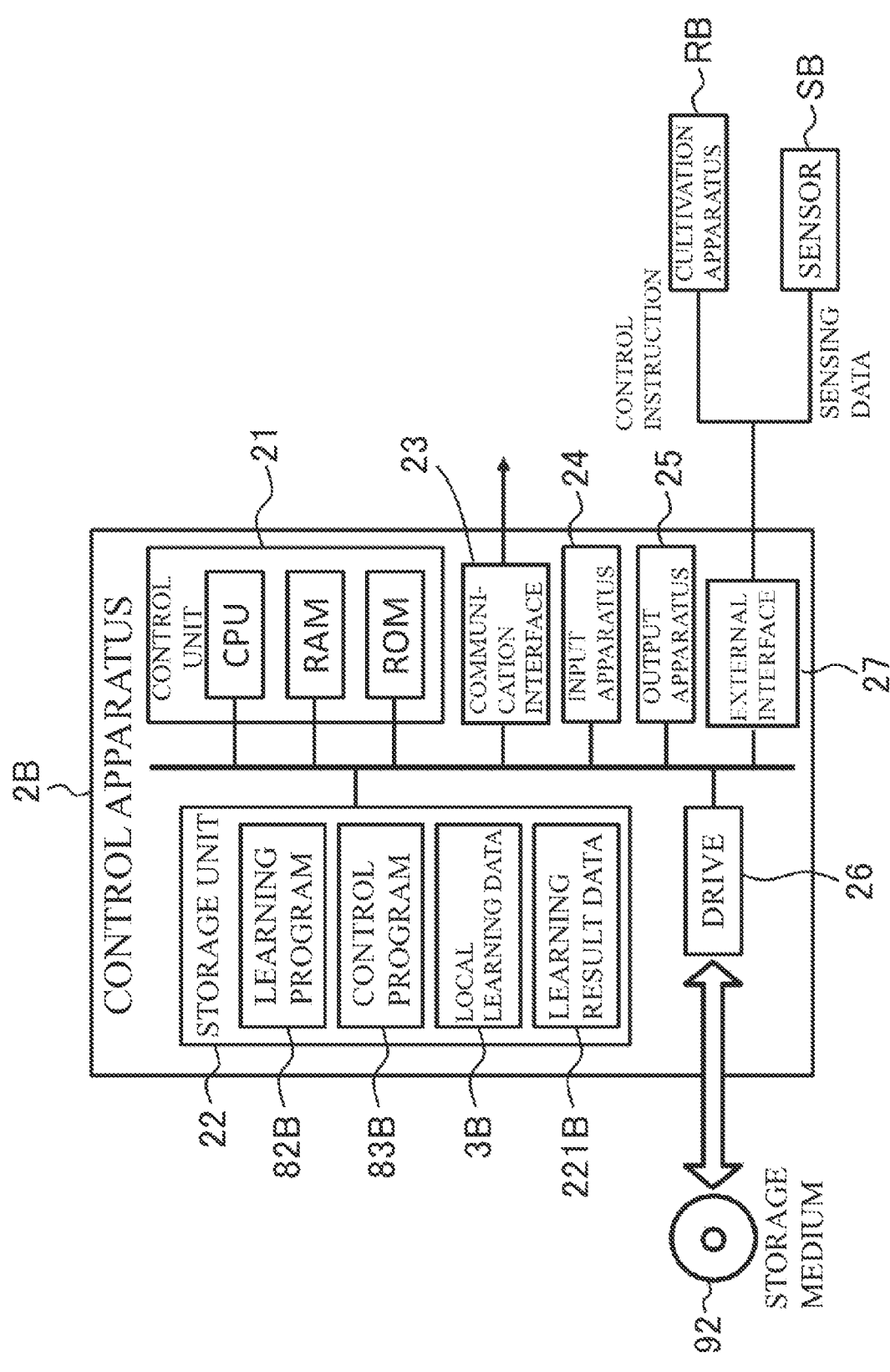
FIG. 24 is a schematic diagram illustrating an example of a hardware configuration of a control apparatus according to another mode.

FIG. 24 schematically illustrates an example of the hardware configuration of the control apparatuses 2B according to this modification. As shown in FIG. 24, each control apparatus 2B according to this modification is a computer in which a control unit 21, a storage unit 22, a communication interface 23, an input apparatus 24, an output apparatus 25, a drive 26, and an external interface 27 are electrically connected, similarly to the above-described learning apparatus 2. Each control apparatus 2B is connected to the cultivation apparatus RB and the sensor SB via the external interface 27. Note that the hardware configuration of the control apparatuses 2B is not limited to this example. As far as the specific hardware configuration of the control apparatuses 2B is concerned, constituent elements can be omitted, replaced, or added as appropriate depending on the embodiment. The control apparatuses 2B may not only be general-purpose server apparatuses, general-purpose PCs, PLCs, or the like, but also information processing apparatuses that are specifically designed for the service to be provided.

The storage unit 22 of the control apparatuses 2B according to this modification stores various types of information such as a learning program 82B, a control program 83B, local learning data 3B, and learning result data 221B. The learning program 82B, the control program 83B, the local learning data 3B, and the learning result data 221B respectively correspond to the learning program 82, the inference program 83, the local learning data 3, and the learning result data 221 according to the embodiment described above. At least one of the learning program 82B, the control program 83B, and the local learning data 3B may also be stored in a storage medium 92. Also, the control apparatuses 2B may also acquire at least one of the learning program 82B, the control program 83B, and the local learning data 3B from the storage medium 92.

<Learning Processing>

Figure 25A:
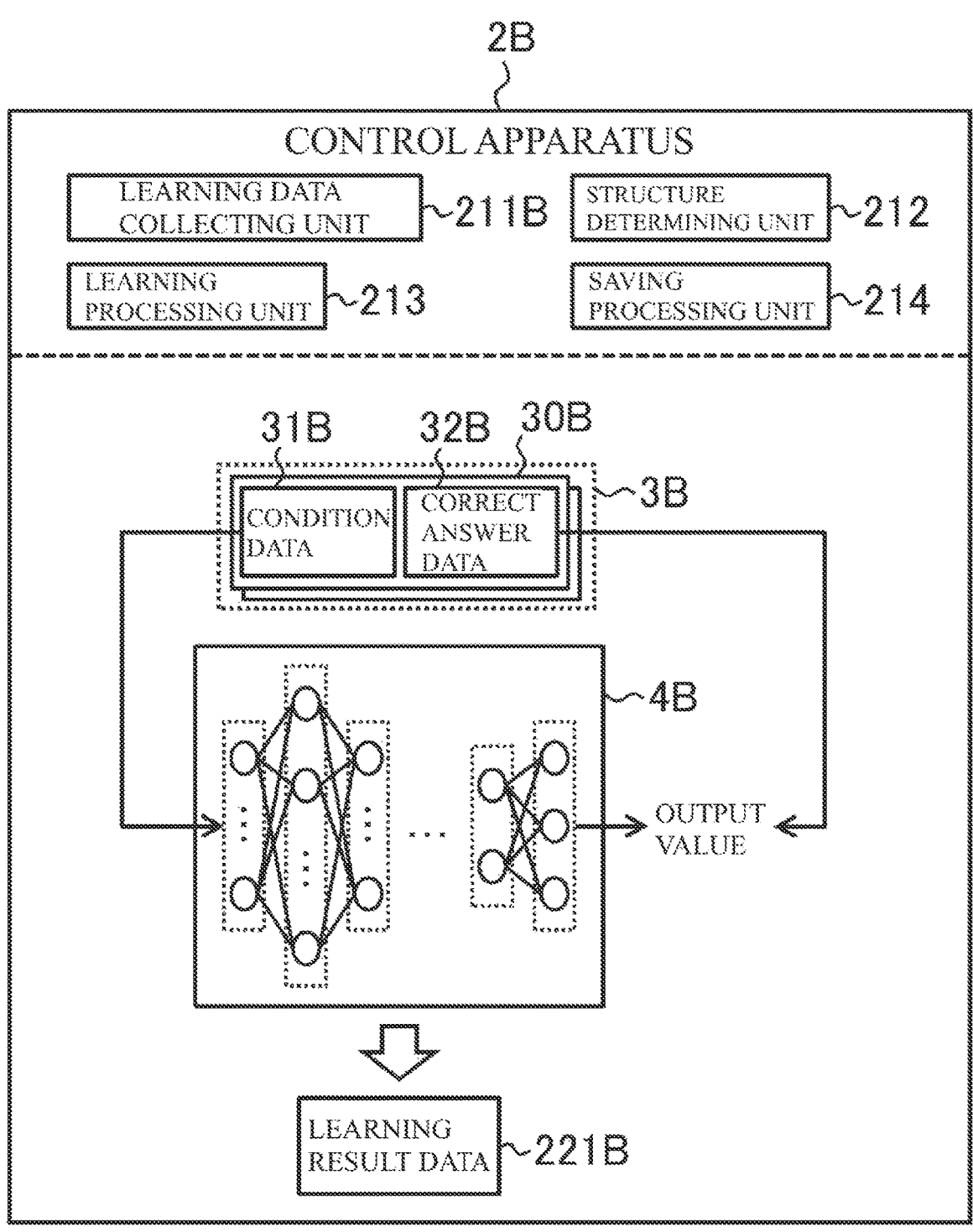
FIG. 25A is a schematic diagram illustrating an example of a software configuration for machine learning of a control apparatus according to another mode.

FIG. 25A schematically illustrates an example of the software configuration for learning processing of the control apparatuses 2B according to this modification. Similarly to the embodiment described above, the software configuration for the learning processing of the control apparatuses 2B is realized by the control unit 21 executing the learning program 82B. As shown in FIG. 25A, the software configuration for the learning processing of the control apparatuses 2B is similar to the software configuration for the learning processing of the learning apparatuses 2 described above, except for the fact that the data to be handled is changed from sensing data to condition data regarding the cultivation conditions of the plant GB. With this, each control apparatus 2B executes a series of processing for machine learning, similarly to the learning apparatuses 2 described above.

That is, in step S101, the control unit 21 of each control apparatus 2B operates as a learning data collecting unit 211B, and collects the local learning data 3B to be used for machine learning of a learning model 4B. In this modification, the learning model 4B is constituted by a neural network, similarly to the learning model 4 according to the embodiment described above. Also, the local learning data 3B is constituted by a plurality of learning data sets 30B each including a combination of condition data 31B and correct answer data 32B. The condition data 31B corresponds to the training data 31.

The method for acquiring the learning data sets 30B may be determined as appropriate depending on the embodiment, similarly to the embodiment described above. For example, the condition data 31B may be obtained by a sensor sensing the cultivation conditions of the plant GB under various conditions. Also, the obtained condition data 31B is associated with correct answer data 32B indicating a control instruction (correct answer) for instructing the cultivation apparatus RB to control the growth environment according to the cultivation conditions indicated by the condition data 31B. The control instruction (correct answer) may be given by an actual result of cultivating the plant GB, or an input made by an operator, for example. With this, the learning data sets 30B may be generated.

In step S102, the control unit 21 operates as the structure determining unit 212, and determines the structure of the learning model 4B. In step S103, the control unit 21 operates as the learning processing unit 213, and executes machine learning using the collected local learning data 3B. That is, the control unit 11 trains the learning model 4B such that, with respect to each learning data set 30B, when condition data 31B is input, an output value that matches the corresponding correct answer data 32B is output. With this, the control unit 11 can construct a trained learning model 4B that has acquired the capability of determining a control instruction that is given to the cultivation apparatus RB in accordance with the cultivation conditions of the plant GB. In step S104, the control unit 21 operates as the saving processing unit 214, and generates information indicating the structure and computation parameters of the trained learning model 4B constructed by the machine learning, as the learning result data 221B. Also, the control unit 21 saves the generated learning result data 221B in a predetermined storage area.

<Control Processing>

Figure 25B:
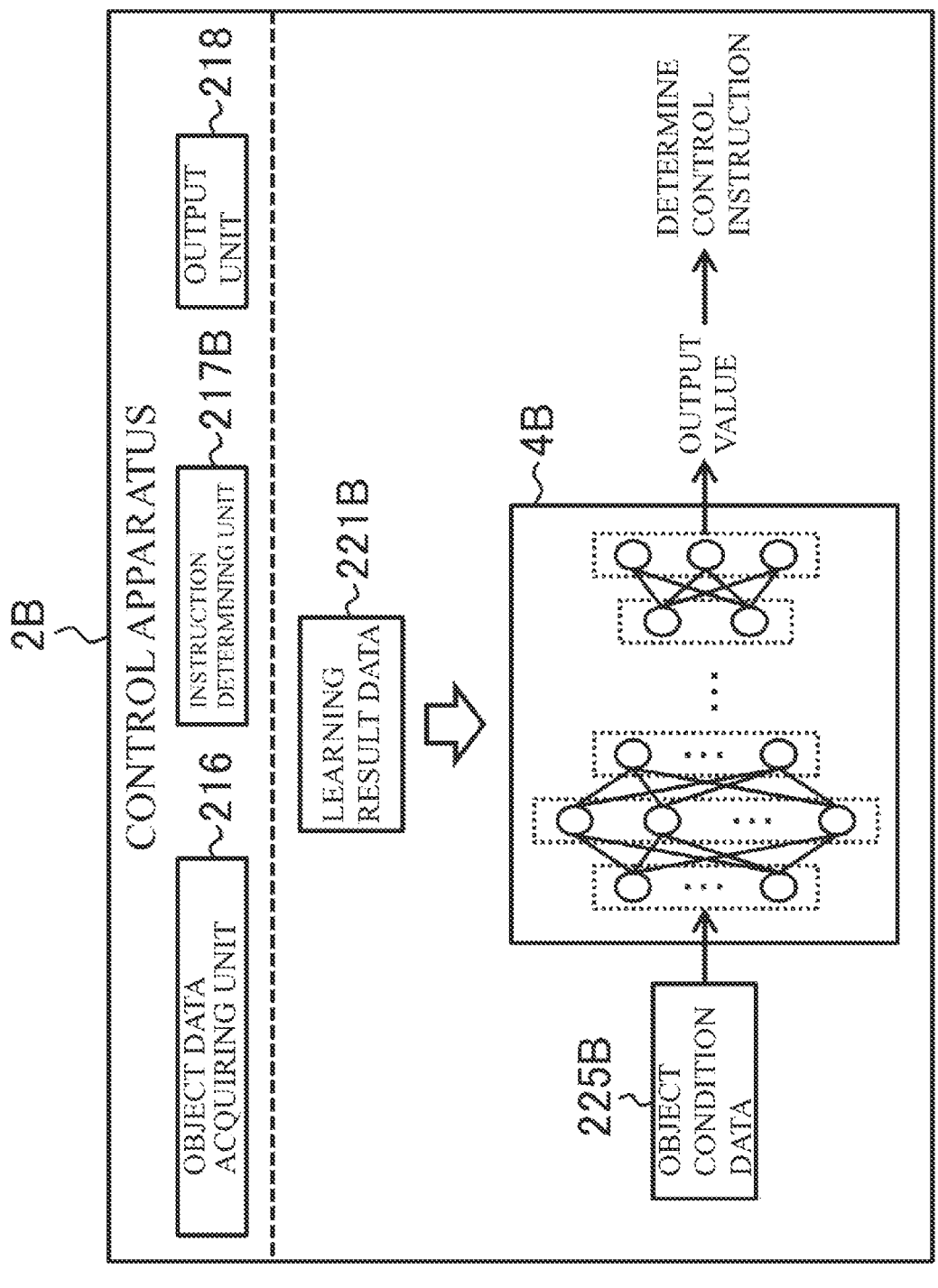
FIG. 25B is a schematic diagram illustrating an example of a software configuration for processing of determining a control instruction of a control apparatus according to another mode.

FIG. 25B schematically illustrates an example of the software configuration for control processing of the control apparatuses 2B according to this modification. Similarly to the embodiment described above, the software configuration for the control processing of the control apparatuses 2B is realized by the control unit 21 executing the control program 83B. As shown in FIG. 25B, the software configuration for the control processing of each control apparatus 2B is similar to the software configuration for the inference processing of the learning apparatuses 2 described above, except for the fact that the data to be handled is changed from sensing data to condition data. With this, each control apparatus 2B executes a series of processing regarding the control processing, similarly to the learning apparatuses 2 described above.

That is, in step S201, the control unit 21 operates as the object data acquiring unit 216, and acquires object condition data 225B regarding the cultivation conditions of the plant GB with respect to which the growth environment is to be controlled, from the sensor SB. In step S202, the control unit 21 operates as the instruction determining unit 217B, and determines the control instruction that is given to the cultivation apparatus RB in accordance with the cultivation conditions of the plant GB that are specified from the object condition data 225B, using the trained learning model 4B. Specifically, the control unit 21 configures the settings of the trained learning model 4B by referring to the learning result data 221B. Next, the control unit 21 inputs the acquired object condition data 225B to the trained learning model 4B, and determines, sequentially from the input side, how each of the neurons included in the layers fires. With this, the control unit 21 acquires an output value corresponding to the result of determining a control instruction that is given to the cultivation apparatus RB in accordance with the cultivation conditions of the plant GB that is specified from the object condition data 225B, from the trained learning model 4B. Note that the instruction determining unit 217B corresponds to the inference unit 217 described above. The instruction determining unit 217B includes the trained learning model 4B by retaining the learning result data 221B.

In step S203, the control unit 21 operates as the output unit 218, and outputs information regarding the result of determining the control instruction that is given to the cultivation apparatus RB. The output destination and output information may be determined as appropriate depending on the embodiment, similarly to the embodiment described above. For example, the control unit 21 may also control the operation of the cultivation apparatus RB by giving the determined control instruction to the cultivation apparatus RB. Also, the control unit 21 may prompt a manager of the plant GB to control the operation of the cultivation apparatus RB by outputting information indicating the determined control instruction to the output apparatus 25, for example. In this case, the control apparatus 2B may not be connected to the cultivation apparatus RB.

<Model Integration>

Each trained learning model 4B is configured to include a common portion having a common structure, similarly to the learning model 4 described above. Also, the trained learning models 4B of some combination have different structures in a portion other than the common portion. The model integration apparatus 1 executes the processing in steps S301 to S304 described above with respect to the trained learning models 4B, similarly to the embodiment described above.

That is, in step S301, the model integration apparatus 1 collects the trained learning models 4B from the respective control apparatuses 2B. In step S302, the model integration apparatus 1 determines the integration range in the common portion included in each collected trained learning model 4B. In step S303, the model integration apparatus 1 executes integration processing of integrating the result of machine learning reflected in the integration range set in the common portion, with respect to the trained learning models 4B. In step S304, the model integration apparatus 1 distributes the result of the integration processing to the control apparatuses 2B, and updates the trained learning models 4B retained by the control apparatuses 2B by causing the control apparatuses 2B to apply the result of the integration processing to the integration range in the trained learning models 4B.

According to this modification, in a scenario in which the operation of a cultivation apparatus is controlled, the result of machine learning reflected in one trained learning model 4B can be appropriately reflected in another trained learning model 4B. With this, each trained learning model 4B subjected to the integration processing can also appropriately control the operation of the cultivation apparatus RB with respect to cultivation conditions that cannot be obtained by the individual control apparatus 2B, based on the results of machine learning performed in the other trained learning models 4B. For example, assume that a control apparatus 2B that grows the plant GB in a warm climate area, and another control apparatus 2B that grows the plant GB in a cold climate area are present. In this scenario, it is envisioned that the control apparatus 2B in the warm climate area has hardly ever experienced to control the operation of the cultivation apparatus RB under cultivation conditions that are likely to occur in a cold climate area, and grows the plant GB. Therefore, the control apparatus 2B is unlikely to have experienced this situation on its own, and therefore if cultivation conditions that are likely to occur in the cold climate area are given in the warm climate area due to abnormal weather, it is possible that the control apparatus 2B cannot appropriately control the cultivation apparatus RB. In contrast, according to this modification, if another control apparatus 2B has experienced this situation, such experience can be reflected in the trained learning model 4B of the control apparatus 2B, via the trained learning model 4B constructed by the other control apparatus 2B. Therefore, as a result of using the trained learning model 4B subjected to the integration processing, the control apparatus 2B can appropriately control the cultivation apparatus RB, even under cultivation conditions that are unlikely to be experienced in the area. Therefore, according to this modification, a trained learning model 4B having a higher capability of appropriately controlling the cultivation apparatus RB can be constructed.

(C) Scenario of Driver Monitoring

Figure 26:
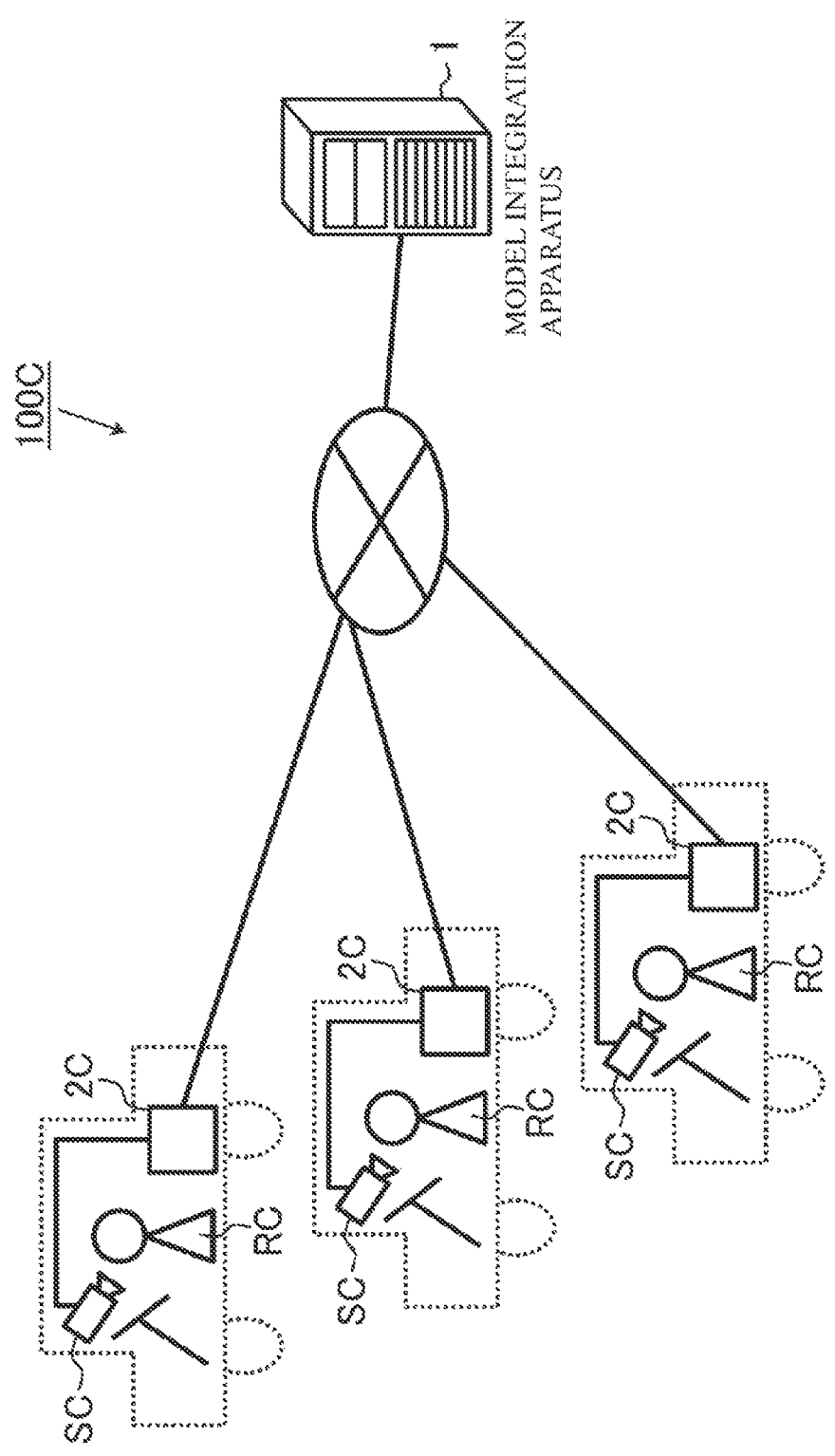
FIG. 26 is a schematic diagram illustrating an example of another scenario to which an embodiment is applied.

FIG. 26 schematically illustrates an example of an application scenario of a monitoring system 100C according to a third modification. This modification is an example in which the model integration apparatus 1 according to the embodiment described above is applied to a scenario in which the state of a driver RC that drives a vehicle is monitored. As shown in FIG. 26, the monitoring system 100C according to this modification includes the model integration apparatus 1 and a plurality of monitoring apparatuses 2C. Similarly to the embodiment described above, the model integration apparatus 1 and the monitoring apparatuses 2C may be connected to each other via a network.

The monitoring apparatuses 2C correspond to the learning apparatuses 2 described above. The monitoring apparatuses 2C may be configured similarly to the above-described learning apparatuses 2, except that the data that they handle is different. Each monitoring apparatus 2C estimates the state of a driver RC based on the data obtained by observing the driver RC. The data to be used for this estimation is not limited in particular, as long as the data relates to the state of the driver RC, and may be selected as appropriate depending on the embodiment. The data to be used for this estimation may be vital data of the driver RC, image data of images that may include the driver RC, or the like. In this modification, the monitoring apparatuses 2C are each connected to a camera SC that is arranged so as to be able to shoot (take images of) the driver RC. The camera SC may be an ordinary camera, a depth camera, an infrared camera, or the like. Each monitoring apparatus 2C estimates the state of the driver RC based on image data obtained from the camera SC. The state of the driver RC to be estimated may be determined as appropriate depending on the embodiment. The state of the driver RC to be estimated may be determined as appropriate depending on the embodiment, and may include a sleepiness degree that indicates the degree of sleepiness of the driver RC, a fatigue degree indicating the degree of fatigue, or a margin of capability indicating the margin of capability of the driver RC regarding driving, or a combination of these, for example.

<Hardware Configuration of Monitoring Apparatus>

Figure 27:
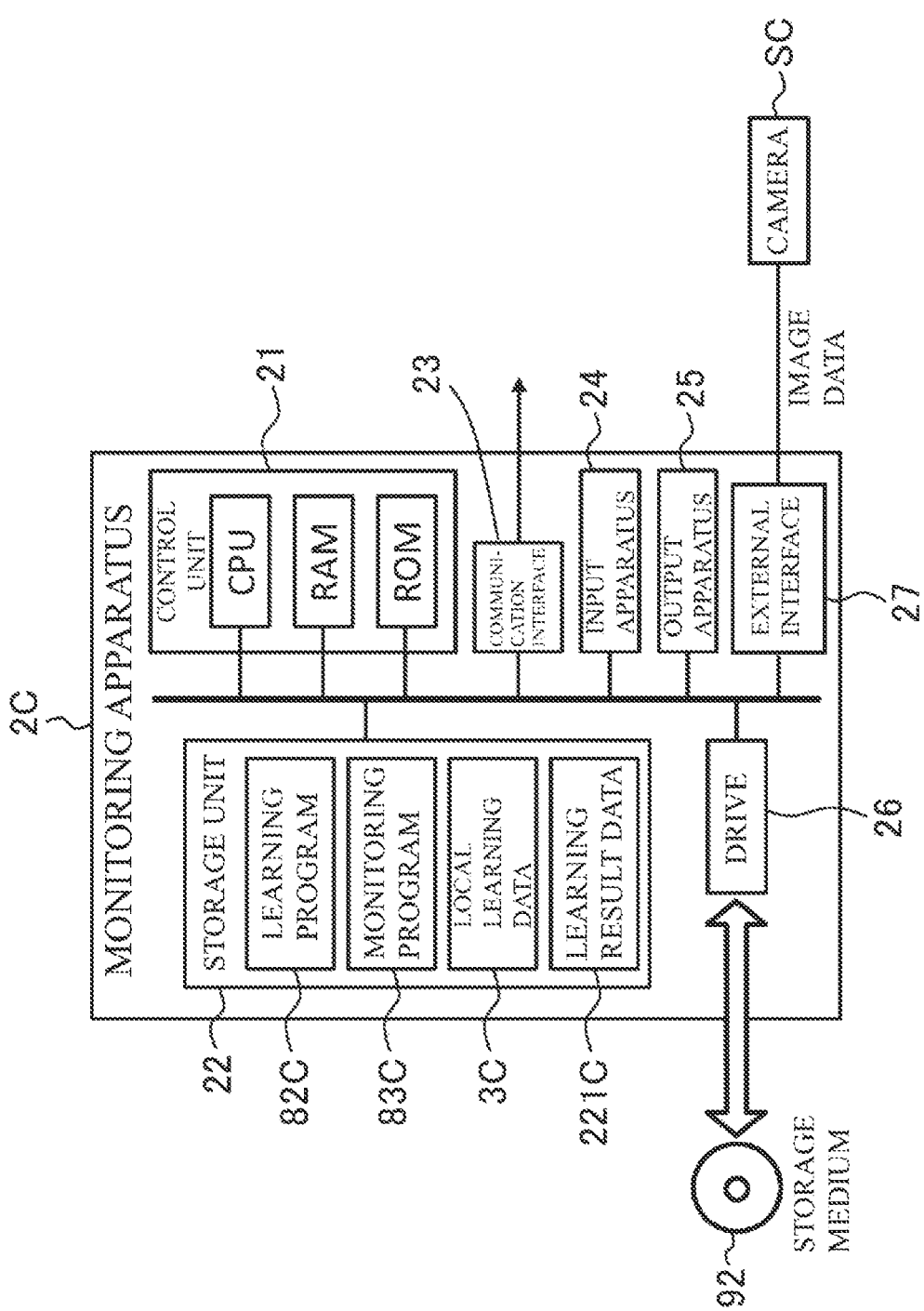
FIG. 27 is a schematic diagram illustrating an example of a hardware configuration of a monitoring apparatus according to another mode.

FIG. 27 schematically illustrates an example of the hardware configuration of the monitoring apparatuses 2C according to this modification. As shown in FIG. 27, each monitoring apparatus 2C according to this modification is a computer in which a control unit 21, a storage unit 22, a communication interface 23, an input apparatus 24, an output apparatus 25, a drive 26, and an external interface 27 are electrically connected, similarly to the above-described learning apparatus 2. The monitoring apparatuses 2C are each connected to the camera SC via the external interface 27. Note that the hardware configuration of the monitoring apparatuses 2C is not limited to this example. As far as the specific hardware configuration of the monitoring apparatuses 2C is concerned, constituent elements can be omitted, replaced, or added as appropriate depending on the embodiment. Each monitoring apparatus 2C may not only be a general-purpose computer, a mobile phone including a smartphone, in-vehicle apparatus, or the like, but also an information processing apparatus that is specifically designed for the service to be provided.

The storage unit 22 of the monitoring apparatuses 2C according to this modification stores various types of information such as a learning program 82C, a monitoring program 83C, local learning data 3C, and learning result data 221C. The learning program 82C, the monitoring program 83C, the local learning data 3C, and the learning result data 221C respectively correspond to the learning program 82, the inference program 83, the local learning data 3, and the learning result data 221 according to the embodiment described above. At least one of the learning program 82C, the monitoring program 83C, and the local learning data 3C may also be stored in a storage medium 92. Also, the monitoring apparatuses 2C may also acquire at least one of the learning program 82C, the monitoring program 83C, and the local learning data 3C from the storage medium 92.

<Learning Processing>

Figure 28A:
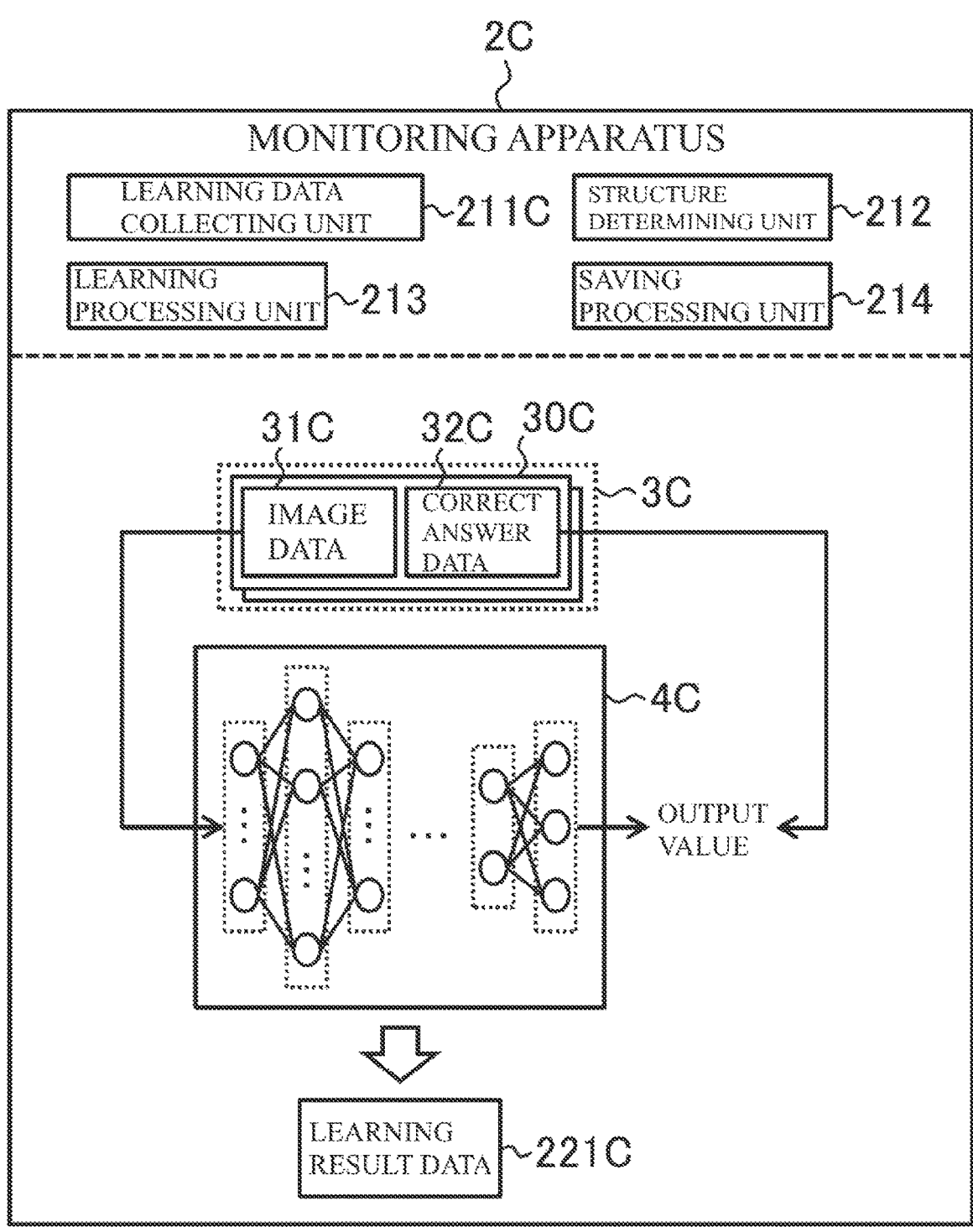
FIG. 28A is a schematic diagram illustrating an example of a software configuration for machine learning of a monitoring apparatus according to another mode.

FIG. 28A schematically illustrates an example of the software configuration for learning processing of the monitoring apparatuses 2C according to this modification. Similarly to the embodiment described above, the software configuration for the learning processing of the monitoring apparatuses 2C is realized by the control unit 21 executing the learning program 82C. As shown in FIG. 28A, the software configuration for the learning processing of the monitoring apparatuses 2C is similar to the software configuration for the learning processing of the learning apparatuses 2 described above, except for the fact that the data to be handled is changed from sensing data to image data of images that may include the driver RC. With this, each monitoring apparatus 2C executes a series of processing for machine learning, similarly to the learning apparatuses 2 described above.

That is, in step S101, the control unit 21 of each monitoring apparatus 2C operates as a learning data collecting unit 211C, and collects the local learning data 3C to be used for machine learning of a learning model 4C. In this modification, the learning model 4C is constituted by a neural network, similarly to the learning model 4 according to the embodiment described above. Also, the local learning data 3C is constituted by a plurality of learning data sets 30C that each include a combination of image data 31C and correct answer data 32C. The image data 31C corresponds to the training data 31.

The method for acquiring the learning data set 30C may be determined as appropriate depending on the embodiment, similarly to the embodiment described above. For example, the image data 31C may also be obtained by shooting an examinee (driver) that drives a vehicle by a camera under various conditions. Also, the obtained image data 31C is associated with the correct answer data 32C indicating the state (correct answer) of the examinee in the situation. The state (correct answer) of an examinee may be given by data obtained by another sensor other than a camera, an input made by an operator, or the like. With this, each learning data set 30C may be generated.

In step S102, the control unit 21 operates as the structure determining unit 212, and determines the structure of the learning model 4C. In step S103, the control unit 21 operates as the learning processing unit 213, and executes machine learning using the collected local learning data 3C. That is, the control unit 11 trains the learning model 4C such that, with respect to each learning data set 30C, when image data 31C is input, an output value that matches the corresponding correct answer data 32C is output. With this, the control unit 11 can construct a trained learning model 4C that has acquired the capability of estimating the state of the driver in an image of the image data 31C. In step S104, the control unit 21 operates as the saving processing unit 214, and generates information indicating the structure and computation parameters of the trained learning model 4C constructed by the machine learning, as the learning result data 221C. Also, the control unit 21 saves the generated learning result data 221C in a predetermined storage area.

<Monitoring Processing>

Figure 28B:
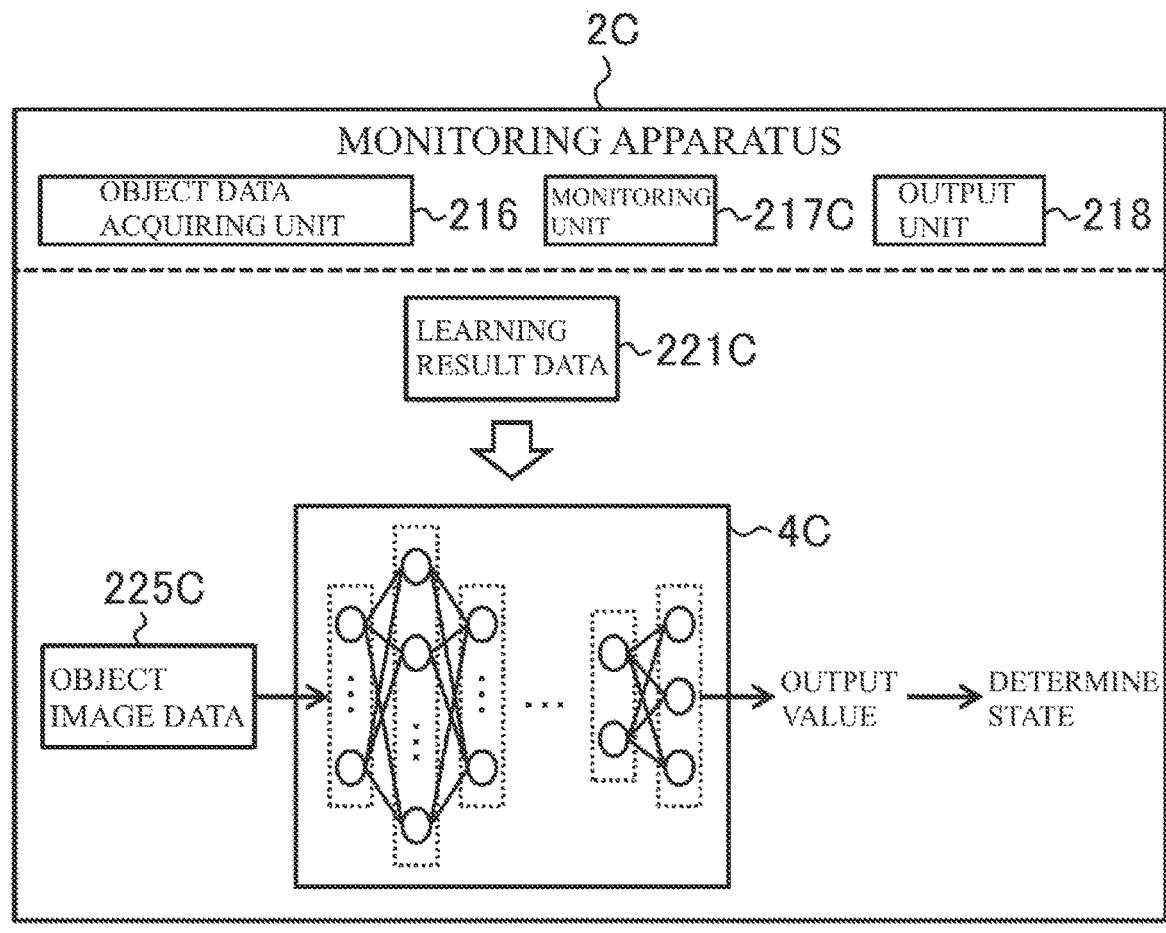
FIG. 28B is a schematic diagram illustrating an example of a software configuration for monitoring processing of a monitoring apparatus according to another mode.

FIG. 28B schematically illustrates an example of the software configuration regarding monitoring processing of each monitoring apparatus 2C according to this modification. Similarly to the embodiment described above, the software configuration regarding the monitoring processing of each monitoring apparatus 2C is realized by the control unit 21 executing the monitoring program 83C. As shown in FIG. 28B, the software configuration regarding the monitoring processing of each monitoring apparatus 2C is similar to the software configuration regarding the inference processing of each learning apparatus 2 described above, except the fact that the data to be handled is changed from sensing data to image data. With this, each monitoring apparatus 2C executes a series of processing regarding the monitoring processing, similarly to each learning apparatus 2 described above.

That is, in step S201, the control unit 21 operates as the object data acquiring unit 216, and acquires the object image data 225C of images that may include the driver RC from the camera SC. In step S202, the control unit 21 operates as the monitoring unit 217C, and estimates the state of the driver RC in the image of the object image data 225C, using the trained learning model 4C. Specifically, the control unit 21 configures the settings of the trained learning model 4C by referring to the learning result data 221C. Next, the control unit 21 inputs the acquired object image data 225C to the trained learning model 4C, and determines, sequentially from the input side, how each of the neurons included in the layers fires. With this, the control unit 21 acquires an output value corresponding to the result of estimating the state of the driver RC in the image of the object image data 225C from the trained learning model 4C. Note that the monitoring unit 217C corresponds to the inference unit 217 described above. The monitoring unit 217C includes the trained learning model 4C by retaining the learning result data 221C.

In step S203, the control unit 21 operates as the output unit 218, and outputs information regarding the result of estimating the state of the driver RC. The output destination and output information may be determined as appropriate depending on the embodiment, similarly to the embodiment described above. For example, the control unit 21 may output the result of estimating the state of the driver RC to the output apparatus 25 as is.

Also, for example, the control unit 21 may also output a specific message such as a warning to the output apparatus 25, depending on the state of the driver RC. For example, when at least one of the sleepiness degree and the fatigue degree is estimated as the state of the driver RC, the control unit 21 may determine whether or not at least one of the sleepiness degree and the fatigue degree exceeds a threshold value. The threshold value may be set as appropriate. And if at least one of the sleepiness degree and the fatigue degree exceeds the threshold value, the control unit 21 may output a warning prompting the driver RC to park in a parking area or the like and take a rest, to the output apparatus 25.

Also, when the vehicle is configured to perform autonomous driving, the control unit 21 may also control the operation of the autonomous driving of the vehicle based on the result of estimating the state of the driver RC, for example. Assume that the vehicle is configured to be switchable between an autonomous driving mode in which the movement of the vehicle is controlled by a system and manual driving mode in which the movement of the vehicle is controlled by steering performed by the driver RC, for example.

In this case, when the control unit 21 has received an instruction to switch from the autonomous driving mode to the manual driving mode from the driver RC or the system while the vehicle is driving in the autonomous driving mode, the control unit 21 may determine whether or not the estimated margin of capability of the driver RC exceeds a threshold value. Then, if the margin of capability of the driver RC exceeds the threshold value, the control unit 21 may permit switching from the autonomous driving mode to the manual driving mode. On the other hand, if the margin of capability of the driver RC is the threshold value or less, the control unit 21 may not permit switching from the autonomous driving mode to the manual driving mode, and keep moving in the autonomous driving mode.

Also, when the vehicle is driving in the manual driving mode, the control unit 21 may also determine whether or not at least one of the sleepiness degree and the fatigue degree exceeds a threshold value. Then, if at least one of the sleepiness degree and the fatigue degree exceeds the threshold value, the control unit 21 may also transmit an instruction for instructing to switch from the manual driving mode to the autonomous driving mode and stop at a safe location such as a parking area to the system of the vehicle. On the other hand, if not, the control unit 21 may also keep driving the vehicle in the manual driving mode.

Also, when the vehicle is driving in the manual driving mode, the control unit 21 may also determine whether or not the margin of capability is a threshold value or less. Then, if the margin of capability is the threshold value or less, the control unit 21 may also transmit an instruction for deceleration to the system of the vehicle. On the other hand, if not, the control unit 21 may also keep driving the vehicle by the operation of the driver RC.

<Model Integration>

Each trained learning model 4C is configured to include a common portion having a common structure, similarly to the learning model 4 described above. Also, the trained learning models 4C of some combination have different structures in a portion other than the common portion. The model integration apparatus 1 executes the processing in steps S301 to S304 described above with respect to the trained learning models 4C, similarly to the embodiment described above.

That is, in step S301, the model integration apparatus 1 collects the trained learning models 4C from the respective monitoring apparatuses 2C. In step S302, the model integration apparatus 1 determines the integration range in the common portion included in each of the collected trained learning models 4C. In step S303, the model integration apparatus 1 executes integration processing of integrating the results of machine learning reflected in the integration range set in the common portion, with respect to the trained learning models 4C. In step S304, the model integration apparatus 1 distributes the result of the integration processing to the monitoring apparatuses 2C, and updates the trained learning models 4C retained by the monitoring apparatuses 2C by causing the monitoring apparatuses 2C to apply the result of the integration processing to the integration range in the trained learning models 4C.

According to this modification, in a scenario in which the state of a driver is monitored, the result of machine learning reflected in one trained learning model 4C can be appropriately reflected in the other trained learning models 4C. With this, each trained learning model 4C subjected to the integration processing can also appropriately estimate the state of the driver RC with respect to the attribute of the driver RC and the driving environment that cannot be obtained by the individual monitoring apparatus 2C, based on the results of machine learning performed in the other trained learning models 4C. Therefore, according to this modification, a trained learning model 4C having a higher capability of appropriately estimate the state of the driver RC can be constructed.

(D) Scenario of Estimating Power Generation Amount

Figure 29:
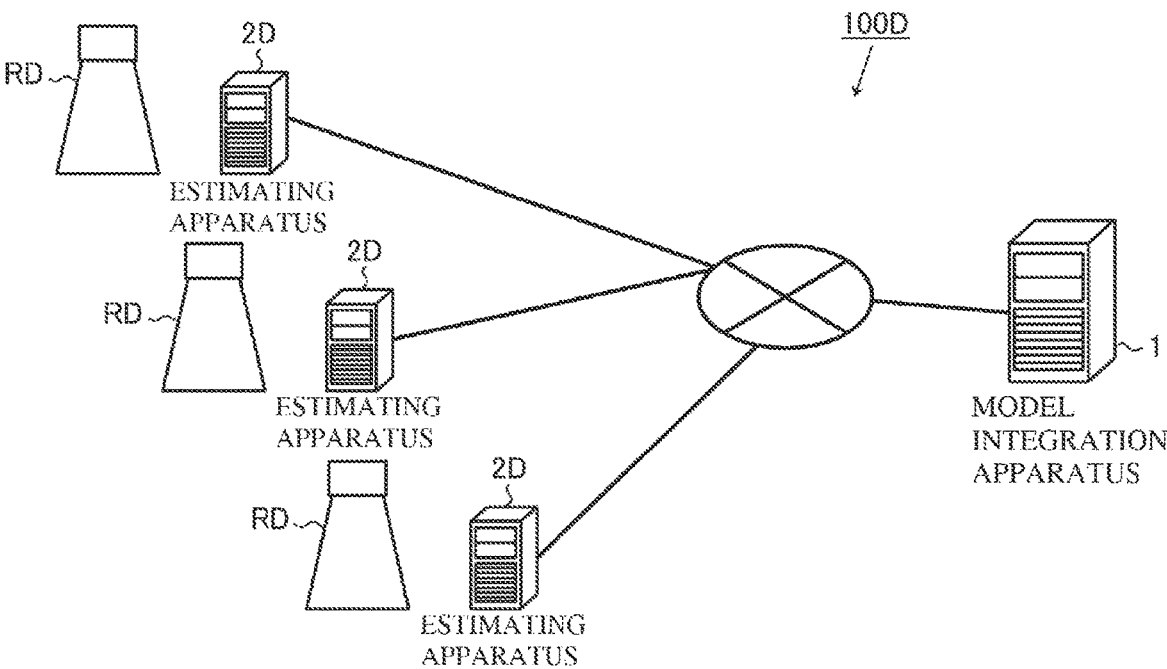
FIG. 29 is a schematic diagram illustrating an example of another scenario to which one or more embodiments may be applied.

FIG. 29 schematically illustrates an example of an application scenario of an estimating system 100D according to a fourth modification. This modification is an example in which the model integration apparatus 1 according to the embodiment described above is applied to a scenario in which the power generation amount in a power generating facility RD is estimated. As shown in FIG. 29, the estimating system 100D according to this modification includes the model integration apparatus 1 and a plurality of estimating apparatuses 2D. Similarly to the embodiment described above, the model integration apparatus 1 and the estimating apparatuses 2D may be connected to each other via a network.

The estimating apparatuses 2D correspond to the learning apparatuses 2 described above. The estimating apparatuses 2D may be configured similarly to the above-described learning apparatuses 2, except that the data that they handle is different. Each estimating apparatus 2D estimates a power generation amount in a power generating facility RD based on data regarding power generation of the power generating facility RD. The type of the power generating facility RD is not limited in particular, and may be a solar power generating facility, for example. The data that is used to estimate the power generation amount is not limited in particular, as long as that data relates to the power generation in the power generating facility RD, and may be selected as appropriate depending on the embodiment. In this modification, the power generating facility RD is a solar power generating facility, and each estimating apparatus 2D estimates the power generation amount of the corresponding power generating facility RD based on weather data.

<Hardware Configuration of Estimating Apparatus>

Figure 30:
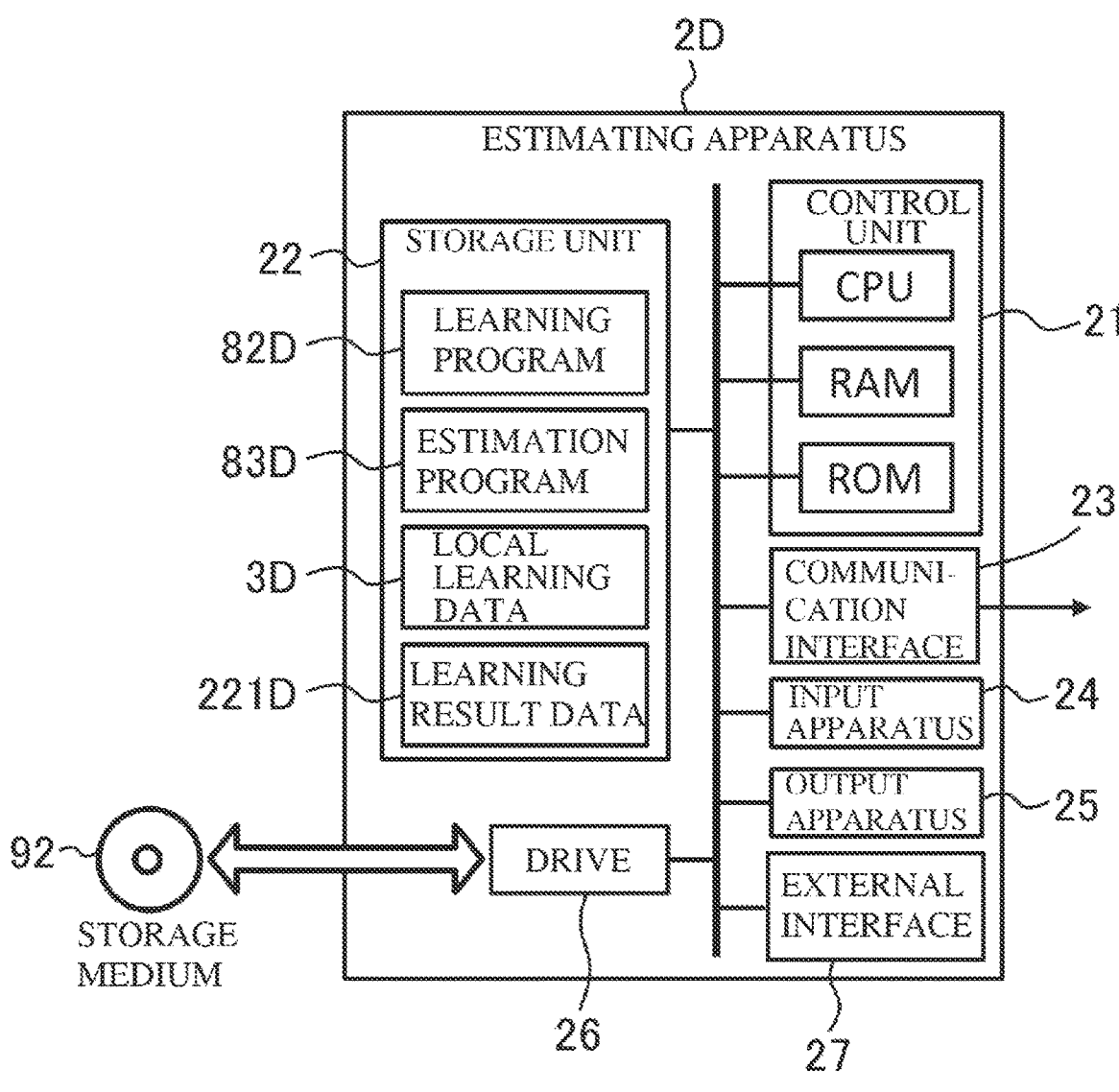
FIG. 30 is a schematic diagram illustrating an example of a hardware configuration of an estimating apparatus according to another mode.

FIG. 30 schematically illustrates an example of the hardware configuration of the estimating apparatuses 2D according to this modification. As shown in FIG. 30, each estimating apparatus 2D according to this modification is a computer in which a control unit 21, a storage unit 22, a communication interface 23, an input apparatus 24, an output apparatus 25, a drive 26, and an external interface 27 are electrically connected, similarly to the above-described learning apparatus 2. Note that the hardware configuration of the estimating apparatuses 2D is not limited to this example. As far as the specific hardware configuration of the estimating apparatuses 2D is concerned, constituent elements can be omitted, replaced, or added as appropriate depending on the embodiment. The estimating apparatuses 2D may not only be general-purpose server apparatuses, general-purpose PCs, or the like, but also information processing apparatuses that are specifically designed for the service to be provided.

The storage unit 22 of the estimating apparatuses 2D according to this modification stores various types of information such as a learning program 82D, an estimation program 83D, local learning data 3D, and learning result data 221D. The learning program 82D, the estimation program 83D, the local learning data 3D, and the learning result data 221D respectively correspond to the learning program 82, the inference program 83, the local learning data 3, and the learning result data 221 according to the embodiment described above. At least one of the learning program 82D, the estimation program 83D, and the local learning data 3D may also be stored in a storage medium 92. Also, the estimating apparatuses 2D may also acquire at least one of the learning program 82D, the estimation program 83D, and the local learning data 3D from the storage medium 92.

<Learning Processing>

Figure 31A:
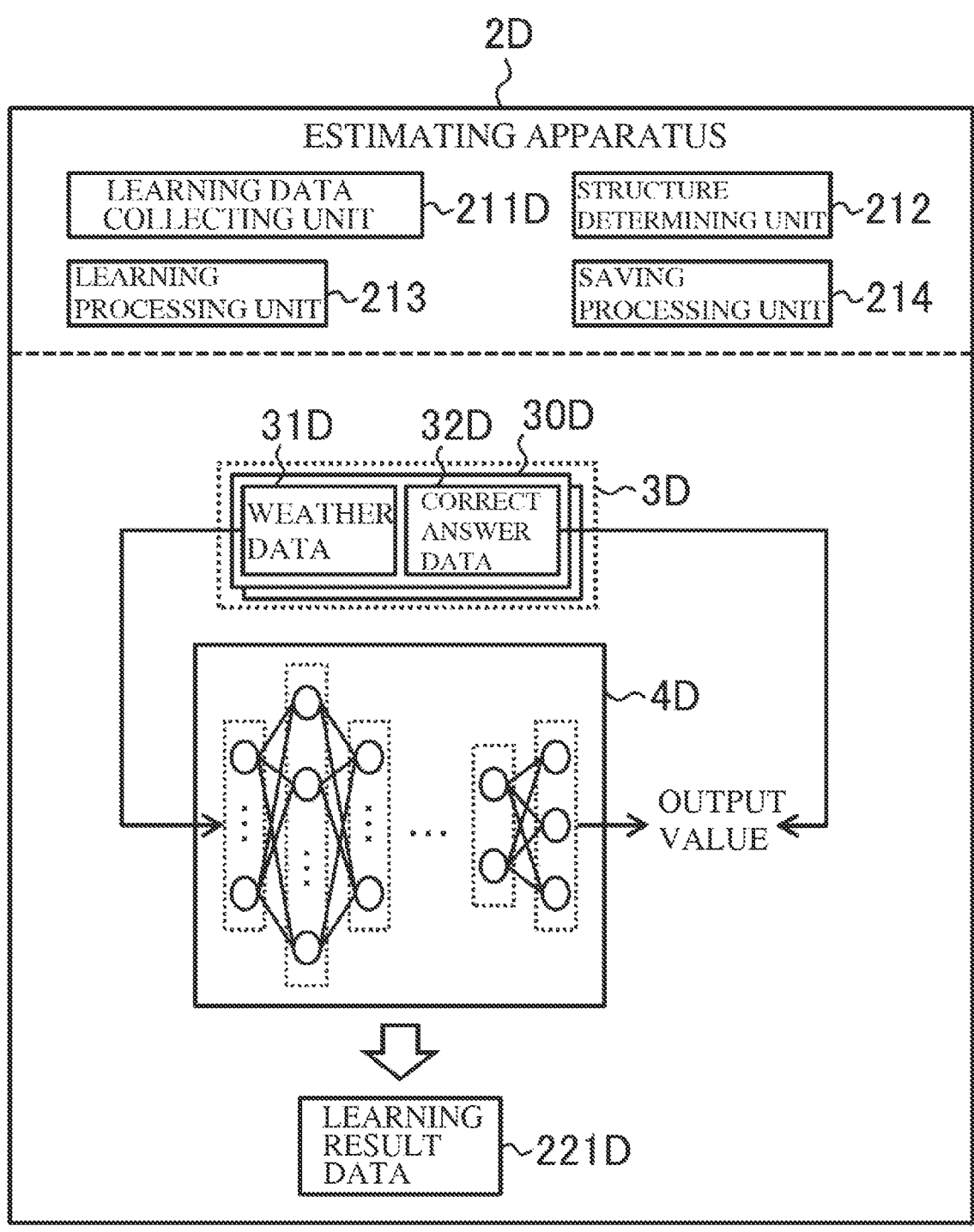
FIG. 31A is a schematic diagram illustrating an example of a software configuration for machine learning of an estimating apparatus according to another mode.

FIG. 31A schematically illustrates an example of the software configuration for learning processing of the estimating apparatuses 2D according to this modification. Similarly to the embodiment described above, the software configuration for the learning processing of the estimating apparatuses 2D is realized by the control unit 21 executing the learning program 82D. As shown in FIG. 31A, the software configuration for the learning processing of the estimating apparatuses 2D is similar to the software configuration for the learning processing of the learning apparatuses 2 described above, except for the fact that the data to be handled is changed from sensing data to weather data. With this, each estimating apparatus 2D executes a series of processing for machine learning, similarly to the learning apparatuses 2 described above.

That is, in step S101, the control unit 21 of each estimating apparatus 2D operates as a learning data collecting unit 211D, and collects the local learning data 3D to be used for machine learning of a learning model 4D. In this modification, the learning model 4D is constituted by a neural network, similarly to the learning model 4 according to the embodiment described above. Also, the local learning data 3D is constituted by a plurality of learning data sets 30D that each include a combination of weather data 31D and correct answer data 32D. The weather data 31D corresponds to the training data 31. The weather data 31D may include data indicating weather, temperature, a precipitation amount, humidity, an air volume, or the like.

The method for acquiring the learning data set 30D may be determined as appropriate depending on the embodiment, similarly to the embodiment described above. For example, the weather data 31D may be obtained under various weather conditions. Also, the obtained weather data 31D is associated with correct answer data 32D indicating the power generation amount (correct answer) of the power generating facility RD in the weather conditions. The power generation amount (correct answer) may be given by a sensor of the power generating facility RD or an input made by an operator, for example. With this, each learning data set 30C may be generated.

In step S102, the control unit 21 operates as the structure determining unit 212, and determines the structure of the learning model 4D. In step S103, the control unit 21 operates as the learning processing unit 213, and executes machine learning using the collected local learning data 3D. That is, the control unit 11 trains the learning model 4D such that, with respect to each learning data set 30D, when weather data 31D is input, an output value that matches the corresponding correct answer data 32D is output. With this, the control unit 11 can construct a trained learning model 4D that has acquired the capability of estimating the power generation amount of the power generating facility RD from the weather conditions indicated in the weather data 31D. In step S104, the control unit 21 operates as the saving processing unit 214, and generates information indicating the structure and computation parameters of the trained learning model 4D constructed by the machine learning, as the learning result data 221D. Also, the control unit 21 saves the generated learning result data 221D in a predetermined storage area.

<Estimating Processing>

Figure 31B:
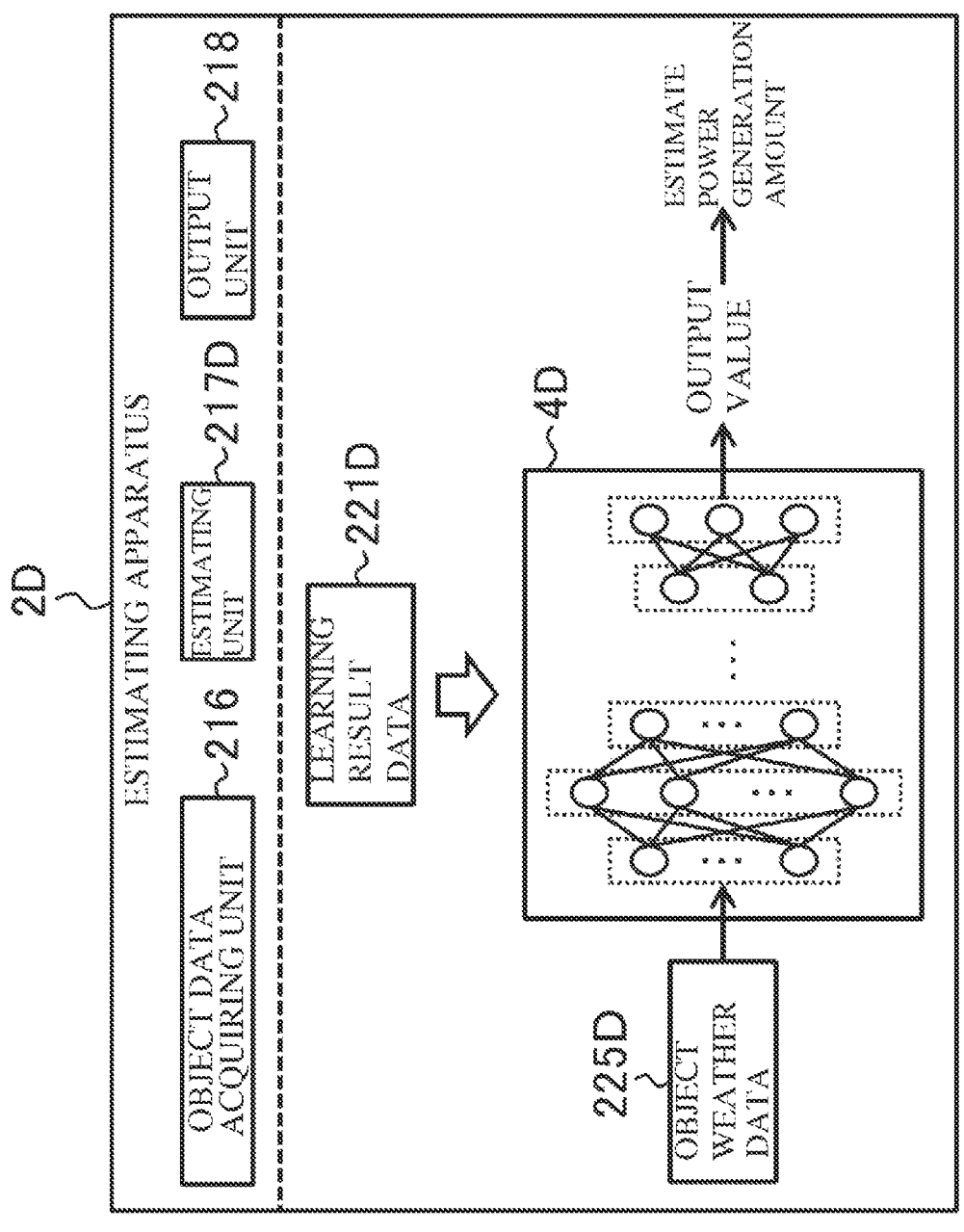
FIG. 31B is a schematic diagram illustrating an example of a software configuration for estimating processing of an estimating apparatus according to another mode.

FIG. 31B schematically illustrates an example of the software configuration for estimating processing of the estimating apparatuses 2D according to this modification. Similarly to the embodiment described above, the software configuration for the estimating processing of each estimating apparatus 2D is realized by the control unit 21 executing the estimation program 83D. As shown in FIG. 31B, the software configuration for the estimating processing of the estimating apparatuses 2D is similar to the software configuration for the inference processing of the learning apparatuses 2 described above, except for the fact that the data to be handled is changed from sensing data to weather data. With this, each estimating apparatus 2D executes a series of processing regarding the estimating processing, similarly to the learning apparatuses 2 described above.

That is, in step S201, the control unit 21 operates as the object data acquiring unit 216, and acquires the object weather data 225D regarding the weather condition in the power generating facility RD regarding which the power generation amount is to be estimated. The source of the object weather data 225D is not limited in particular, and may be selected as appropriate depending on the embodiment. For example, the control unit 21 may also acquire the object weather data 225D from a known weather data server. Also, when each estimating apparatus 2D is connected to a sensor for observing the weather condition in the vicinity of the power generating facility RD, the control unit 21 may also acquire the object weather data 225D from the sensor.

In step S202, the control unit 21 operates as the estimating unit 217D, and estimates the power generation amount of the power generating facility RD from the weather conditions indicated in the object weather data 225D using the trained learning model 4D. Specifically, the control unit 21 configures the settings of the trained learning model 4D by referring to the learning result data 221D. Next, the control unit 21 inputs the acquired object weather data 225D to the trained learning model 4D, and determines, sequentially from the input side, how each of the neurons included in the layers fires. With this, the control unit 21 acquires, from the trained learning model 4D, an output value corresponding to the result of estimating the power generation amount of the power generating facility RD from the weather conditions indicated in the object weather data 225D. Note that the estimating unit 217D corresponds to the inference unit 217 described above. The estimating unit 217D includes the trained learning model 4D by retaining the learning result data 221D.

In step S203, the control unit 21 operates as the output unit 218, and outputs information regarding the result of estimating the power generation amount of the power generating facility RD. The output destination and output information may be determined as appropriate depending on the embodiment, similarly to the embodiment described above. For example, the control unit 21 may also output the result of estimating the power generation amount of the power generating facility RD to the output apparatus 25 as is. Also, for example, the control unit 21 compares the power generation amount of the power generating facility RD with a threshold value, and if the power generation amount of the power generating facility RD is the threshold value or less, may output a message for prompting to perform power generation by another power generating facility to the output apparatus 25. The threshold value may be set as appropriate.

<Model Integration>

Each trained learning model 4D is configured to include a common portion having a common structure, similarly to the learning model 4 described above. Also, the trained learning models 4D of some combination have different structures in a portion other than the common portion. The model integration apparatus 1 executes the processing in steps S301 to S304 described above with respect to the trained learning models 4D, similarly to the embodiment described above.

That is, in step S301, the model integration apparatus 1 collects the trained learning models 4D from the respective estimating apparatuses 2D. In step S302, the model integration apparatus 1 determines the integration range in the common portion included in each of the collected trained learning models 4D. In step S303, the model integration apparatus 1 executes integration processing of integrating the results of machine learning reflected in the integration range set in the common portion, with respect to the trained learning models 4D. In step S304, the model integration apparatus 1 distributes the result of the integration processing to the estimating apparatuses 2D, and updates the trained learning models 4D retained by the estimating apparatuses 2D by causing the estimating apparatuses 2D to apply the result of the integration processing to the integration range in the trained learning models 4D.

According to this modification, in a scenario in which the power generation amount in the power generating facility is estimated, the result of machine learning reflected in one trained learning model 4D can be appropriately reflected in another trained learning models 4D. With this, each trained learning model 4D subjected to the integration processing can also appropriately estimate the power generation amount of the power generating facility RD with respect to weather conditions that cannot be obtained by the individual estimating apparatus 2D, based on the results of machine learning performed in the other trained learning models 4D. Therefore, according to this modification, a trained learning model 4D having a higher capability of appropriately estimating the power generation amount of the power generating facility RD can be constructed.

(E) Scenario of Diagnosing Health Status

Figure 32:
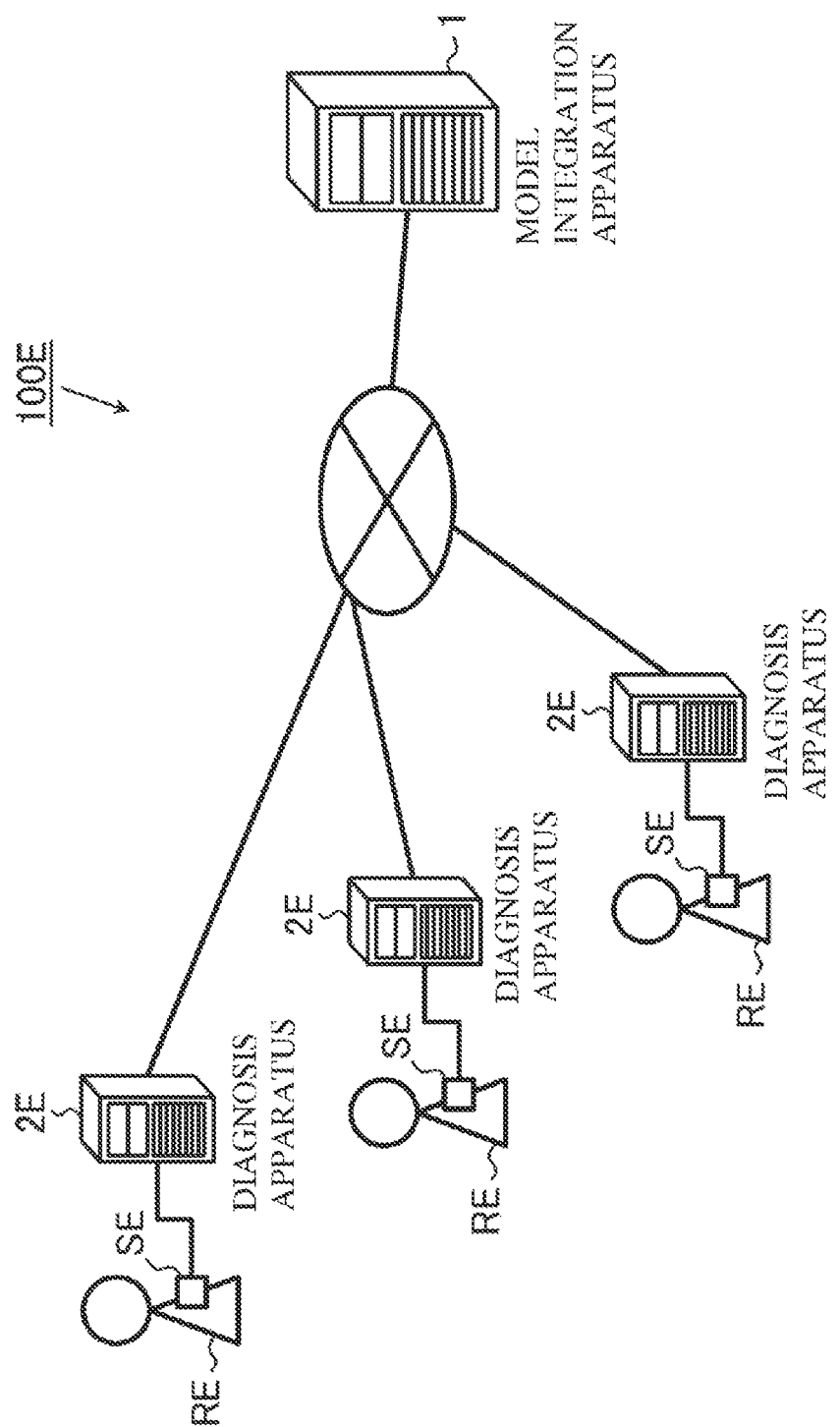
FIG. 32 is a schematic diagram illustrating an example of another scenario to which one or more embodiments may be applied.

FIG. 32 schematically illustrates an example of an application scenario of a diagnosing system 100E according to a fifth modification. This modification is an example in which the model integration apparatus 1 according to the embodiment described above is applied to a scenario in which the health status of a subject RE is estimated (diagnosed). As shown in FIG. 32, the diagnosing system 100E according to this modification includes the model integration apparatus 1 and a plurality of diagnosis apparatuses 2E. Similarly to the embodiment described above, the model integration apparatus 1 and the diagnosis apparatuses 2E may be connected to each other via a network.

The diagnosis apparatuses 2E correspond to the learning apparatuses 2 described above. The diagnosis apparatuses 2E may be configured similarly to the above-described learning apparatuses 2, except that the data that they handle is different. Each diagnosis apparatus 2E diagnoses the health status of a subject RE based on data regarding the health status of the subject RE. The data that is used for diagnosis is not limited in particular, as long as the data relates to the health status of the subject RE, and may be selected as appropriate depending on the embodiment. The data to be used for diagnosis may be image data, vital data, or the like. The vital data is data regarding vital signs, and may be data indicating the result of measurement of body temperature, blood pressure, pulse, or the like. In this modification, the diagnosis apparatuses 2E are each connected to a vital sensor SE. Each diagnosis apparatus 2E diagnoses the health status of the subject RE based on the vital data obtained from the vital sensor SE. The health status to be estimated may be determined as appropriate depending on the embodiment, and may include an item indicating healthy or not, a sign of falling ill, and the like.

<Hardware Configuration of Diagnosis Apparatus>

Figure 33:
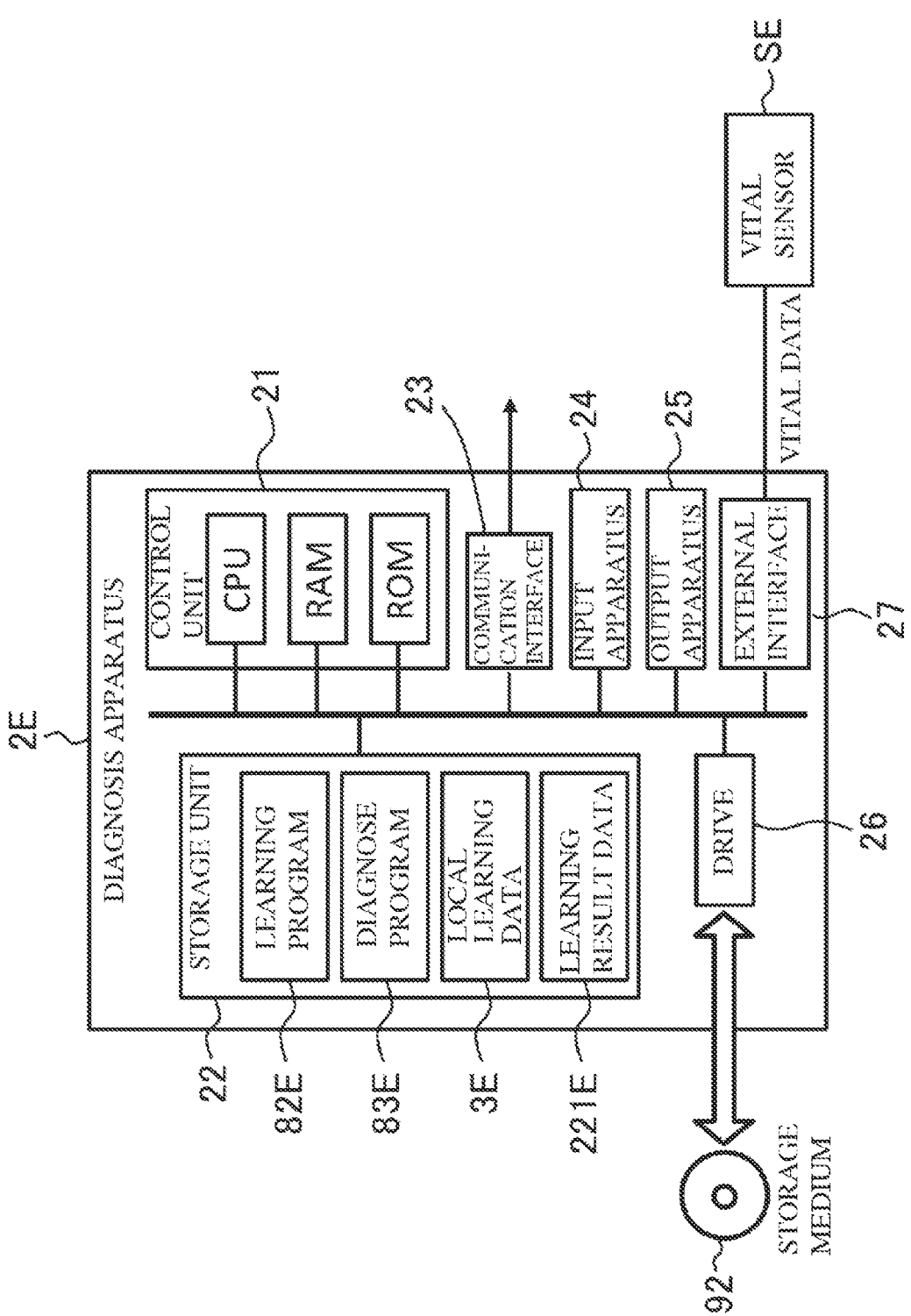
FIG. 33 is a schematic diagram illustrating an example of a hardware configuration of a diagnosis apparatus according to another mode.

FIG. 33 schematically illustrates an example of the hardware configuration of the diagnosis apparatuses 2E according to this modification. As shown in FIG. 33, each diagnosis apparatus 2E according to this modification is a computer in which a control unit 21, a storage unit 22, a communication interface 23, an input apparatus 24, an output apparatus 25, a drive 26, and an external interface 27 are electrically connected, similarly to the above-described learning apparatus 2. Each diagnosis apparatus 2E is connected to the vital sensor SE via the external interface 27. The vital sensor SE is a clinical thermometer, a blood pressure meter, a pulsimeter, or the like. Note that the hardware configuration of the diagnosis apparatuses 2E is not limited to this example. As far as the specific hardware configuration of the diagnosis apparatuses 2E is concerned, constituent elements can be omitted, replaced, or added as appropriate depending on the embodiment. The diagnosis apparatuses 2E may not only be general-purpose server apparatuses, general-purpose PCs, or the like, but also information processing apparatuses that are specifically designed for the service to be provided.

The storage unit 22 of the diagnosis apparatuses 2E according to this modification stores various types of information such as a learning program 82E, a diagnose program 83E, local learning data 3E, and learning result data 221E. The learning program 82E, the diagnose program 83E, the local learning data 3E, and the learning result data 221E respectively correspond to the learning program 82, the inference program 83, the local learning data 3, and the learning result data 221 according to the embodiment described above. At least one of the learning program 82E, the diagnose program 83E, and the local learning data 3E may also be stored in a storage medium 92. Also, the diagnosis apparatuses 2E may also acquire at least one of the learning program 82E, the diagnose program 83E, and the local learning data 3E from the storage medium 92.

<Learning Processing>

Figure 34A:
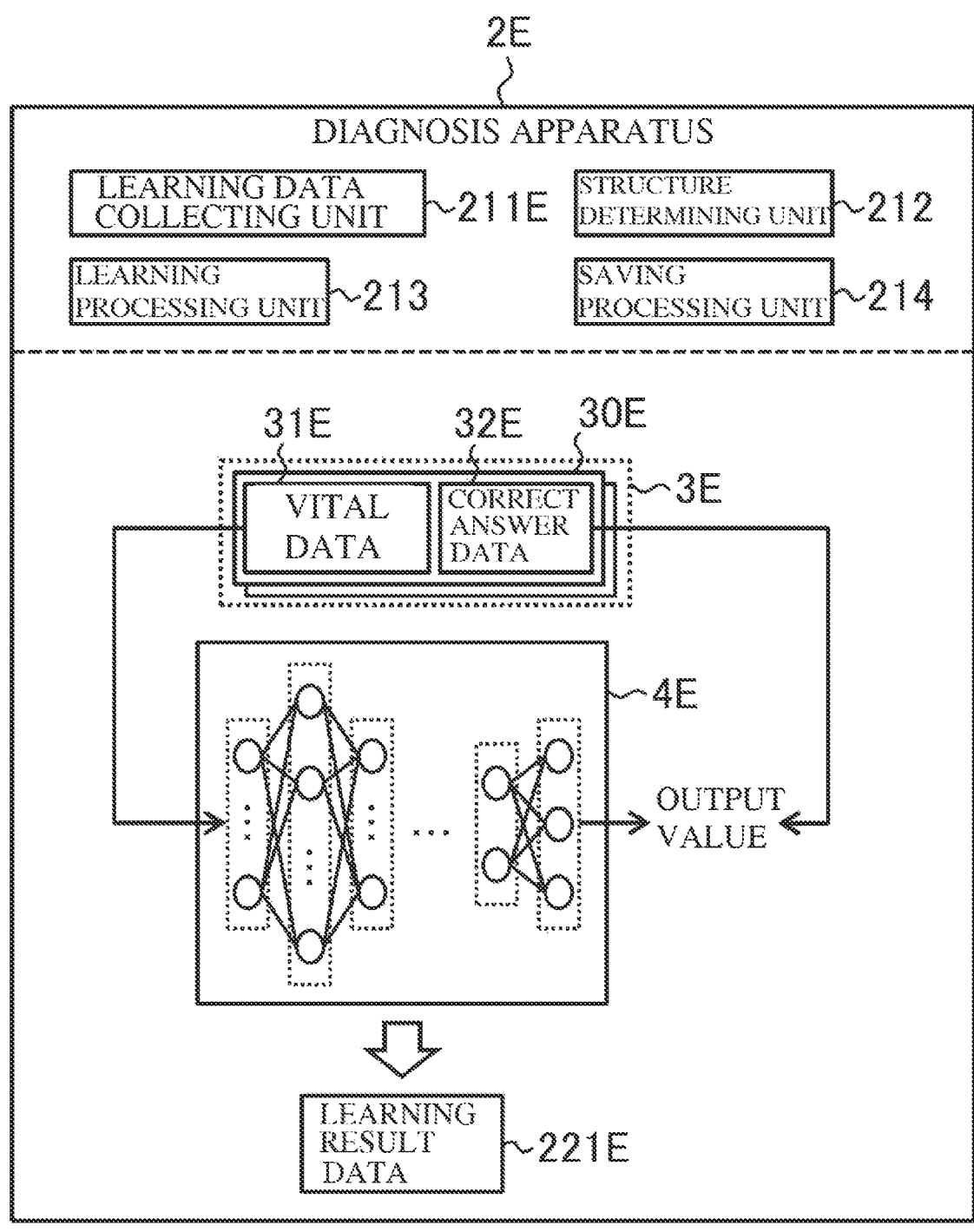
FIG. 34A is a schematic diagram illustrating an example of a software configuration for machine learning of a diagnosis apparatus according to another mode.

FIG. 34A schematically illustrates an example of the software configuration for learning processing of the diagnosis apparatuses 2E according to this modification. Similarly to the embodiment described above, the software configuration for the learning processing of the diagnosis apparatuses 2E is realized by the control unit 21 executing the learning program 82E. As shown in FIG. 34A, the software configuration for the learning processing of the diagnosis apparatuses 2E is similar to the software configuration for the learning processing of the learning apparatuses 2 described above, except for the fact that the data to be handled is changed from sensing data to vital data. With this, each diagnosis apparatus 2E executes a series of processing for machine learning, similarly to the learning apparatuses 2 described above.

That is, in step S101, the control unit 21 of each diagnosis apparatus 2E operates as a learning data collecting unit 211E, and collects the local learning data 3E to be used for machine learning of a learning model 4E. In this modification, the learning model 4E is constituted by a neural network, similarly to the learning model 4 according to the embodiment described above. Also, the local learning data 3E is constituted by a plurality of learning data sets 30E that each include a combination of vital data 31E and correct answer data 32E. The vital data 31E corresponds to the training data 31.

The method for acquiring the learning data set 30E may be determined as appropriate depending on the embodiment, similarly to the embodiment described above. For example, the vital data 31E may be obtained by measuring the vital signs of an examinee in various health statuses by a vital sensor. Also, the obtained vital data 31E is associated with correct answer data 32E indicating the health status (correct answer) of the examinee. The health status (correct answer) of an examinee may be given by an actual result data, an input made by an operator, or the like. With this, each learning data set 30E may be generated.

In step S102, the control unit 21 operates as the structure determining unit 212, and determines the structure of the learning model 4E. In step S103, the control unit 21 operates as the learning processing unit 213, and executes machine learning using the collected local learning data 3E. That is, the control unit 11 trains the learning model 4E such that, with respect to each learning data set 30E, when vital data 31E is input, an output value that matches the corresponding correct answer data 32E is output. With this, the control unit 11 can construct a trained learning model 4E that has acquired the capability of diagnosing the health status of a subject from the vital data 31E. In step S104, the control unit 21 operates as the saving processing unit 214, and generates information indicating the structure and computation parameters of the trained learning model 4E constructed by the machine learning, as the learning result data 221E. Also, the control unit 21 saves the generated learning result data 221E in a predetermined storage area.

<Diagnosis Processing>

Figure 34B:
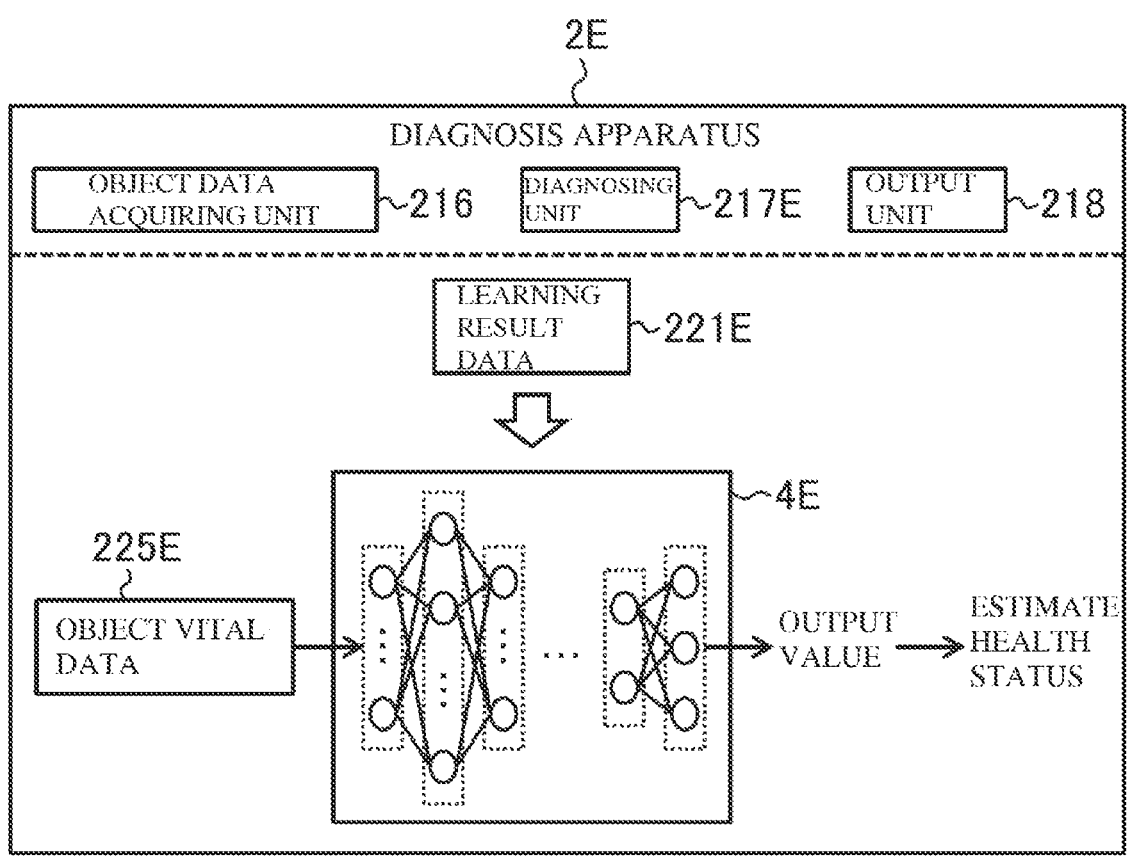
FIG. 34B is a schematic diagram illustrating an example of a software configuration for diagnosis processing of a diagnosis apparatus according to another mode.

FIG. 34B schematically illustrates an example of the software configuration for diagnosis processing of the diagnosis apparatuses 2E according to this modification. Similarly to the embodiment described above, the software configuration for the diagnosis processing of each diagnosis apparatus 2E is realized by the control unit 21 executing the diagnose program 83E. As shown in FIG. 34B, the software configuration for the diagnosis processing of the diagnosis apparatuses 2E is similar to the software configuration for the inference processing of the learning apparatuses 2 described above, except for the fact that the data to be handled is changed from sensing data to vital data. With this, each diagnosis apparatus 2E executes a series of processing regarding the diagnosis processing, similarly to the learning apparatuses 2 described above.

That is, in step S201, the control unit 21 operates as the object data acquiring unit 216, and acquires object vital data 225E indicating the result of measuring vital signs of a subject RE from the vital sensor SE. In step S202, the control unit 21 operates as a diagnosing unit 217E, and diagnoses the health status of the subject RE from the object vital data 225E, using the trained learning model 4E. Specifically, the control unit 21 configures the settings of the trained learning model 4E by referring to the learning result data 221E. Next, the control unit 21 inputs the acquired object vital data 225E to the trained learning model 4E, and determines, sequentially from the input side, how each of the neurons included in the layers fires. With this, the control unit 21 acquires an output value corresponding to the result of diagnosing the health status of the subject RE based on the object vital data 225E from the trained learning model 4E. Note that the diagnosing unit 217E corresponds to the inference unit 217 described above. The diagnosing unit 217E includes the trained learning model 4E by retaining the learning result data 221E.

In step S203, the control unit 21 operates as the output unit 218, and outputs information regarding the result of diagnosing the health status of the subject RE. The output destination and output information may be determined as appropriate depending on the embodiment, similarly to the embodiment described above. For example, the control unit 21 may also output the result of diagnosing the health status of the subject RE to the output apparatus 25 as is. Also, when the diagnosed health status of the subject RE indicates a sign of a predetermined illness, the control unit 21 may also output a message prompting to receive examination at a hospital to the output apparatus 25.

<Model Integration>

Each trained learning model 4E is configured to include a common portion having a common structure, similarly to the learning model 4 described above. Also, the trained learning models 4E of some combination have different structures in a portion other than the common portion. The model integration apparatus 1 executes the processing in steps S301 to S304 described above with respect to the trained learning models 4E, similarly to the embodiment described above.

That is, in step S301, the model integration apparatus 1 collects the trained learning models 4E from the respective diagnosis apparatuses 2E. In step S302, the model integration apparatus 1 determines the integration range in the common portion included in each collected trained learning model 4E. In step S303, the model integration apparatus 1 executes integration processing of integrating the results of machine learning reflected in the integration range set in the common portion, with respect to the trained learning models 4E. In step S304, the model integration apparatus 1 distributes the result of the integration processing to the diagnosis apparatuses 2E, and updates the trained learning models 4E retained by the diagnosis apparatuses 2E by causing the diagnosis apparatuses 2E to apply the result of the integration processing to the integration range in the trained learning models 4E.

According to this modification, in a scenario in which the health status of a subject is diagnosed, the result of machine learning reflected in one trained learning model 4E can be appropriately reflected in the other trained learning models 4E. With this, each trained learning model 4E subjected to the integration processing can also appropriately estimate the health status of a subject with respect to an attribute and vital signs of the subject that cannot be obtained by the individual diagnosis apparatus 2E, based on the results of machine learning performed in the other trained learning models 4E. Therefore, according to this modification, a trained learning model 4E having a higher capability of appropriately diagnosing the health status of the subject RE can be constructed.

(F) Other Considerations

As described above, the model integration apparatus 1 according to the embodiment described above can be applied to any scenario in which a learning model is caused to learn a predetermined capability by machine learning. Note that the model integration apparatus 1 may perform grouping such that apparatuses in one modification are classified into one group, or may further perform grouping in each modification. For example, the model integration apparatus 1 may assign the inspection apparatuses 2A and the control apparatuses 2B to different groups. Furthermore, the model integration apparatus 1 may also assign one inspection apparatus 2A that performs inspection of a first product and another inspection apparatus 2A that performs inspection of a second product that is different from the first product to different groups.

With this, even if apparatuses in different modifications are present at the same time, the model integration apparatus 1 can realize the integration processing of each of the trained learning models (4, 4A to 4E) by executing the processing described above for each group.

<4.2>

In the embodiment described above, each learning apparatus 2 is constituted by a computer that executes both of the learning processing and the inference processing. However, the configuration of the learning apparatuses 2 is not limited to this example. At least one of the plurality of learning apparatuses 2 may also be constituted by a plurality of computers. In this case, the learning apparatus 2 may be configured such that the learning processing and inference processing are executed by different computers.

Figure 35:
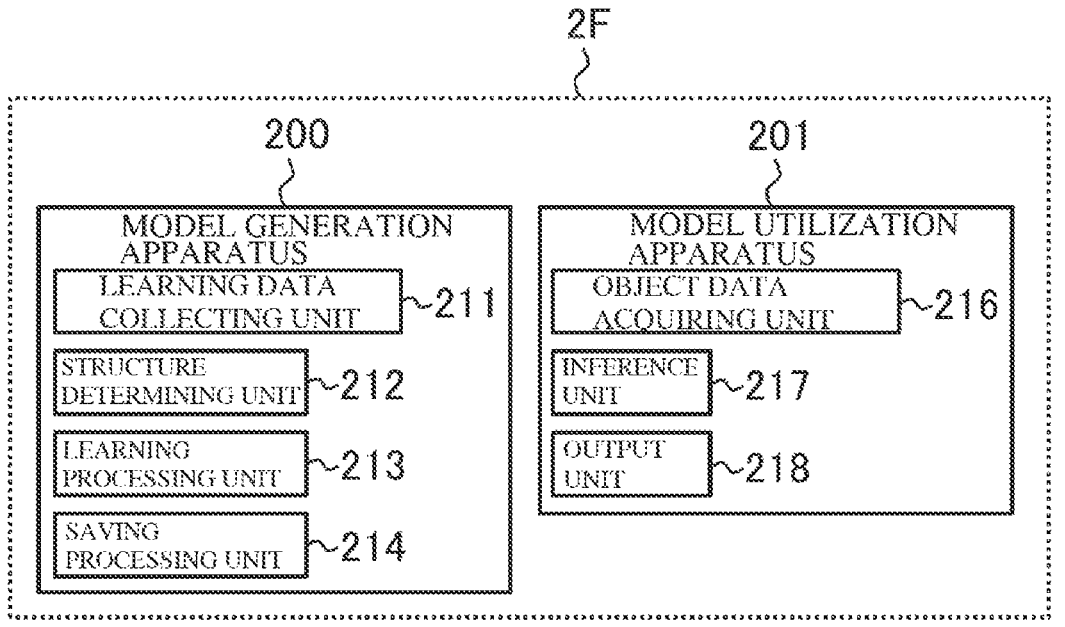
FIG. 35 is a schematic diagram illustrating an example of a configuration of a learning apparatus according to another mode.

FIG. 35 schematically illustrates an example of a learning apparatus 2F according to this modification. In this modification, the learning apparatus 2F includes a model generation apparatus 200 configured to execute the aforementioned learning processing and a model utilization apparatus 201 configured to execute the aforementioned inference processing. The hardware configuration of each of the model generation apparatus 200 and model utilization apparatus 201 may be similar to the hardware configuration of the learning apparatus 2 according to the embodiment described above. The model generation apparatus 200 operates as a computer that includes the learning data collecting unit 211, the structure determining unit 212, the learning processing unit 213, and the saving processing unit 214 as software modules, by executing the learning program 82. The model utilization apparatus 201 operates as a computer that includes the object data acquiring unit 216, the inference unit 217, and the output unit 218 as software modules, by executing the inference program 83. In this case, the model generation apparatus 200 may be treated as a "learning apparatus". Note that the same applies to the inspection apparatus 2A, control apparatus 2B, monitoring apparatus 2C, estimating apparatus 2D, and diagnosis apparatus 2E according to the modifications described above.

<4.3>

In the embodiment described above, the data communication between the learning apparatuses 2 and the model integration apparatus 1 is performed via a network. The model integration apparatus 1 executes the integration processing with respect to the trained learning models 4 (learning result data 221) collected from the respective learning apparatuses 2. If the trained learning models 4 are disclosed in this process, it is possible that the confidentiality of the inference processing of the learning apparatuses 2 and the contents of the local learning data 3 may be damaged. Therefore, in the embodiments described above, in order to improve the security of the data communication, the integration processing of integrating the results of machine learning reflected in the integration range 41 may be performed by a secret calculation. The method of secret calculation is not limited in particular, and may be selected as appropriate depending on the embodiment. In this modification, a method of using one of secret sharing and homomorphic encryption may be adopted.

(A) Method for Using Secret Sharing

Figure 36A:
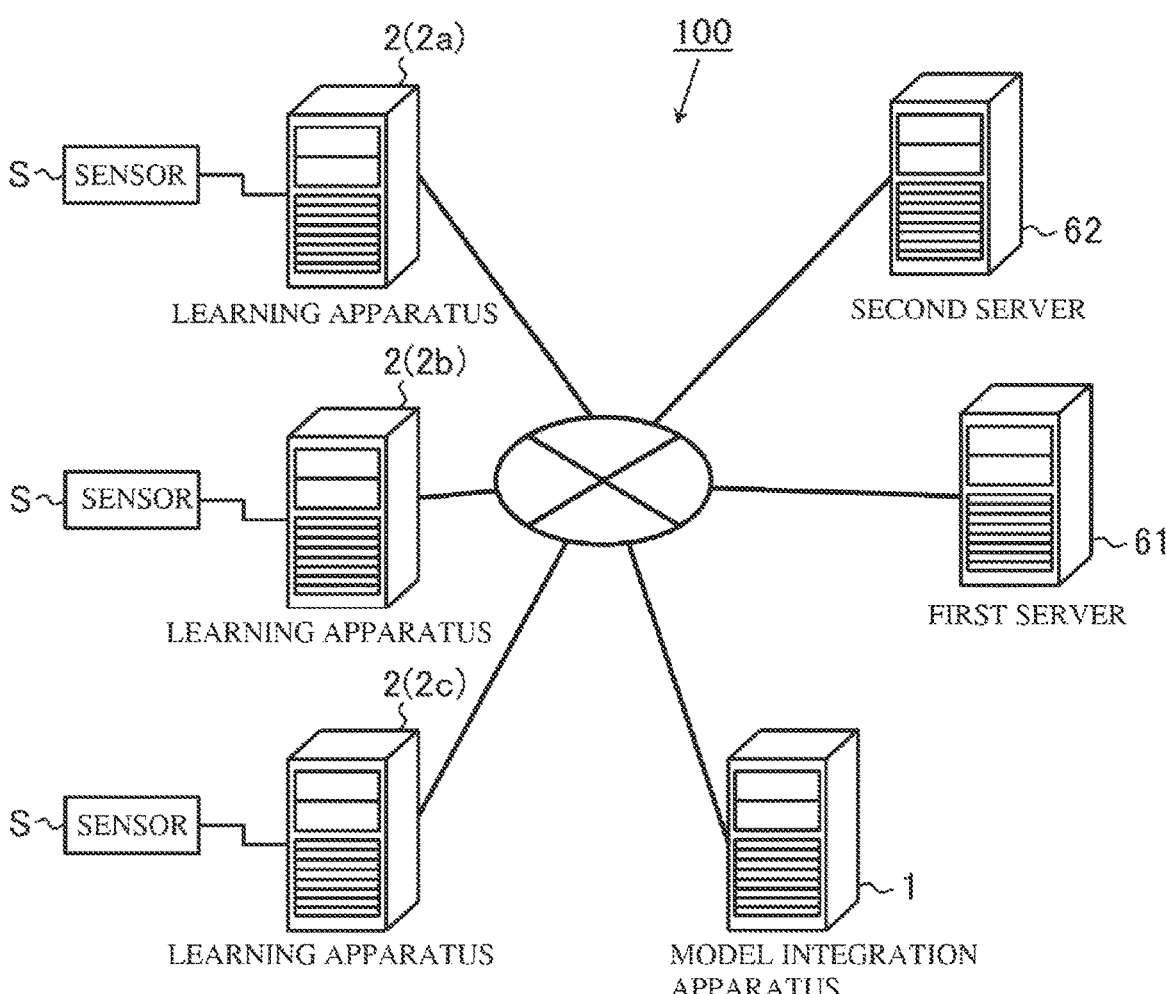
FIG. 36A is a schematic diagram illustrating an example of a scenario in which integration processing is executed by a secret calculation in a modification.

FIG. 36A schematically illustrates an example of a scenario in which integration processing using secret sharing is executed. In the method for using the secret sharing, a first server 61 and a second server 62 are installed in a network, as reliable third party apparatuses. The first server 61 and the second server 62 are each a computer including a hardware processor and a memory, similarly to the model integration apparatus 1 or the like.

In this method, first, the control unit 21 of each learning apparatus 2 generates a random number when transmitting trained learning model 4. The method for generating the random number may be selected as appropriate depending on the embodiment. Next, the control unit 21 calculates the difference between the value of the computation parameter of the trained learning model 4 and the generated random number. Then, the control unit 21 transmits the generated random number to the second server 62 while transmitting the calculated difference to the first server 61.

In response thereto, the first server 61 calculates the total sum of differences received from the respective learning apparatuses 2, as in the following Formula 1. On the other hand, the second server 62 calculates the total sum of the random numbers received from the respective learning apparatuses 2, as in the following Formula 2.

[Math. 1]

$$\Sigma_i(Y_i - r_i) \qquad \text{Formula 1}$$

[Math. 2]

$$\Sigma_i r_i \qquad \text{Formula 2}$$

Note that $Y_i$ represents the value of the computation parameter of the trained learning model 4 constructed by the $i^{th}$ learning apparatus 2. $r_i$ represents the random number generated by the $i^{th}$ learning apparatus 2.

The first server 61 and the second server 62 respectively transmit the calculation results of total sum to the model integration apparatus 1. The control unit 11 of the model integration apparatus 1 adds the total sums respectively received from the first server 61 and the second server 62. With this, the control unit 11 can obtain the total sum of values of the computation parameters of the respective trained learning models 4, while preventing the values of the computation parameters of the trained learning models 4 retained by the respective learning apparatuses 2 from being specified. The control unit 11 executes the integration processing using the total sum of the values of the computation parameters.

Note that the method of secret sharing is not limited in particular, and may be selected as appropriate depending on the embodiment. The international standard method (ISO/IEC 19592-2:2017) or the like may be used for the secret sharing. Also, if the model integration apparatus 1 is a reliable server, the model integration apparatus 1 may also operate as one of the first server 61 and the second server 62.

(B) Method of Using Homomorphic Encryption

Figure 36B:
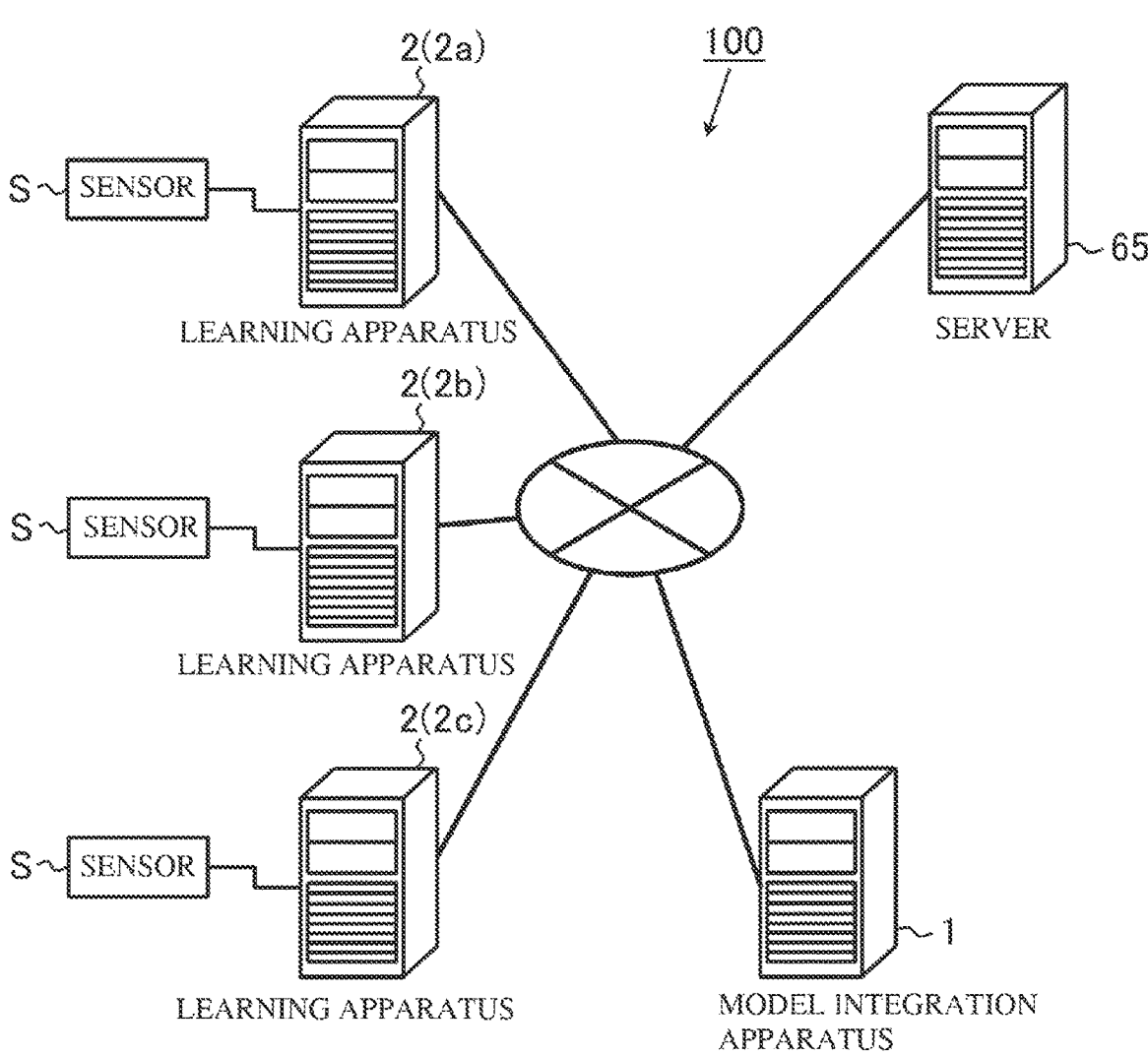
FIG. 36B is a schematic diagram further illustrating an example of a scenario in which integration processing is executed by a secret calculation in the modification.

FIG. 36B schematically illustrates an example of a scenario in which integration processing using homomorphic encryption is executed. In the method of using homomorphic encryption, a server 65 is installed in a network, as a reliable third party apparatus. The server 65 is a computer including a hardware processor and a memory, similarly to the model integration apparatus 1, for example.

In this method, first, the server 65 issues a public key and a private key. The public key is generated with homomorphism. That is, the public key is generated such that, when two encoded texts that have been encrypted by the public key are given, the two encoded texts can be added directly in an encrypted state. The server 65 distributes the public key, of the issued public key and private key, to each learning apparatus 2.

The control unit 21 of each learning apparatus 2 encrypts the values of the computation parameters of its trained learning model 4 with the received public key. Then, the control unit 21 transmits the encrypted values of the computation parameters to the model integration apparatus 1. The control unit 11 of the model integration apparatus 1 calculates the total sum of the values of the computation parameters received from the respective learning apparatuses 2 directly in an encrypted state, as in the following Formula 3.

[Math. 3]

$$P(\Sigma_i Y_i) \qquad \text{Formula 3}$$

Note that P represents encryption by a public key.

The control unit 11 transmits the encrypted total sum to the server 65. The server 65 decrypts the encrypted total sum received from the model integration apparatus 1 with the private key. Also, the server 65 returns the decrypted total sum of computation parameters to the model integration apparatus 1. With this, the control unit 11 can obtain the total sum of the values of the computation parameter of the respective trained learning models 4, while preventing the values of the computation parameters of the trained learning models 4 retained by the respective learning apparatuses 2 from being specified. The control unit 11 executes the integration processing using the total sum of the values of the computation parameters.

Note that the method of homomorphic encryption is not limited in particular, and may be selected as appropriate depending on the embodiment. Modified-ElGamal encryption, Paillier encryption, or the like may be used as the homomorphic encryption method. Also, if the model integration apparatus 1 is a reliable server, the model integration apparatus 1 may also operate as the server 65.

As described above, according to this modification, with one of the two methods described above, the integration processing of integrating the results of machine learning reflected in the integration range 41 can be performed using the secret calculation. Accordingly, the confidentiality of the trained learning model 4 constructed by each learning apparatus 2 can be prevented from being damaged.

<4.4>

In the embodiment described above, each learning model 4 is constituted by a neural network having a multi-layer structure. However, the structure and the type of the neural network that constitutes each learning model 4 is not limited to this example, and may be selected as appropriate depending on the embodiment. For example, the learning models 4 may also be constituted by convolutional neural networks including a convolutional layer, a pooling layer, and a fully connected layer. Also, when time series data is used, the learning models 4 may also be constituted by recurrent neural networks. Also, the type of the learning models 4 is not limited to neural networks, and may be selected as appropriate depending on the embodiment. The learning model 4 regarding which the integration processing is to be performed may also be a generation model configured to generate some sort of data.

184<4.5>

In the embodiment described above, the number of learning models 4 to be constructed by each learning apparatus 2 is not limited to one, and a plurality of models may also be constructed. Furthermore, the learning apparatuses 2 may also determine the structure of the learning model 4 without using the template 126. In this case, the template 126 may be omitted.

Also, in the embodiment described above, when the model integration apparatus 1 does not determine the integration range 41 such when the integration range 41 is fixed in advance, the processing in step S302 described above may be omitted. In this case, the range adjusting unit 112 may be omitted from the software configuration of the model integration apparatus 1.

Also, in the embodiment described above, the grouping processing may be omitted. When the first grouping method is omitted, the group list 123 may be omitted. When the grouping processing is omitted, the assignment information 124 may be omitted. Also, the grouping unit 116 may be omitted from the software configuration of the model integration apparatus 1.

Also, in the embodiment described above, the method relating to optimization may be omitted from the method for determining the integration range 41 and the grouping method. The second method may be omitted from the method for determining the integration range 41. In this case, the evaluation sample 129 may be omitted.

Also, in the embodiment described above, the processing of setting weights to the trained learning models 4 may be omitted. Each weight may be set in advance. In this case, the weight setting unit 115 may be omitted from the software configuration of the model integration apparatus 1. Moreover, the control unit 11 may also set each weight randomly. In this case, similarly to the optimization of the integration range 41 and grouping described above, each weight may also be optimized such that the predetermined capability of the trained learning models 4 subjected to the integration processing improves. For example, the control unit 11 may also optimize each weight such that the predetermined capability of the trained learning models 4 subjected to the integration processing improves, by trying the integration processing while adjusting each weight randomly.

Also, in the embodiment described above, the data may be replaced by an individual type of data such as image data, sound data, numerical data, text data, measurement data obtained by a sensor, or the like. For example, as a result of the local learning data 3 including image data, an image system can be configured by the model integration apparatus 1 and the plurality of learning apparatuses 2. In this case, each learning apparatus 2 constructs a trained learning model 4 that has acquired a capability of estimating a predetermined feature from image data, by performing machine learning using the collected local learning data 3. Also, as a result of the local learning data 3 including sensing data obtained by a sensor, a sensor system can be configured by the model integration apparatus 1 and the plurality of learning apparatuses 2. In this case, each learning apparatus 2 constructs a trained learning model 4 that has acquired a capability of estimating a predetermined feature from sensing data, by performing machine learning using the collected local learning data 3.

INDEX TO THE REFERENCE NUMERALS

1 Model integration apparatus
11 Control unit
12 Storage unit
13 Communication interface
14 Input apparatus
15 Output apparatus
16 Drive
111 Model collecting unit
112 Range adjusting unit
113 Integration processing unit
114 Model updating unit
115 Weight setting unit
116 Grouping unit
121 Integration result data
123 Group list
124 Assignment information
126 Template
129 Evaluation sample
1291 Input data
1292 Correct answer data
81 Model integration program
91 Storage medium
2 Learning apparatus
21 Control unit
22 Storage unit
23 Communication interface
24 Input apparatus
25 Output apparatus
26 Drive
27 External interface
211 Learning data collecting unit
212 Structure determining unit
213 Learning processing unit
214 Saving processing unit
216 Object data acquiring unit
217 Inference unit
218 Output unit
221 Learning result data 225 Object data
82 Learning program
83 Inference program
92 Storage medium
S Sensor
3 Local learning data
30 Learning data set
31 Training data
32 Correct answer data
4 Learning model
40 Common portion
41 Integration range
51 Input layer
52 to 55 Intermediate (hidden) layer
56 Output layer

The invention claimed is:

1. A model integration apparatus comprising a processor configured with a program to perform operations comprising:

operation as a model collecting unit configured to collect trained learning models from a plurality of learning apparatuses, wherein each of the plurality of learning apparatuses collects local learning data, and constructs a trained learning model that has acquired a predetermined capability by performing machine learning using the collected local learning data, the trained learning models each having a structure comprising a common portion having a common structure and an integration range comprising computational parameters that are shared between the trained learning models, the integration range determined based on information regarding the respective structures of the trained learning models, and at least one of the trained learning models having the structure comprising different structures in a portion other than the common portion;

operation as a range adjusting unit configured to determine for each of the collected trained learning models, a range to which integration processing is to be performed as the integration range in the common portion included in each of the collected trained learning models;

operation as an integration processing unit configured to execute integration processing comprising, for each of the collected trained learning models, integrating results of machine learning reflected in the integration range set in the common portion, with respect to the integration ranges set in all of the collected trained learning models; and operation as a model updating unit configured to distribute a result of the integration processing to each learning apparatus in the plurality of learning apparatuses, and update each of the trained learning models retained by the learning apparatuses by causing each learning apparatus in the plurality of learning apparatuses to apply the result of the integration processing to the integration range in the respective trained learning model, wherein the common portion of each trained learning model comprises a plurality of computation modules, and the processor is configured with the program to perform operations as the range adjusting unit such that determining the integration range in the common portion comprises:

acquiring an output from each computation module included in the common portion by inputting an evaluation sample to each trained learning model;

calculating at least one of: a similarity and a correlation in the acquired output between the corresponding computation modules of the respective trained learning models; and designating the computation module for which the calculated at least one of the similarity and the correlation satisfies a predetermined condition as the integration range.

2. The model integration apparatus according to claim 1, wherein the structure of each trained learning model is given by a template, and the processor is configured with the program such that operation as the range adjusting unit comprises determining the integration range based on the template.

3. The model integration apparatus according to claim 1, wherein the processor is configured with the program to perform operations such that operation as the range adjusting unit comprises optimizing the integration range such that predetermined capability of the trained learning models improves after execution of the integration processing relative to that before execution of the integration processing.

4. The model integration apparatus according to claim 3, wherein the processor is configured with the program to perform operations such that:

operation as the range adjusting unit comprises designating a provisional integration range in the common portion; and operation as the integration processing unit comprises executing integration processing of integrating results of the machine learning reflected in the designated provisional integration range, with respect to the trained learning models, and the processor is configured with the program to perform operations as the range adjusting unit such that optimizing the integration range comprises:

acquiring a first result obtained by letting the trained learning models before execution of the integration processing exert the predetermined capability on an evaluation sample;

acquiring a second result obtained by letting the trained learning models after execution of the integration processing exert the predetermined capability on the evaluation sample;

determining whether the predetermined capability of the trained learning models has improved after execution of the integration processing relative to before execution of the integration processing, by comparing the first result with the second result; and determining the provisional integration range as integration range, responsive to determining that the predetermined capability of the trained learning models improves after executing the integration processing.

5. The model integration apparatus according to claim 2, wherein the processor is configured with the program to perform operations such that:

operation as the range adjusting unit comprises designating a plurality of provisional integration ranges in the common portion; and operation as the integration processing unit comprises executing, for each provisional integration range, integration processing of integrating results of the machine learning reflected in the designated provisional integration range with respect to the trained learning models, and the processor is configured with the program to perform operations as the range adjusting unit such that optimizing the integration range comprises:

acquiring, for each provisional integration range, a result obtained by letting the trained learning models after execution of the integration processing exert the predetermined capability on an evaluation sample;

specifying a provisional integration range for which the predetermined capability of the trained learning models after execution of the integration processing is highest, based on the acquired results; and determining the specified provisional integration range as the integration range.

6. The model integration apparatus according to claim 1, wherein the processor is configured with the program to perform operations further comprising operation as a grouping unit configured to assign each of the plurality of learning apparatuses to at least one of a plurality of groups, the processor is configured with the program to perform operations such that:

operation as the model collecting unit comprises collecting the trained learning models from a plurality of learning apparatuses belonging to the same group;

operation as the range adjusting unit comprises determining the integration range in a common portion included in each of the collected trained learning models in the same group;

operation as the integration processing unit comprises executing integration processing of integrating results of the machine learning reflected in the determined integration range, with respect to the trained learning models, in the same group; and operation as the model updating unit comprises distributing a result of the integration processing to the learning apparatuses in the same group, and update the trained learning models retained by these learning apparatuses by causing the learning apparatuses to apply the result of the integration processing to the integration range in the trained learning models.

7. The model integration apparatus according to claim 6, wherein the processor is configured with the program to perform operations such that operation as the grouping unit comprises distributing a list of the plurality of groups to each learning apparatus, to cause the learning apparatus to select at least one group from the plurality of groups on the list, and to assign the learning apparatuses to their selected at least one group.

8. The model integration apparatus according to claim 6, wherein the processor is configured with the program to perform operations such that operation as the grouping unit comprises:

acquiring attribute data regarding the predetermined capability from each learning apparatus;

performing clustering of the attribute data acquired from the learning apparatuses; and assigning each of the plurality of learning apparatuses to at least one of the plurality of groups based on the clustering result.

9. The model integration apparatus according to claim 6, wherein the processor is configured with the program to perform operations such that operation as the grouping unit comprises optimizing the assignment of the learning apparatuses to the plurality of groups such that the predetermined capability of the trained learning models improves after execution of the integration processing relative to that before execution of the integration processing.

10. The model integration apparatus according to claim 9, wherein the processor is configured with the program to perform operations such that:

operation as the grouping unit comprises performing a plurality of provisional groupings that differ in assignment of the learning apparatuses to the plurality of groups;

operation as the range adjusting unit comprises determining, for each provisional grouping, the integration range in a common portion included in each collected trained learning model within the same group; and operation as the integration processing unit comprises executing, for each provisional grouping, integration processing of integrating results of the machine learning reflected in the determined integration range, with respect to the trained learning models in the same group, and the processor is configured with the program to perform operations as the range adjusting unit such that optimizing the assignment of the learning apparatuses comprises:

acquiring, for each provisional grouping, a result obtained by letting the trained learning models after execution of the integration processing in the same group exert the predetermined capability on an evaluation sample;

specifying a provisional grouping for which the predetermined capability of the trained learning models after execution of the integration processing is highest, in the same group, based on the acquired results; and assigning each of the plurality of learning apparatuses to at least one of the plurality of groups according to the specified provisional grouping.

11. The model integration apparatus according to claim 1, wherein the processor is configured with the program to perform operations as the integration processing unit such that integrating results of the machine learning reflected in the integration range comprises obtaining an average or a sum of values of a computation parameter included in the integration range.

12. The model integration apparatus according to claim 1, wherein the processor is configured with the program to perform operations further comprising operation as a weight setting unit configured to set weights for the trained learning models, wherein the weights determine priorities of the trained learning models in the integration processing, and the processor is configured with the program to perform operations as the integration processing unit such that integrating results of the machine learning reflected in the integration range comprises obtaining an average or a sum of values of a computation parameter included in the integration range of the respective trained learning models, after subjecting the values to weighting using the set weights.

13. The model integration apparatus according to claim 12, wherein the processor is configured with the program to perform operations such that operation as the weight setting unit comprises setting the weights such that the weight increases as the number of pieces of the local learning data used for the machine learning increases.

14. The model integration apparatus according to claim 12, wherein the local learning data comprises specific learning data regarding a specific element in the predetermined capability, and the processor is configured with the program to perform operations such that operation as the weight setting unit comprises setting the weights such that the weight increases as the ratio of the specific learning data included in the local learning data used for the machine learning increases.

15. The model integration apparatus according to claim 1, wherein the processor is configured with the program to perform operations as the integration processing unit such that the integration of results of the machine learning reflected in the integration range is performed by a secret calculation performed by a method comprising one of: a homomorphic encryption method; a secret sharing method; and a method compliant with international standard ISO/IEC 19592-2:2017.

16. An inference system comprising:

a plurality of learning apparatuses; and a model integration apparatus, wherein each learning apparatus comprises a first processor configured with a first program to perform operations comprising:

collecting local learning data; and constructing a trained learning model that has acquired a predetermined inference capability by machine learning using the collected local learning data, each of the trained learning models having a structure comprising a common portion having a common structure and an integration range comprising computational parameters that are shared between the trained learning models, the integration range determined based on information regarding the respective structures of the trained learning models, and at least one of the trained learning models having the structure comprising different structures in a portion other than the common portion, and the model integration apparatus comprises a second processor configured with a second program to perform operations comprising:

collecting the trained learning models from the plurality of learning apparatuses;

determining for each of the collected trained learning models, a range to which integration processing is to be performed as the integration range in the common portion included in each of the collected trained learning models;

executing integration processing comprising, for each of the collected trained learning models, integrating results of the machine learning reflected in the integration range set in the common portion, with respect to the integration ranges set in all of the collected trained learning models; and distributing a result of the integration processing to each learning apparatus in the plurality of learning apparatuses, and updating each of the trained learning models retained by the learning apparatuses by causing each learning apparatus in the plurality of learning apparatuses to apply the result of the integration processing to the integration range in the respective trained learning models, wherein the common portion of each trained learning model comprises a plurality of computation modules, and determining the integration range in the common portion comprises:

acquiring an output from each computation module included in the common portion by inputting an evaluation sample to each trained learning model;

calculating at least one of: a similarity and a correlation in the acquired output between the corresponding computation modules of the respective trained learning models; and designating the computation module for which the calculated at least one of the similarity and the correlation satisfies a predetermined condition as the integration range.

17. A model integration method executed by a computer, comprising:

collecting trained learning models from a plurality of learning apparatuses, wherein each of the plurality of learning apparatuses collects local learning data, and constructs a trained learning model that has acquired a predetermined capability by performing machine learning using the collected local learning data, each of the trained learning models having a structure comprising a common portion having a common structure and an integration range comprising computational parameters that are shared between the trained learning models, the integration range determined based on information regarding the respective structures of the trained learning models, and at least one of the trained learning models having the structure comprising different structures in a portion other than the common portion;

operation as a range adjusting unit configured to determine for each of the collected trained learning models, a range to which integration processing is to be performed as the integration range in the common portion included in each of the collected trained learning models;

executing integration processing comprising, for each of the collected trained learning models, integrating results of machine learning reflected in the integration range set in the common portion, with respect to the integration ranges set in all of the collected trained learning models; and distributing a result of the integration processing to each learning apparatus in the plurality of learning apparatuses, and updating each of the trained learning models retained by the learning apparatuses by causing each learning apparatus in the plurality of learning apparatuses to apply the result of the integration processing to the integration range in the respective trained learning model, wherein the common portion of each trained learning model comprises a plurality of computation modules, and determining the integration range in the common portion comprises:

acquiring an output from each computation module included in the common portion by inputting an evaluation sample to each trained learning model;

calculating at least one of: a similarity and a correlation in the acquired output between the corresponding computation modules of the respective trained learning models; and designating the computation module for which the calculated at least one of the similarity and the correlation satisfies a predetermined condition as the integration range.

18. A non-transitory computer-readable storage medium storing a model integration program, which when read and executed, causes a computer to perform operations comprising:

collecting trained learning models from a plurality of learning apparatuses, wherein each of the plurality of learning apparatuses collects local learning data, and constructs a trained learning model that has acquired a predetermined capability by performing machine learning using the collected local learning data, each of the trained learning models having a structure comprising a common portion having a common structure and an integration range comprising computational parameters that are shared between the trained learning models, the integration range determined based on information regarding the respective structures of the trained learning models, and at least one of the trained learning models having the structure comprising different structures in a portion other than the common portion;

executing integration processing comprising, for each of the collected trained learning models, integrating results of machine learning reflected in the integration range set in the common portion, with respect to the integration ranges set in all of the collected trained learning models; and determining for each of the collected trained learning models, a range to which integration processing is to be performed as the integration range in the common portion included in each of the collected trained learning models;

distributing a result of the integration processing to each learning apparatus in the plurality of learning apparatuses, and updating each of the trained learning models retained by the learning apparatuses by causing each learning apparatus in the plurality of learning apparatuses to apply the result of the integration processing to the integration range in the respective trained learning model, wherein the common portion of each trained learning model comprises a plurality of computation modules, and determining the integration range in the common portion comprises:

acquiring an output from each computation module included in the common portion by inputting an evaluation sample to each trained learning model;

calculating at least one of: a similarity and a correlation in the acquired output between the corresponding computation modules of the respective trained learning models; and designating the computation module for which the calculated at least one of the similarity and the correlation satisfies a predetermined condition as the integration range.

19. An inspection system comprising:

a plurality of inspection apparatuses; and a model integration apparatus, wherein each inspection apparatus comprises a first processor configured with a first program to perform operations comprising:

collecting local learning data including image data of an image of a product; and constructing a trained learning model that has acquired a capability of determining a state of the product in an image of the image data by performing machine learning using the collected local learning data, each trained learning model having a structure comprising a common portion having a common structure and an integration range comprising computational parameters that are shared between the trained learning models, the integration range determined based on information regarding the respective structures of the trained learning models, and at least one of the trained learning models having the structure comprising different structures in a portion other than the common portion the model integration apparatus comprises a second processor configured with a second program to perform operations comprising:

collecting the trained learning models from the plurality of inspection apparatuses, determining for each of the collected trained learning models, a range to which integration processing is to be performed as the integration range in the common portion included in each of the collected trained learning models;

executing integration processing comprising, for each of the collected trained learning models, integrating results of the machine learning reflected in the integration range set in the common portion, with respect to the integration ranges set in all of the collected trained learning models, and distributing a result of the integration processing to each inspection apparatus in the plurality of inspection apparatuses, and updating each of the trained learning models retained by the inspection apparatuses by causing each inspection apparatus in the plurality of inspection apparatuses to apply the result of the integration processing to the integration range in the respective trained learning models, wherein the common portion of each trained learning model comprises a plurality of computation modules, and determining the integration range in the common portion comprises:

acquiring an output from each computation module included in the common portion by inputting an evaluation sample to each trained learning model;

calculating at least one of: a similarity and a correlation in the acquired output between the corresponding computation modules of the respective trained learning models; and designating the computation module for which the calculated at least one of the similarity and the correlation satisfies a predetermined condition as the integration range.

* * * * *